United States Patent
Lüssem et al.

(10) Patent No.: US 7,361,288 B2
(45) Date of Patent: Apr. 22, 2008

(54) COMPONENTS FOR HIGH-FREQUENCY TECHNOLOGY

(75) Inventors: Georg Lüssem, Petershausen (DE); Peter Best, Groβ-Zimmern (DE); Carsten Weil, Rudersberg (DE); Stefan Müller, Flörsheim (DE); Patrick Scheele, Darmstadt (DE); Rolf Jakoby, Rosbach (DE)

(73) Assignee: Merck Patent Gesellschaft Mit Besschrankter haftung, Darmstadt (DE)

( * ) Notice: Subject to any disclaimer, the term of this patent is extended or adjusted under 35 U.S.C. 154(b) by 417 days.

(21) Appl. No.: 10/888,501

(22) Filed: Jul. 12, 2004

(65) Prior Publication Data

US 2005/0067605 A1 Mar. 31, 2005

(30) Foreign Application Priority Data

Jul. 11, 2003 (DE) ................ 103 31 722

(51) Int. Cl.
*C09K 19/34* (2006.01)
*C09K 19/12* (2006.01)
*C09K 19/00* (2006.01)
*G03C 1/76* (2006.01)
*G03C 1/492* (2006.01)

(52) U.S. Cl. ............ 252/299.61; 252/299.66; 428/1.1; 430/270.1

(58) Field of Classification Search ........ 252/299.61, 252/299.66; 428/1.1; 430/270.1
See application file for complete search history.

(56) References Cited

U.S. PATENT DOCUMENTS

2006/0289829 A1* 12/2006 Kirsch et al. .......... 252/299.61

* cited by examiner

*Primary Examiner*—Geraldina Visconti
(74) *Attorney, Agent, or Firm*—Millen, White, Zelano & Branigan, P.C.

(57) ABSTRACT

The present invention relates to switchable components for high-frequency technology, in particular microwave technology, which use liquid-crystalline dielectrics, to the liquid-crystal materials, to the use thereof, and to a process for the production of the components, for their operation and for improving their characteristics.

23 Claims, 1 Drawing Sheet

COMPONENTS FOR HIGH-FREQUENCY TECHNOLOGY

PRESENT INVENTION

The present invention relates to components for high-frequency technology or for ultrahigh-frequency technology, in particular microwave components. It very particularly relates to controllable components, preferably microwave components, which use liquid crystals, preferably nematic liquid crystals, as controllable dielectrics. Particular preference is given to passively controllable components. In addition, the present invention relates to the liquid-crystal materials used in these components, and to the use thereof in the components, and to a process for increasing the quality of the components.

TECHNICAL FIELD

Analogous passively controllable microwave components can be achieved with the aid of nonlinear dielectrics. Nonlinear dielectrics are materials whose dielectric constant $\epsilon_r$ is highly dependent on the effective electric field strength in the material. The internal electric polarisation can be modified as a function of an external electric field or an applied electric voltage.

Major research efforts have been made for a considerable time in the area of integration of passively controllable microwave components with ferroelectrics [Wol1]. In the present application, the references, as above, are indicated in abbreviated form. The abbreviations used are tabulated separately.

To date, use has usually been made of epitactic thin-film technology on single-crystal substrate materials, such as MgO or LaAlO$_3$ [Cha2], [Gev6], [Sen3], [Var2], [Yor1]. The research efforts have been directed firstly at optimisation of thin films applied to high-purity, single-crystal substrates by means of chemical (for example MOCVD) or physical (for example PLD) processes or the RF sputtering technique, and secondly at the implementation and optimisation of controllable microwave components, such as varactors and phase shifters for phase-controlled antennae, in terms of circuit engineering [Aci1], [Aci2], [Bab1], [Car3], [DeF1], [Erk1], [Kir1], [Koz1], [Liu1], [Rao1], [Rom1], [Rom2], [Sen5], [She1], [Sub3], [Sub4], [Van3], [Var1], [Var3], [Wil1].

Using high-purity Ba$_x$Sr$_{1-x}$TiO$_3$ (BST) thin films on MgO substrates, [Car3] demonstrated a phase shifter quality (also known as figure of merit, "FoM") of between about 30°/dB and 45°/dB at 31.34 GHz and at room temperature. The FoM is defined as the quotient of the differential phase shift with and without control voltage with respect to the insertion losses of the component. With coplanar "loaded-line" phase shifters using interdigital capacitors and plate capacitors with BST thin films, even phase shifter qualities of from 50°/dB to 80°/dB have been achieved in the X band (frequency range around 10 GHz) [Aci1], [Aci2].

Other approaches concentrate primarily on thick, finely particulate ceramic layers of ferroelectric material systems in combination with high-purity Al$_2$O$_3$ substrates. Material systems for room-temperature applications, such as Ba$_x$Sr$_{1-x}$TiO$_3$ and BaZr$_y$Ti$_{1-y}$O$_3$, are to the fore here. Uniplanar circuits with components such as interdigital capacitors and coplanar lines are used in this connection. With the coplanar line arrangement presented in [Weil3] on a thin ferroelectric layer, a phase shifter quality of 28°/dB at 24 GHz and a control voltage of about 300 V (control field strength 10 V/μm) has been achieved. The main loss mechanism which contributes to the reduction in the phase shifter quality involves dielectric losses of the ferroelectric layer.

As an alternative to the ferroelectrics, there are publications of components which employ liquid crystals (LCs) as controllable dielectric. Liquid crystals are used primarily in optical liquid-crystal displays (LCDs) [Fin1], optical switches or amplitude modulators [Chi1]. The effect of the anisotropy of the optical refractive index (birefringence) is utilised here. However, the anisotropy of the liquid crystal also relates to the dielectric properties, where the microwave behaviour of nematic LCs still is barely investigated. To date, however, in particular the anisotropy in the high-frequency range or microwave range and the corresponding losses are still substantially unknown compared with the optical properties.

A typical microwave application that is used is the concept of the inverted microstrip line [Gup2], for example in [Dol1], [Mar1], [Weil1], [Weil2], together with the commercial liquid crystal K15 from Merck KGaA. [Weil2] thus achieve phase shifter qualities of 12°/dB at 10 GHz with a control voltage of about 40 V. The LC insertion losses, i.e. the losses caused only by the polarisation losses in the liquid crystal, are quoted in [Weil1] as from approximately 1 to 2 dB at 10 GHz. In addition, it has been determined that the phase shifter losses are determined primarily by the dielectric LC losses and the losses at the waveguide transitions used therein. [Kuk1] and [Kuk2] also mention the use of polymerised LC films and dual-frequency switching-mode liquid crystals in combination with planar phase shifter arrangements.

OBJECT OF THE PRESENT INVENTION

Comparison of the known liquid-crystal phase shifters with phase shifters based on thick, solid ferroelectric layers or thin films shows that the latter have a phase shifter quality which is lower by a factor of from two to seven and are thus virtually unusable for applications in microwave technology. The low quality is attributed in [Weil1] primarily to the comparatively low dielectric controllability of the individual liquid-crystalline compound pentylcyanobiphenyl (5CB for short, referred to as K15 in the present application). There is thus a demand for liquid-crystal materials having increased addressability.

Since the LC K15 has totally inadequate microwave properties, special liquid-crystal compounds and complex liquid-crystal mixtures have been analysed with respect to their suitability for applications in the high-frequency region, in particular their anisotropy and losses in the microwave region at 8.3 . . . 8.75 GHz. The investigations and their results are described below.

DESCRIPTION OF THE INTERFERING-BODY MEASUREMENT METHOD USED

The resonator selected for the interfering-body measurements is a cylinder resonator. The construction consists of three parts, a hollow cylinder and the lid and base which terminate the cylinder at the top and bottom. The material is brass, and the inside of the three parts has been silver-plated and polished in order to keep the wall losses of the resonator as low as possible and thus to achieve high quality. The base and lid plates are each connected to the wall of the hollow cylinder by means of 4 screws.

Since the dielectric material parameters of the measurement samples to be investigated are to be determined in the GHz range, the following internal dimensions were selected for the resonator:

Radius a≈13 mm

Height h≈20 mm

Input to and output from the resonator take place at two opposite, vertical coupling loops which are mounted with the aid of a hole drilled centrally through the cylinder wall. The ends of the coupling loops are each connected to an internal conductor of a 3.5 mm SMA socket and to the cylinder wall. This vertical coupling loop can be used to excite, inter alia, the $TM_{010}$ mode (see field line diagram FIG. 1).

With these dimensions, a resonance frequency of about 8.75 GHz arises for the $TM_{010}$ mode for the empty resonator. Since this mode is the base mode, it can easily be identified in the measurements through the fact that it is the mode with the lowest resonance frequency. The course of the resonance curves of the various modes for the empty resonator is investigated in the range 1-26 GHz. The $TM_{010}$ mode is the first resonance characterised.

Liquid crystals have a dielectric anisotropy. Owing to their structure, various permittivities prevail, dependent on the angle between the microwave field and the director of the liquid-crystal molecules. Parallelism between microwave field and director is denoted below by ∥ and orthogonality by ⊥. The director of liquid-crystal molecules can be influenced using direct electric or magnetic fields. For alignment of the director, a direct magnetic field was used here. For determination of the complete alignment, measurements were carried out with various field strengths. If the measurements achieve a saturation value, it can be assumed that complete alignment of the molecules predominates. For a parallel director, the mode picture of the $TM_{010}$ mode means that a direct magnetic field is applied from the base plate to the lid plate. For a perpendicular director, a direct field is applied from one wall of the cylinder jacket to the opposite wall. To this end, a coil with a yoke was used. Through respective arrangement of the coil around the cylinder resonator (horizontally for parallel; vertically for perpendicular), the director alignments just described were set.

For determination of the complex permittivity, measurement of the resonance curve is preferred. To this end, a Hewlett Packard HP 8510B network analyser is used.

The network analyser measures the transmission factor at—up to 801—discrete supporting points over the frequency range set.

FIG. 1 shows the side cross section of the resonator with the centered material sample.

3.5 mm SMA sockets are screwed onto the cylinder resonator on opposite sides. Thin silver wires are attached to the internal conductor of a 3.5 mm SMA socket and connected to the inside wall of the cylinder. This ensures that the $TM_{010}$ mode to be observed is excited.

The material sample is introduced into the center of the resonator. This material sample slightly changes the resonance frequency compared with the measurement without material sample. The material parameters $\epsilon_r$ and $\tan\delta$ can be calculated from these measurements.

For measurement of the liquid crystals, a Teflon tube was filled with the liquid crystal to be investigated and introduced into the cylinder resonator. In order to increase the accuracy of the measurement, the samples should be as thin as possible in order that the field of the resonator is not modified excessively and the max. E field can be assumed to be constant within the sample. However, the Teflon tubes cannot be chosen as thin as desired. Firstly, mechanical manufacturing tolerances limit the ability of the tubes to be produced as thin as desired, and secondly the tubes preferably have a minimum diameter in order to remain standing and not tip over in the resonator.

The Teflon tube used was produced with the following dimensions:

External radius b=3 mm; wall and base thickness d=0.2 mm

Height h=20 mm =resonator height.

With this diameter of the Teflon tubes, it is ensured that a ratio of the two radii $$\frac{\text{resonator radius}}{\text{sample radius}} \leq 0.11$$

is not exceeded.

For each measurement, the Teflon tube is placed vertically in the resonator.

Preferably, the sample material is in the center of the resonator (at the maximum of the E field) and also does not fall over during the measurement due to vibrations. In order to place the material sample as accurately as possible in the center for the measurements, a plastic template was made especially for this purpose. This plastic template has a stop, so that the template only fits in the resonator in one position. In the center is a hole which is sufficiently large that the Teflon tube fits through precisely. After careful withdrawal of the template, the Teflon tube remains standing in the center.

The resonator is then closed.

Since only the $TM_{010}$ mode is evaluated in the measurement, it is preferable to set the measurement range so that at least the −3 dB band width of the $TM_{010}$ mode can be measured. For adequate resolution of the resonance, however, the frequency range preferably is not selected much greater than 5 times the band width of the $TM_{010}$ mode.

During measurement of the S parameters using the network analyser, systematic errors can occur due to the supply lines and line connections. The supply lines can considerably influence the measurement due to their attenuation. For this reason, calibration should be carried out before each measurement.

In a calibration measurement, the test object is replaced by so-called reference objects (standards) whose behaviour is clearly known. The reference objects are 3 defined components:

short circuit, open terminal and defined terminal (50 ohm), respectively.

The network analyser calculates the error correction coefficients from the difference between the measured and known behaviour of these standards.

Furthermore, transmission measurements of the two mutually connected supply lines are carried out for calibration.

Calibration should be carried out each time a new frequency range is set on the network analyser.

In order to be able to assess the accuracy of a measurement method, it is vital to estimate its errors.

The errors in measurements are divided into accidental errors and systematic errors.

It is usually not possible to measure the desired quantity directly, but instead a function $f=f(x, y, \ldots)$ of other measurable quantities $x, y, \ldots$ and is thus calculated from these.

The desired quantities in the measurements carried out are $\epsilon'$, and $\tan \delta_\epsilon$, which are functions of different measurable quantities in the analytical equations (1) to (3).

In order to determine the material parameters, the following formulae are used according to [Par]:

$$\varepsilon'_r = 0.539 \cdot \left(\frac{a}{b}\right)^2 \cdot \left(\frac{f_{r,1} - f_{r,2}}{f_{r,2}}\right) + 1 \tag{1}$$

$$\varepsilon''_r = 0.2695 \cdot \left(\frac{a}{b}\right)^2 \cdot \left(\frac{1}{Q_{L2}} - \frac{1}{Q_{L1}}\right) \tag{2}$$

$$\tan \delta_\varepsilon = \tag{3}$$

$$\frac{\varepsilon''_r}{\varepsilon'_r} = \frac{0.2695}{\varepsilon'_r} \cdot \left(\frac{a}{b}\right)^2 \cdot \left(\frac{1}{Q_{L2}} - \frac{1}{Q_{L1}}\right) = \frac{0.2695\left(\frac{1}{Q_{L2}} - \frac{1}{Q_{L1}}\right)}{0.539\left(\frac{f_{r,1} - f_{r,2}}{f_{r,2}}\right) + \left(\frac{b}{a}\right)^2}$$

For extraction of the dielectric parameters of the liquid crystals in the Teflon tube, the formulae preferably is modified for extraction, with the measured values ($\epsilon'$, $\epsilon''$) being interpreted as effective values (equation (4)).

Owing to the very small volume of the base of the Teflon sleeve, its influence on the calculation formulae was neglected. The Teflon wall and the liquid introduced were considered as a parallel connection of two axially layered dielectrics.

The splitting of two dielectric materials connected in parallel, which are located in a constant E field, takes place in accordance with the following equations, which were obtained from the equation for parallel connection of capacitors:

$$\varepsilon_r A_r \to \varepsilon_{eff} A_{tot} = \varepsilon_1 A_1 + \varepsilon_2 A_2 \text{ with} \tag{4}$$

$$\frac{A_1}{A_{tot}} = K_1 \text{ and } \frac{A_2}{A_{tot}} = K_2 \text{ gives}$$

$$\varepsilon'_{eff} - j\varepsilon''_{eff} = (\varepsilon'_1 K_1 + \varepsilon'_2 K_2) - j(\varepsilon''_1 K_1 + \varepsilon''_2 K_2) \tag{5}$$

Separated by real and imaginary parts, resolution to $\epsilon_1'$ and $\epsilon_1''$ gives:

$$\varepsilon'_1 = \frac{\varepsilon'_{eff} - \varepsilon'_2 K_2}{K_1} \text{ and } \varepsilon''_1 = \frac{\varepsilon''_{eff} - \varepsilon''_2 K_2}{K_1} \tag{6}$$

$$\tan \delta_{\varepsilon_1} = \frac{\varepsilon''_1}{\varepsilon'_1} = \frac{\varepsilon''_{eff} - \varepsilon''_2 K_2}{\varepsilon'_{eff} - \varepsilon'_2 K_2} \tag{7}$$

where $\epsilon_2'$ and $\epsilon_2''$ are the material constants for the Teflon tube (known) and $\epsilon_1'$ and $\epsilon_1''$ are those of the liquid introduced (sought).

$A_1$ is the cylinder base area of the liquid column: $(b-d)^2 \cdot \pi$ $A_2$ is the circular base area of the Teflon sleeve: $(b^2 - (b-d)^2) \cdot \pi$ $A_{tot}$ is the total base area of the cylindrical tube: $b^2 \pi$ During the measurements, the liquids were introduced into the Teflon tube using a glass pipette, where preferably no air bubbles are included in the tube. Precise centering of the sample in the resonator is also preferred.

For the material constants for the Teflon sleeve, the literature value from [Riz] was used:

$\epsilon_r' = 2.05;$ $\tan \delta_\epsilon = 0.00015$

In order to be able to estimate the size of the maximum error limits, the maximum error consideration (complete differential) should be used for further error calculation of the measurement results. The formula for the worst-case or maximum error is:

$$\Delta f = \pm \left(\left|\frac{\partial f}{\partial x}\right| \Delta x + \left|\frac{\partial f}{\partial y}\right| \Delta y + \ldots\right) \tag{8}$$

where $\Delta f$ is the maximum error; $x, y, \ldots$ are the quantities afflicted with errors, and $\Delta x, \Delta y, \ldots$ are the deviations of the quantities $x, y, \ldots$ Use of this formula for determining the maximum error in equations (2) and (3) gives the following expressions:

$$\varepsilon'_r = 0.539 \cdot \left(\frac{a}{b}\right)^2 \cdot \left(\frac{f_{r,1} - f_{r,2}}{f_{r,2}}\right) + 1 \tag{9}$$

$$\Delta \varepsilon'_r = \left|\frac{\partial \varepsilon'_r}{\partial a}\right| \Delta a + \left|\frac{\partial \varepsilon'_r}{\partial b}\right| \Delta b + \left|\frac{\partial \varepsilon'_r}{\partial f_{r,1}}\right| \Delta f_{r,1} + \left|\frac{\partial \varepsilon'_r}{\partial f_{r,2}}\right| \Delta f_{r,2} \tag{10}$$

$$\Delta \varepsilon'_r = \left|0.539\left(\frac{f_{r,1} - f_{r,2}}{f_{r,2}}\right)\frac{2a}{b^2}\right| \Delta a + \tag{11}$$

$$\left|0.539\left(\frac{f_{r,1} - f_{r,2}}{f_{r,2}}\right)\frac{(-2)a^2}{b^3}\right| \Delta b + \left|0.539\left(\frac{a}{b}\right)^2\left(\frac{1}{f_{r,2}}\right)\right| \Delta f_{r,1} + \left|0.539\left(\frac{a}{b}\right)^2(-1)\left(\frac{f_{r,1}}{f_{r,2}^2}\right)\right| \Delta f_{r,2}$$

$$\tan \delta_\varepsilon = \frac{0.2695}{\varepsilon'_r}\left(\frac{a}{b}\right)^2\left(\frac{1}{Q_{L2}} - \frac{1}{Q_{L1}}\right) \tag{12}$$

$$\Delta \tan \delta_\varepsilon = \left|\frac{\partial \tan \delta_\varepsilon}{\partial \varepsilon'_r}\right| \Delta \varepsilon'_r + \left|\frac{\partial \tan \delta_\varepsilon}{\partial a}\right| \Delta a + \tag{13}$$

$$\left|\frac{\partial \tan \delta_\varepsilon}{\partial b}\right| \Delta b + \left|\frac{\partial \tan \delta_\varepsilon}{\partial Q_{L2}}\right| \Delta Q_{L2} + \left|\frac{\partial \tan \delta_\varepsilon}{\partial Q_{L1}}\right| \Delta Q_{L1}$$

$$\Delta \tan \delta_\varepsilon = \tag{14}$$

$$\left|-\frac{0.2695}{\varepsilon'^2_r}\left(\frac{a}{b}\right)^2\left(\frac{1}{Q_{L2}} - \frac{1}{Q_{L1}}\right)\right| \Delta \varepsilon'_r + \left|\frac{2 \cdot 0.2695}{\varepsilon'_r}\frac{a}{b^2}\left(\frac{1}{Q_{L2}} - \frac{1}{Q_{L1}}\right)\right| \Delta a +$$

$$\left|\frac{(-2) \cdot 0.2695}{\varepsilon'_r}\frac{a^2}{b^3}\left(\frac{1}{Q_{L2}} - \frac{1}{Q_{L1}}\right)\right| \Delta b +$$

$$\left|\frac{-0.2695}{\varepsilon'_r}\left(\frac{a}{b}\right)^2\left(\frac{1}{Q_{L2}^2}\right)\right| \Delta Q_{L2} + \left|\frac{0.2695}{\varepsilon'_r}\left(\frac{a}{b}\right)^2\left(\frac{1}{Q_{L1}^2}\right)\right| \Delta Q_{L1}$$

Using these equations, the maximum errors of the sample investigated or the sample tube with filling investigated were determined.

DESCRIPTION OF PREFERRED EMBODIMENTS

Figure 1:
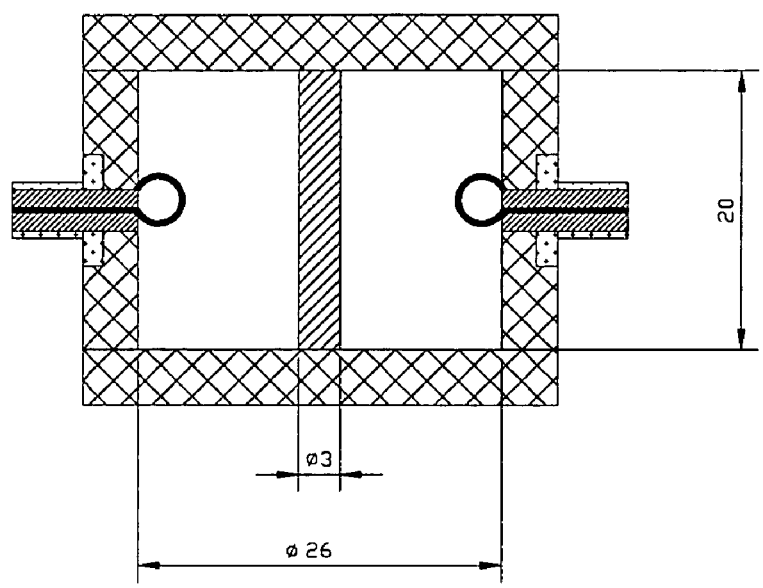
FIG. 1: Cylinder resonator having 3.5 mm SMA sockets and the material sample.

Preferred components are phase shifters, varactors, radio wave antenna arrays and others.

In the present application, unless expressly stated otherwise, the term compounds denotes both one compound and a plurality of compounds.

The liquid-crystal media according to the invention preferably have nematic phases of in each case at least from −20° C. to 80° C., preferably from −30° C. to 85° C. and very particularly preferably from −40° C. to 100° C. The phase particularly preferably extends up to 120° C. or more, preferably up to 140° C. or more and very particularly preferably up to 180° C. or more. The term "have a nematic phase" here means firstly that no smectic phase and no crystallisation are observed at the corresponding temperature at low temperatures and secondly that no clearing occurs on heating from the nematic phase. The investigation at low temperatures is carried out in a flow viscometer at the corresponding temperature and checked by storage in test cells, with a layer thickness of 5 µm, for at least 100 hours. At high temperatures, the clearing point is measured by conventional methods in capillaries.

Furthermore, the liquid-crystal media according to the invention are characterised by high optical anisotropies in the visible range. The birefringence at 589 nm is preferably 0.20 or more, particularly preferably 0.25 or more, particularly preferably 0.30 or more, particularly preferably 0.40 or more and very particularly preferably 0.45 or more. In addition, the birefringence is preferably 0.80 or less.

The liquid-crystal media according to the invention are furthermore characterosed by high optical anisotropies in the microwave range. The birefringence is, for example at about 8.3 GHz, preferably 0.14 or more, particularly preferably 0.15 or more, particularly preferably 0.20 or more, particularly preferably 0.25 or more and very particularly preferably 0.30 or more. In addition, the birefringence is preferably 0.80 or less.

The preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

The material quality $\Delta n(\text{microwaves})/\tan(\delta)$ of the preferred liquid-crystal materials is 3 or more, preferably 4 or more, preferably 5 or more, preferably 10 or more, preferably 15 or more, preferably 17 or more, particularly preferably 20 or more and very particularly preferably 25 or more.

The liquid crystals employed preferably have a positive dielectric anisotropy. This is preferably 5 or greater, preferably 10 or greater, particularly preferably 20 or greater and very particularly preferably 30 or greater.

In some embodiments, however, it is also possible advantageously to use liquid crystals having a negative dielectric anisotropy.

The liquid crystals employed are individual substances or mixtures. They preferably have a nematic phase.

The individual liquid-crystal compounds are essentially selected from the known compounds or are obtainable analogously to known compounds.

Preference is given to the use of compounds or mixtures of compounds, where the compounds generally contain two, three or four polycyclic, preferably pentaor hexacyclic, particularly preferably hexacyclic, rings. However, the compounds may also contain polycyclic rings and/or fused rings, preferably divalent naphthalenes or phenanthrenes. Particular preference is given to compounds which contain rings, preferably 1,4-phenylene rings, which are optionally mono- or polysubstituted. The rings are preferably laterally substituted by halogen (particularly F or Cl), but also by pseudohalides. The aromatic rings may optionally be heterocyclic, in particular N-heterocyclic rings, preferably divalent pyridine or pyrimidine. It is also possible to use compounds containing divalent cyclohexyl, dioxane, tetrahydropyran, thiazole, thiadiazole, oxazole and/or oxadiazole rings. At least in some compounds present in the mixtures used, a polar end group, which preferably denotes NCS, CN, SCN, NCO, halogen, preferably F or Cl, a pseudohalide, a partially or fully fluorinated alkyl, alkoxy, alkenyl or alkenyloxy group, in which, in addition, one or more, preferably generally non-adjacent, $CH_2$ groups may be replaced by O, S and/or C=O, preferably $OCF_3$, $CF_3$, and also $SF_5$ or $SO_2CF_3$, is located in at least one of the terminal positions. The other terminal position may likewise contain a substituent from the last-mentioned group of dielectrically positive substituents, but may be a dielectrically neutral group, such as, for example and preferably, alkyl, alkenyl, alkoxy, alkenyloxy or oxaalkyl, and this is also preferred.

If liquid-crystalline mixtures are used, these generally also comprise dielectrically neutral compounds, in which both ends of the molecule preferably, independently of one another, carry one of the last-mentioned dielectrically neutral groups.

The generally divalent rings of the molecules may be bonded directly to one another. However, they may also be linked by bridges. The compounds preferably contain zero, one or two, particularly preferably zero or one, bridging group. They preferably contain a bridge having an even number of bridging atoms, preferably —C=CH—, —C≡C—, —CO—O—, —O—CO—, —CF$_2$O— or —O—CF$_2$—.

The term "alkyl" preferably covers straight-chain and branched alkyl groups having from 1 to 7 carbon atoms, in particular the straight-chain groups methyl, ethyl, propyl, butyl, pentyl, hexyl and heptyl. Groups having from 2 to 5 carbon atoms are generally preferred.

The term "alkenyl" preferably covers straight-chain and branched alkenyl groups having from 2 to 7 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably covers straight-chain radicals of the formula $C_nH_{2n+1}$—O—$(CH_2)_m$, in which n and m are each, independently of one another, from 1 to 6. n is preferably 1 and m is preferably from 1 to 6.

Compounds containing a vinyl end group and compounds containing a methyl end group have low rotational viscosity.

In the present application, the term dielectrically positive compounds means compounds having a Δε of >1.5, dielectrically neutral compounds means those in which $-1.5 \leq \Delta\varepsilon \leq 1.5$, and dielectrically negative compounds means those having a Δε of <−1.5. The dielectric anisotropy of the compounds is determined here by dissolving 10% of the compounds in a liquid-crystalline host and determining the capacitance of this mixture at 1 kHz in at least one test cell with a layer thickness of about 20 μm having a homeotropic surface alignment and at least one test cell with a layer thickness of about 20 μm having a homogeneous surface alignment. The measurement voltage is typically from 0.5 V to 1.0 V, but is always less than the capacitive threshold of the respective liquid-crystal mixture.

The host mixture used for determining the applicationally relevant physical parameters is ZLI-4792 from Merck KGaA, Germany. As an exception, the determination of the dielectric anisotropy of dielectrically negative compounds is carried out using ZLI-2857, likewise from Merck KGaA, Germany. The values for the respective compound to be investigated are obtained from the change in the properties, for example the dielectric constants, of the host mixture after addition of the compound to be investigated and extrapolation to 100% of the compound employed.

The compound to be investigated is employed in a concentration of 10%. If the solubility of the compound to be investigated is inadequate for this purpose, the concentration employed is, by way of exception, halved, i.e. reduced to 5%, 2.5%, etc., until the concentration is below the solubility limit.

In the present application, high-frequency technology and ultrahigh-frequency technology denote applications with frequencies in the range from 1 MHz to 1 THz, preferably from 0.1 GHz to 500 GHz, preferably from 2 GHz to 300 GHz, particularly preferably from about 5 to 150 GHz.

All concentrations in this application, unless explicitly stated otherwise, are given in per cent by weight and relate to the corresponding mixture as a whole. All physical properties are and have been determined in accordance with "Merck Liquid Crystals, Physical Properties of Liquid Crystals", status November 1997, Merck KGaA, Germany, and apply to a temperature of 20° C., unless explicitly stated otherwise. Δn is determined at 589 nm and Δε at 1 kHz.

In the case of the liquid-crystal media of negative dielectric anisotropy, the threshold voltage was determined as the capacitive threshold $V_0$ in cells with a liquid-crystal layer aligned homeotropically by means of lecithin.

The liquid-crystal media according to the invention may, if desired, also comprise further additives and optionally also chiral dopants in the conventional amounts. The amount of these additives employed is in total from 0% to 10%, based on the amount of the mixture as a whole, preferably from 0.1% to 6%. The concentrations of the individual compounds employed are in each case preferably from 0.1 to 3%. The concentration of these and similar additives is not taken into account when indicating the concentrations and the concentration ranges of the liquid-crystal compounds in the liquid-crystal media.

The compositions consist of a plurality of compounds, preferably from 3 to 30, particularly preferably from 6 to 20 and very particularly preferably from 10 to 16, compounds, which are mixed in a conventional manner. In general, the desired amount of the components used in lesser amount is dissolved in the components making up the principal constituent, advantageously at elevated temperature. If the selected temperature is above the clearing point of the principal constituent, the completion of the dissolution process is particularly easy to observe. However, it is also possible to prepare the liquid-crystal mixtures in other conventional ways, for example using premixes or from a so-called "multibottle" system.

The examples below serve to illustrate the invention without representing a restriction. In the examples, the melting point T(C,N), the transition from the smectic (S) phase to the nematic (N) phase T(S,N) and the clearing point T(N,I) of a liquid-crystal substance are indicated in degrees Celsius. The various smectic phases are characterised by corresponding suffixes.

The percentages above and below are, unless explicitly noted otherwise, per cent by weight, and the physical properties are the values at 20° C., unless explicitly stated otherwise.

All the temperature values indicated in this application are ° C., and all temperature differences are correspondingly differential degrees, unless explicitly stated otherwise.

In the present application and in the examples below, the structures of the liquid-crystal compounds are indicated by means of abbreviations, also referred to as acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is indicated. In individual cases, the acronym for the parent structure is followed, separated by a hyphen, by a code for the substituents $R^1$, $R^2$, $L^1$, $L^2$ and $L^3$:

TABLE A

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| nmFF | $C_nH_{2n+1}$ | $C_mH_{2m+1}$ | F | H | F |
| nOmFF | $C_nH_{2n+1}$ | $OC_mH_{2m+1}$ | F | H | F |
| nO.mFF | $OC_nH_{2n+1}$ | $C_mH_{2m+1}$ | F | H | F |
| nO.OmFF | $OC_nH_{2n+1}$ | $OC_mH_{2m+1}$ | F | H | F |
| n | $C_nH_{2n+1}$ | CN | H | H | H |
| nN.F | $C_nH_{2n+1}$ | CN | F | H | H |
| nN.F.F | $C_nH_{2n+1}$ | CN | F | F | H |
| nF | $C_nH_{2n+1}$ | F | H | H | H |
| nF.F | $C_nH_{2n+1}$ | F | F | H | H |
| nF.F.F | $C_nH_{2n+1}$ | F | F | F | H |
| nCl | $C_nH_{2n+1}$ | Cl | H | H | H |
| nCl.F | $C_nH_{2n+1}$ | Cl | F | H | H |
| nCl.F.F | $C_nH_{2n+1}$ | Cl | F | F | H |
| nmF | $C_nH_{2n+1}$ | $C_mH_{2m+1}$ | F | H | H |
| nCF$_3$ | $C_nH_{2n+1}$ | CF$_3$ | H | H | H |
| nOCF$_3$ | $C_nH_{2n+1}$ | OCF$_3$ | H | H | H |
| nOCF$_3$.F | $C_nH_{2n+1}$ | OCF$_3$ | F | H | H |
| nOCF$_3$.F.F | $C_nH_{2n+1}$ | OCF$_3$ | F | F | H |
| nOCF$_2$ | $C_nH_{2n+1}$ | OCHF$_2$ | H | H | H |
| nOCF$_2$.F.F | $C_nH_{2n+1}$ | OCHF$_2$ | F | F | H |
| nS | $C_nH_{2n+1}$ | NCS | H | H | H |
| rVsN | $C_rH_{2r+1}$—CH=CH—$C_sH_{2s}$— | CN | H | H | H |
| nEsN | $C_rH_{2r+1}$—O—$C_sH_{2s}$— | CN | H | H | H |
| nAm | $C_nH_{2n+1}$ | COOC$_m$H$_{2m+1}$ | H | H | H |
| nF.Cl | $C_nH_{2n+1}$ | F | Cl | H | H |
| nS | $C_nH_{2n+1}$ | NCS | H | H | H |
| nS.F | $C_nH_{2n+1}$ | NCS | F | H | H |
| nS.F.F | $C_nH_{2n+1}$ | NCS | F | F | H |

TABLE B
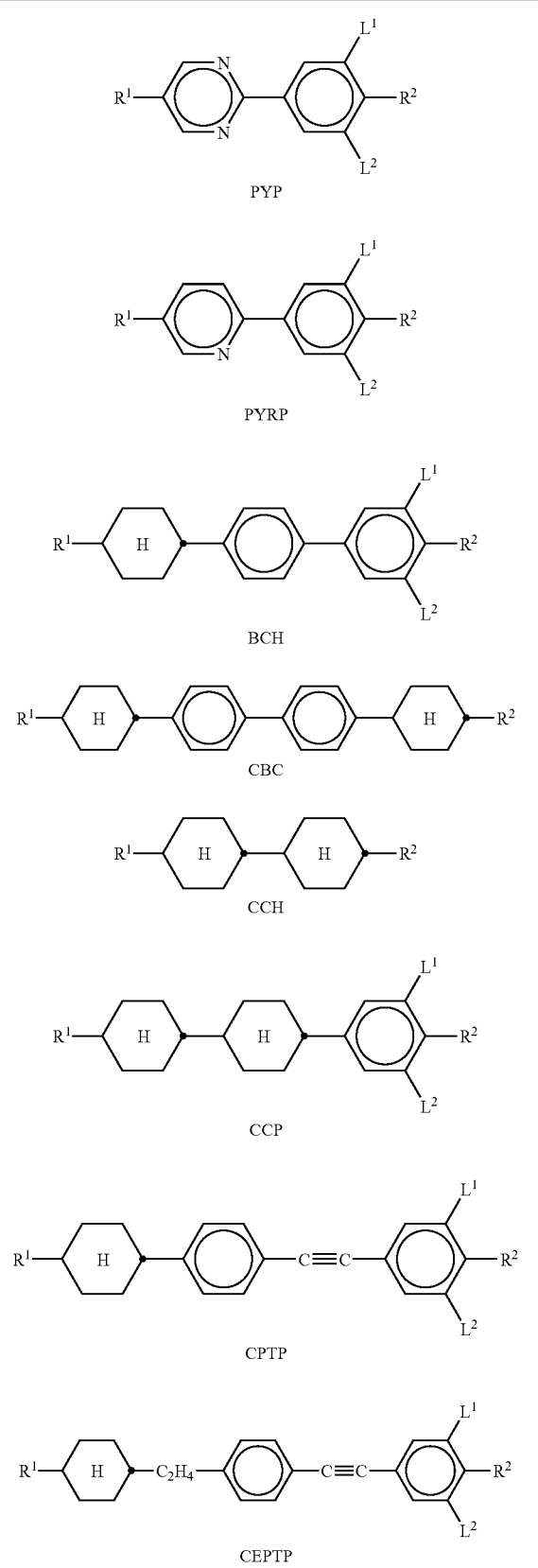
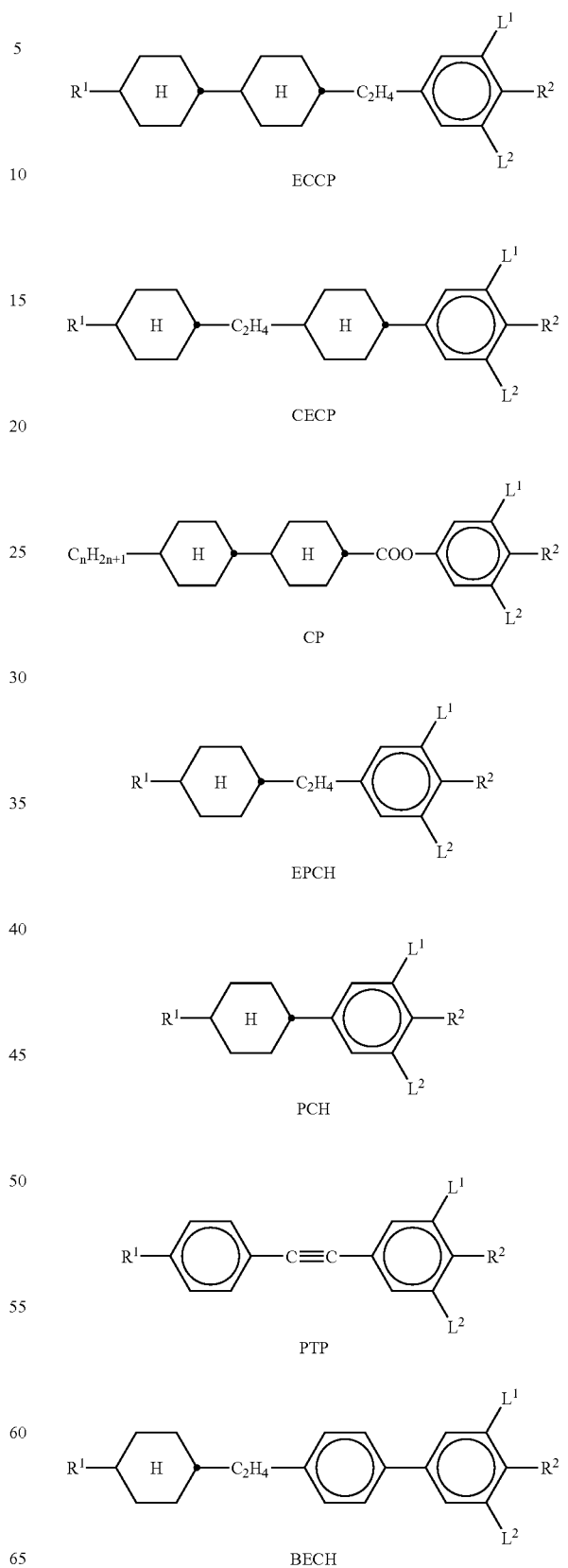

TABLE B-continued
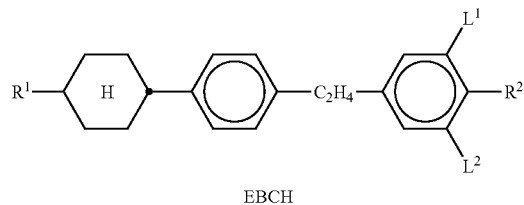
EBCH
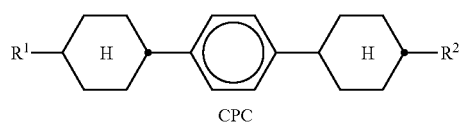
CPC
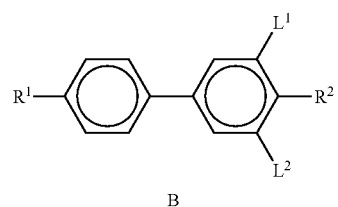
B
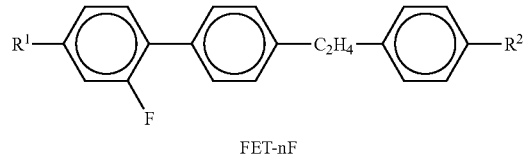
FET-nF
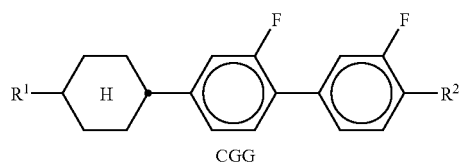
CGG
TABLE B-continued
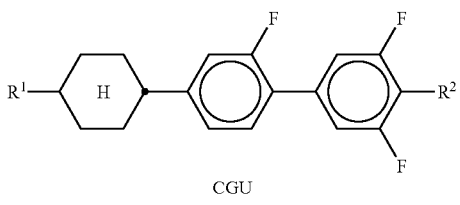
CGU
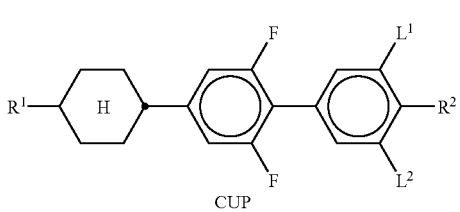
CUP
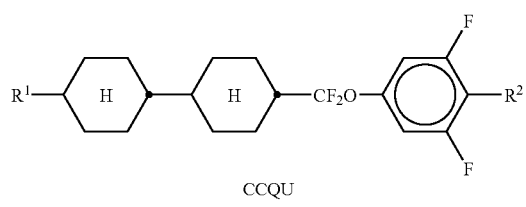
CCQU
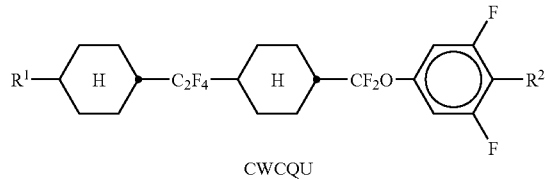
CWCQU
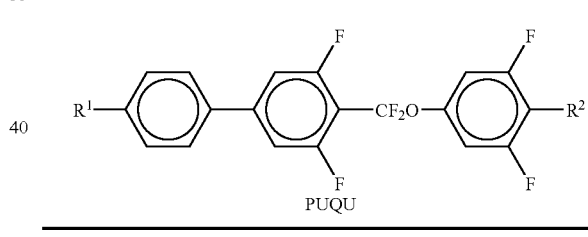
PUQU
TABLE C
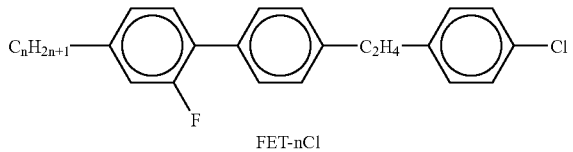
FET-nCl
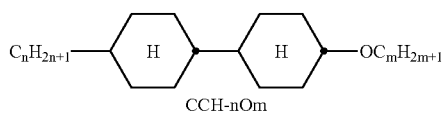
CCH-nOm
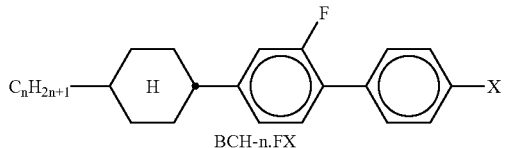
BCH-n.FX TABLE C-continued
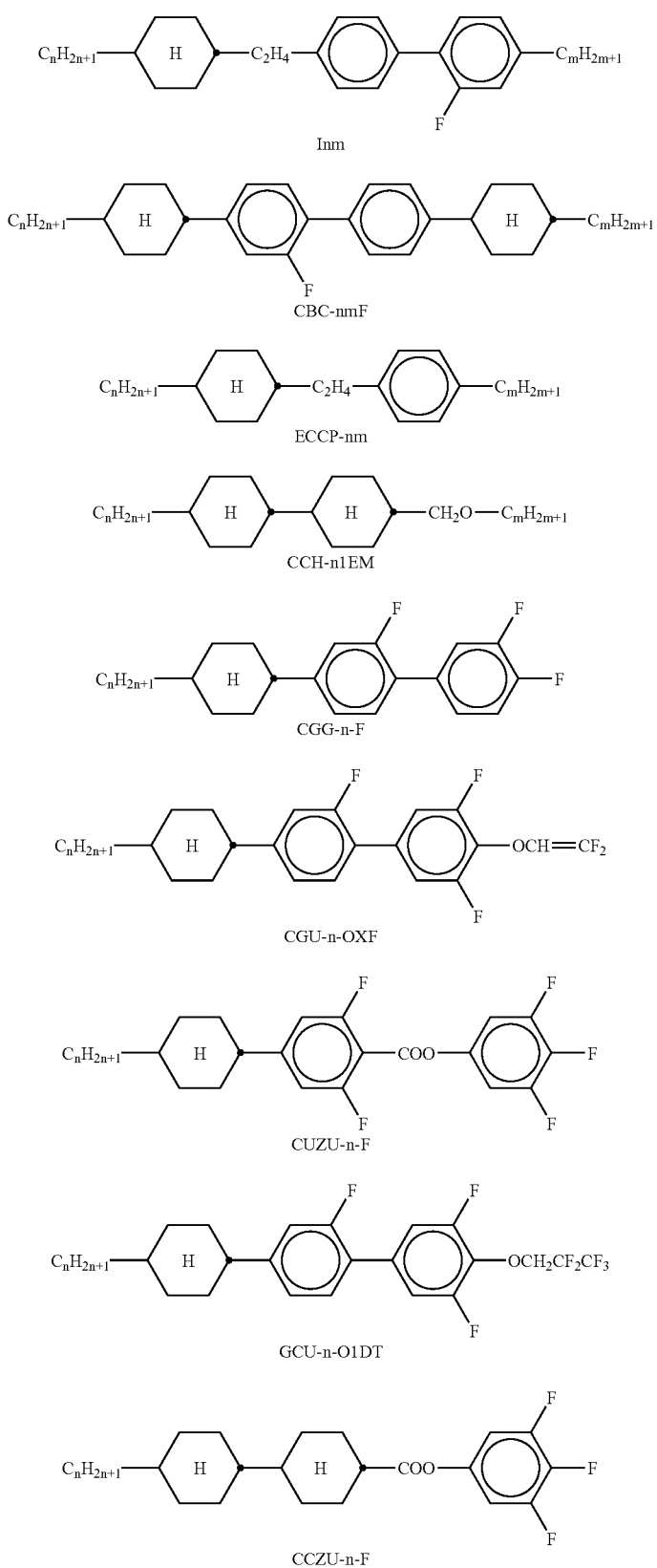

TABLE C-continued
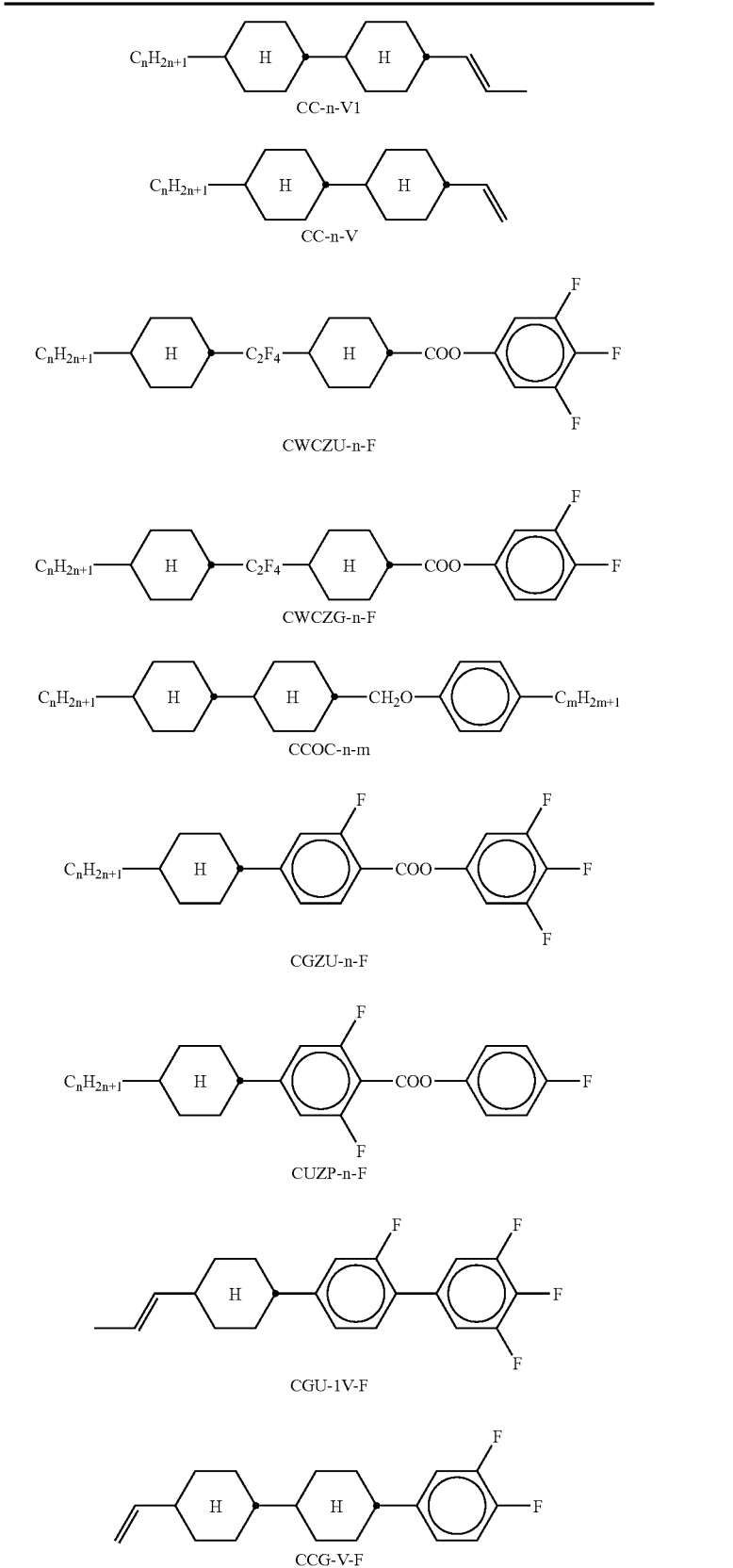

TABLE C-continued
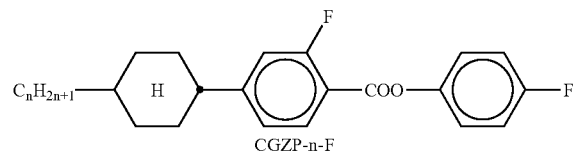
CGZP-n-F
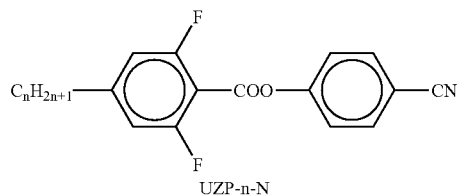
UZP-n-N
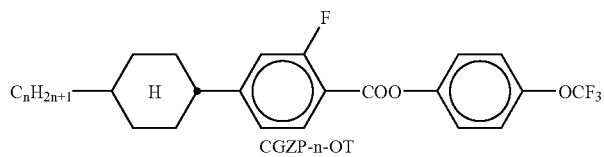
CGZP-n-OT
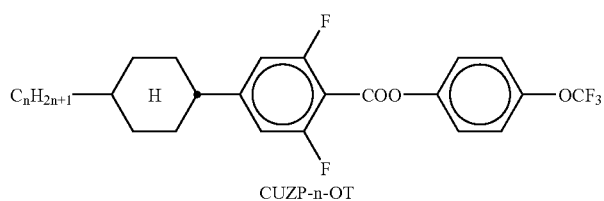
CUZP-n-OT
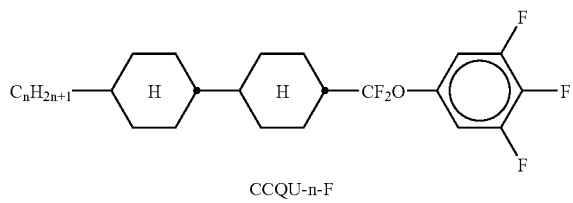
CCQU-n-F
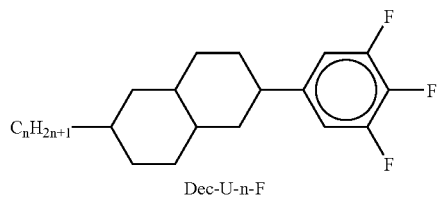
Dec-U-n-F
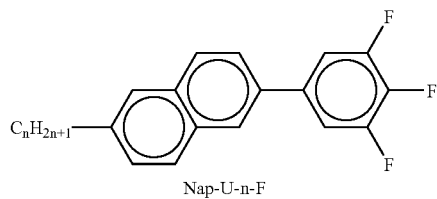
Nap-U-n-F
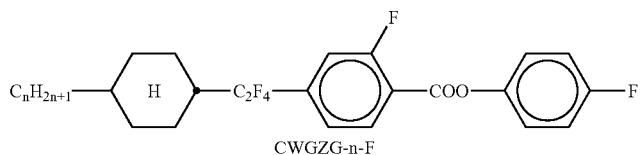
CWGZG-n-F TABLE C-continued
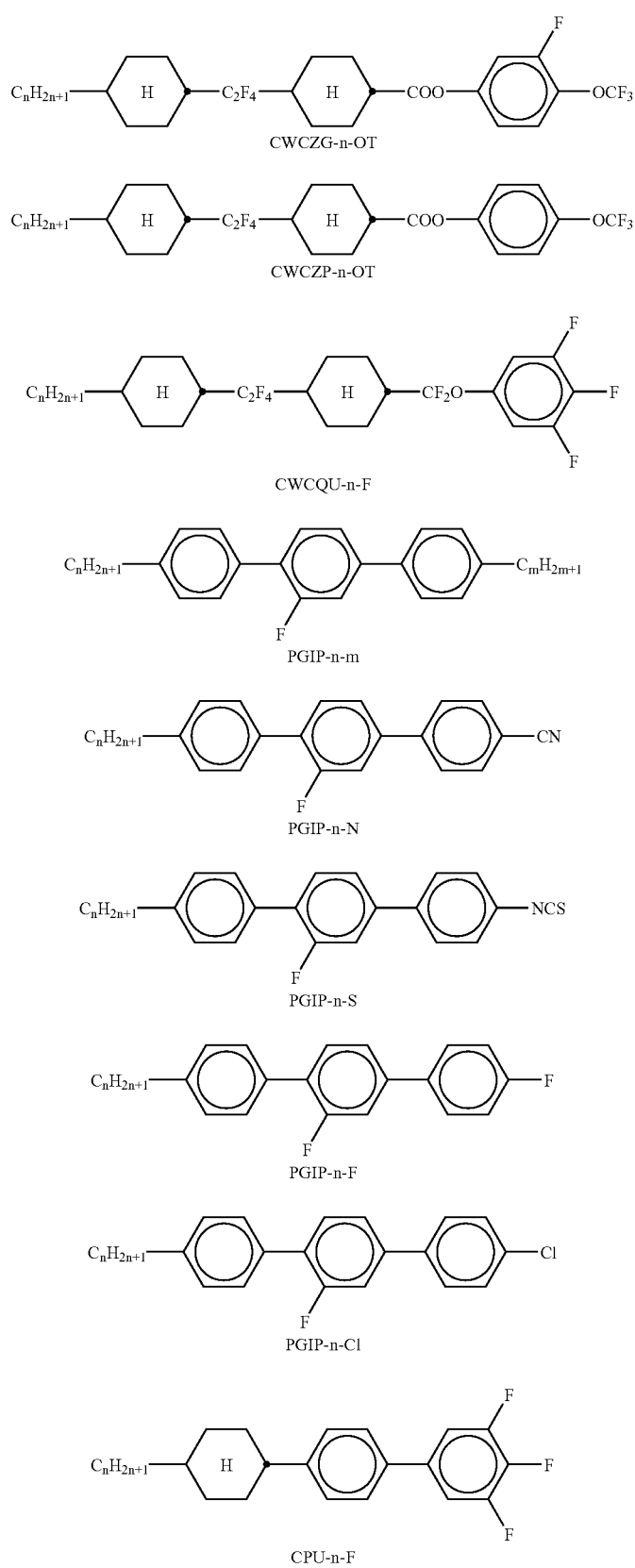

TABLE C-continued
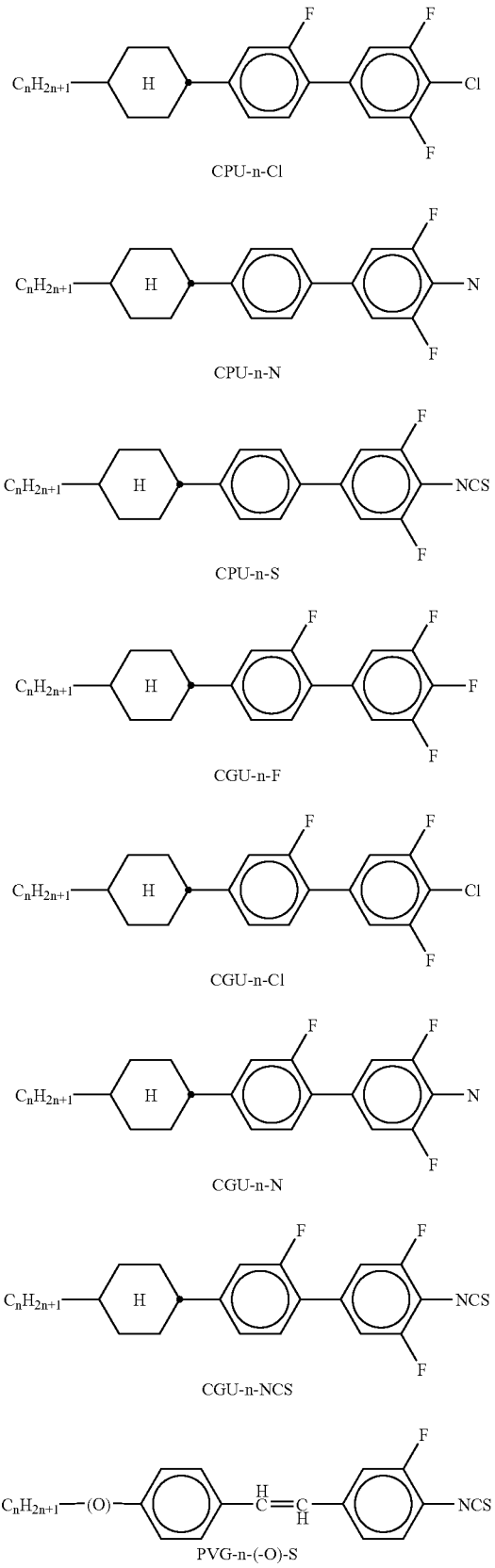

TABLE C-continued
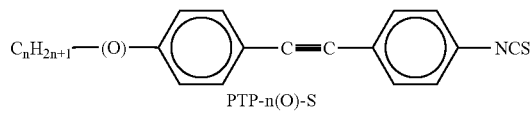
PTP-n(O)-S
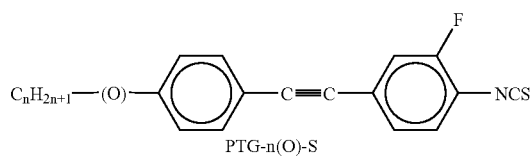
PTG-n(O)-S
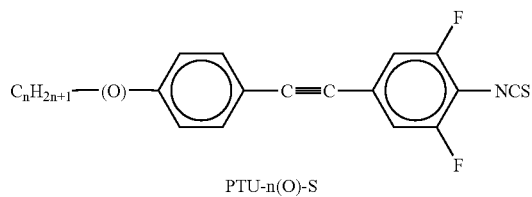
PTU-n(O)-S
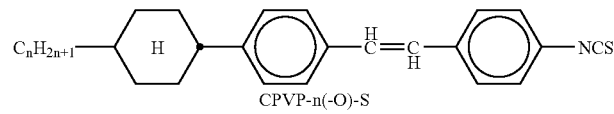
CPVP-n(-O)-S
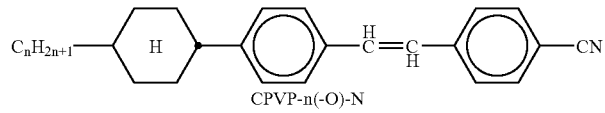
CPVP-n(-O)-N
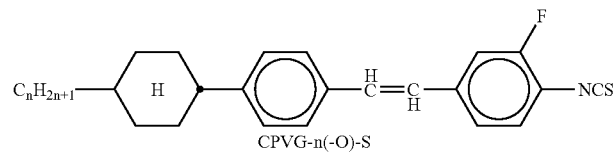
CPVG-n(-O)-S
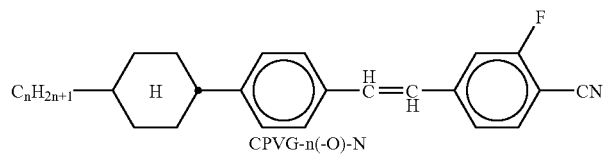
CPVG-n(-O)-N
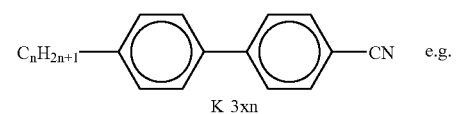
K 3xn   e.g.
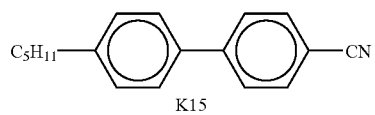
K15
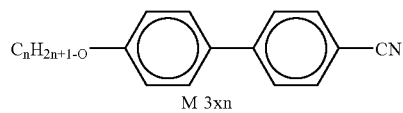
M 3xn
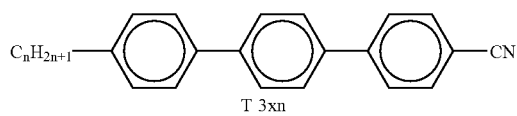
T 3xn TABLE C-continued
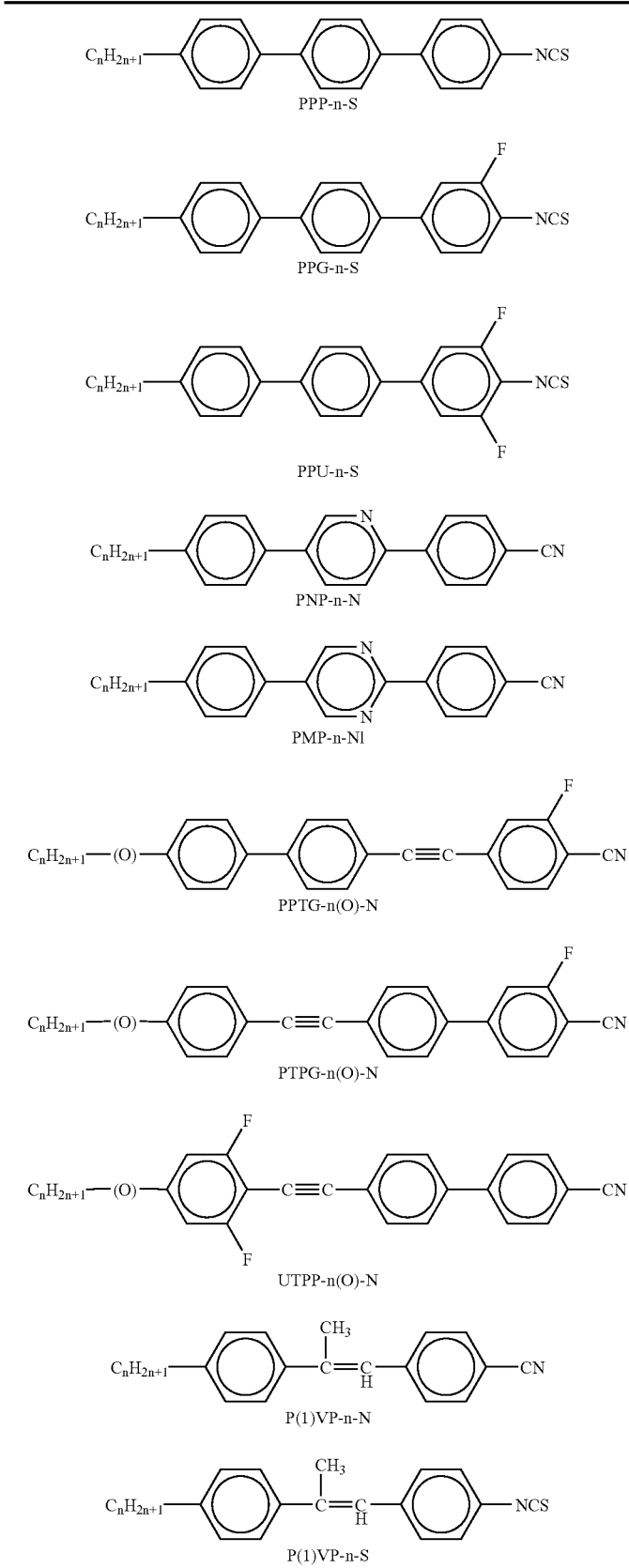

TABLE C-continued
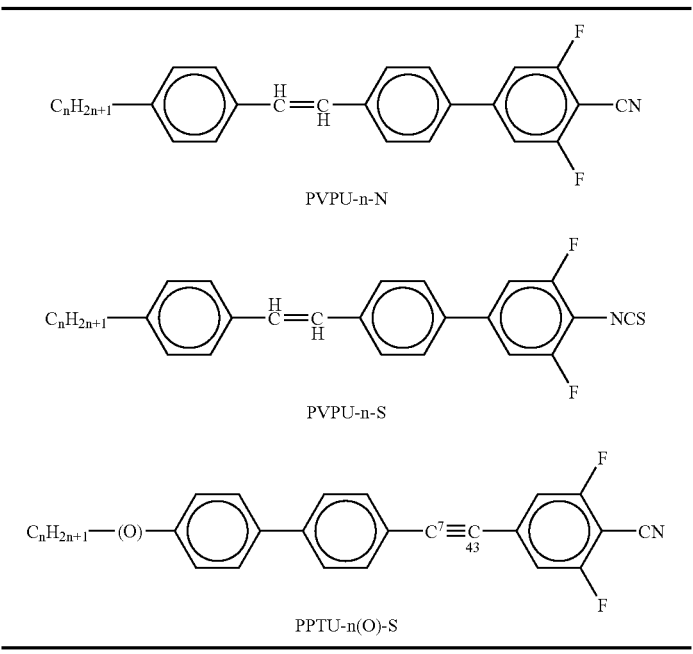
Table C shows possible dopants which are generally added to the mixtures according to the invention.
TABLE D
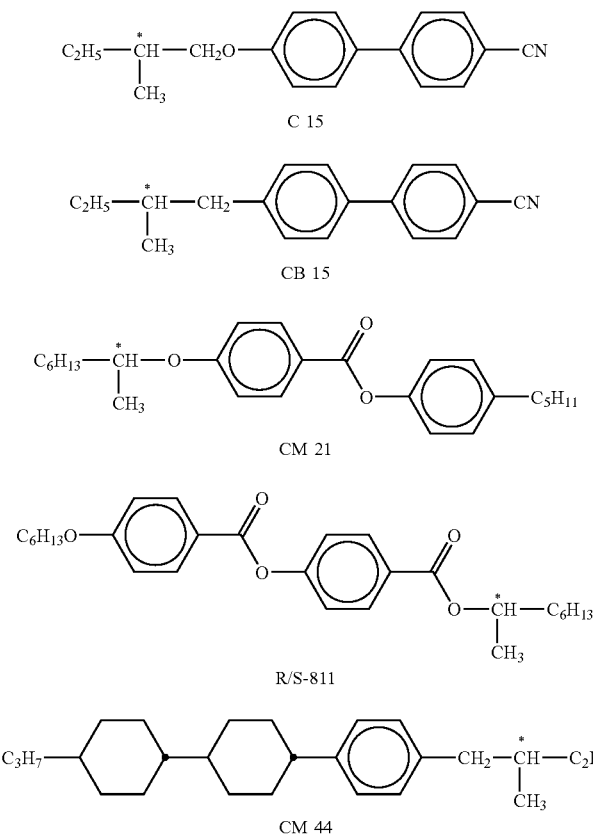

TABLE D-continued
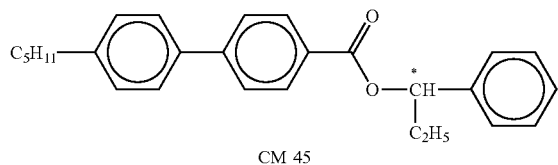
CM 45
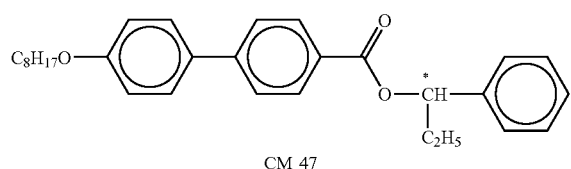
CM 47
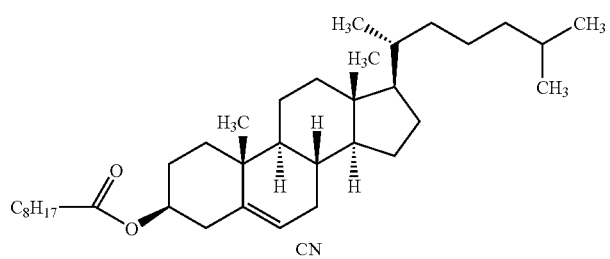
CN
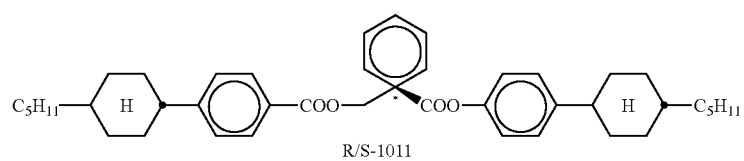
R/S-1011
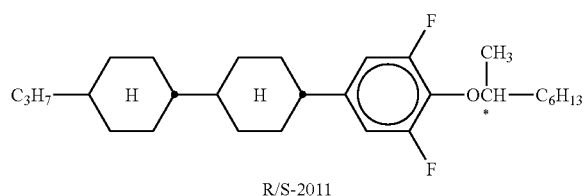
R/S-2011
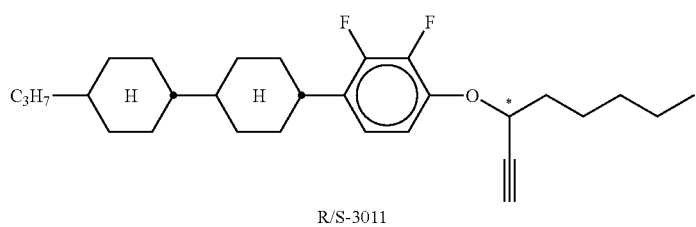
R/S-3011
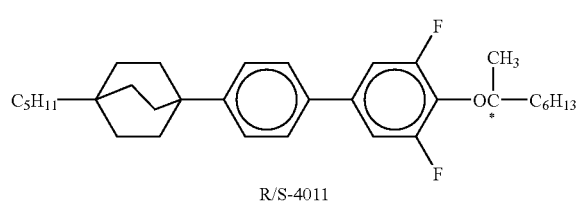
R/S-4011

Stabilisers which can be added, for example, to the mixtures according to the invention are shown below.
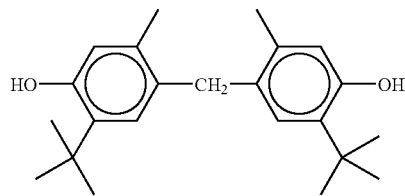 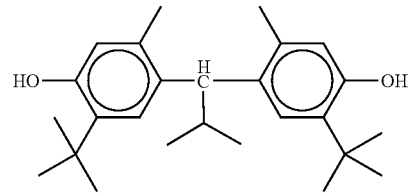
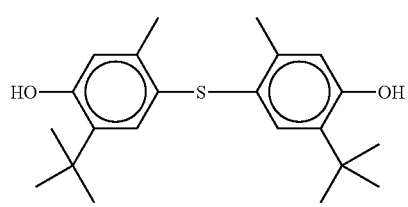 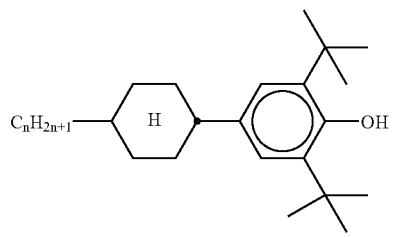
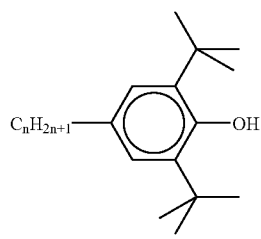 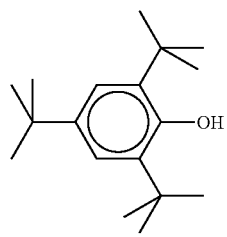 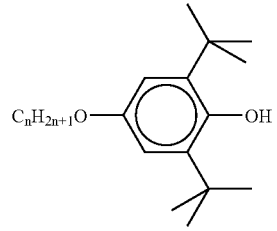
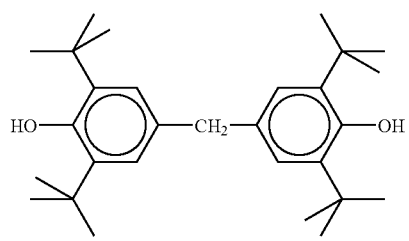 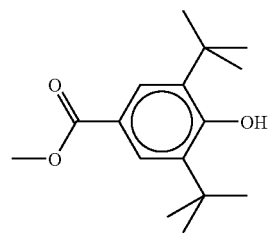
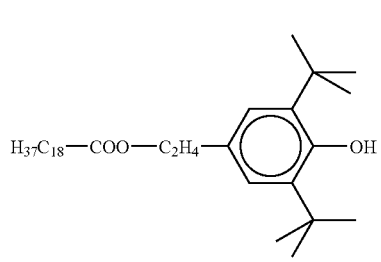 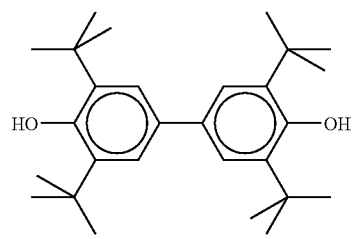

-continued
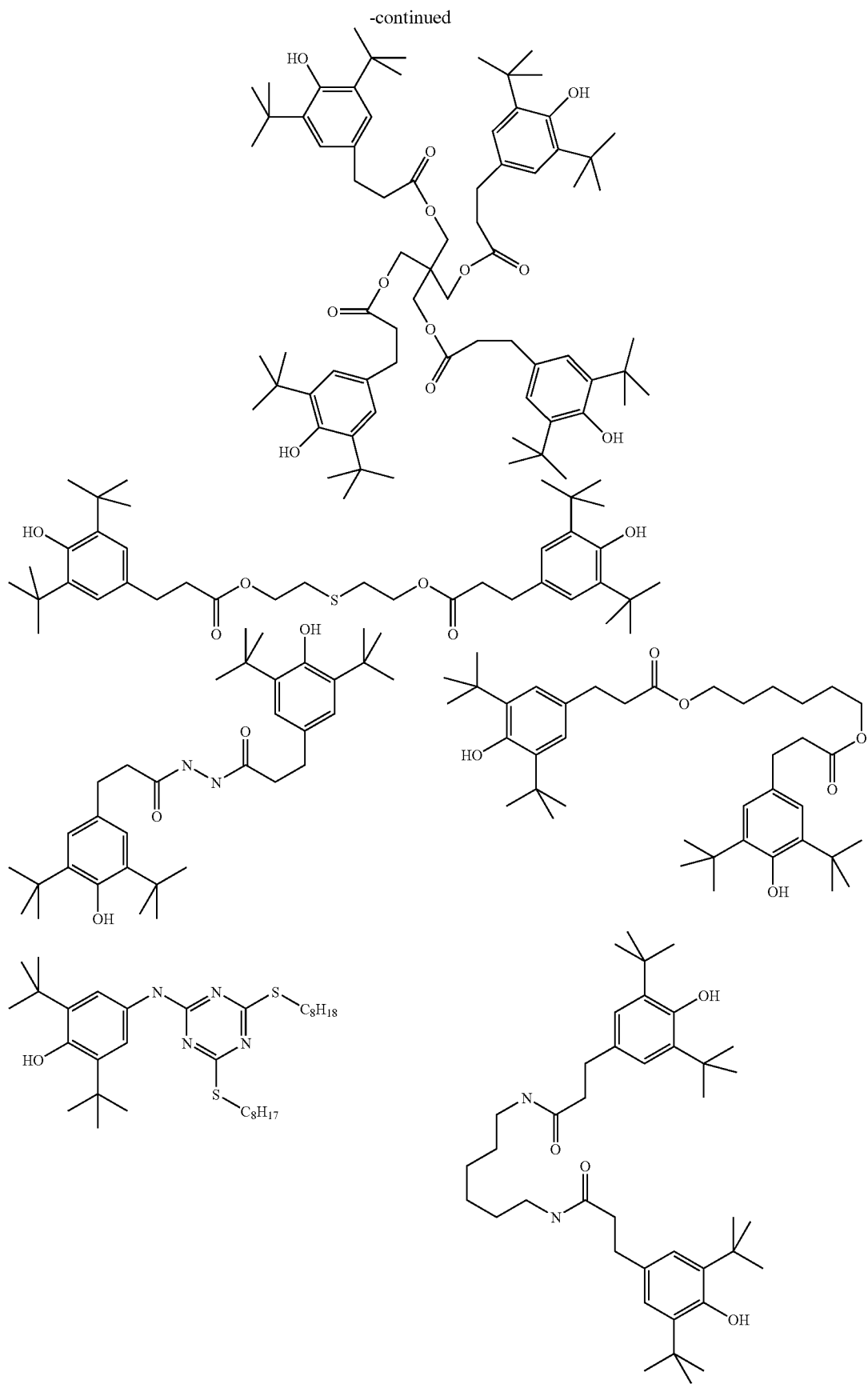

-continued
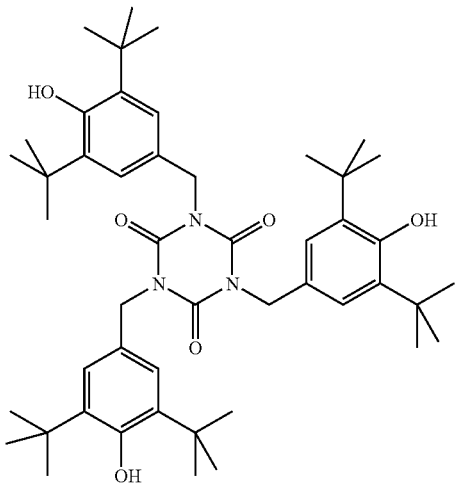
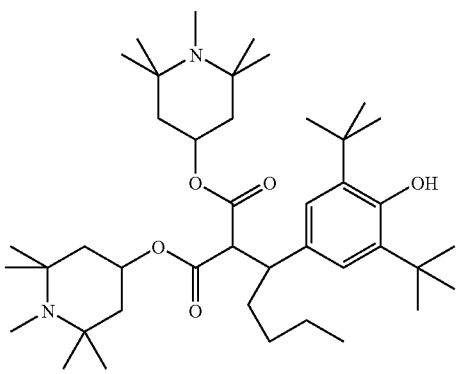
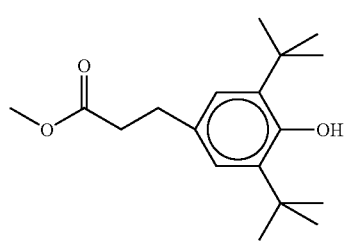
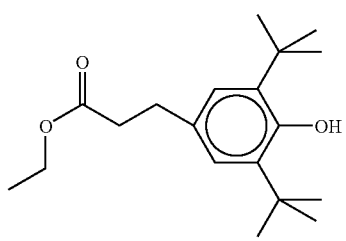
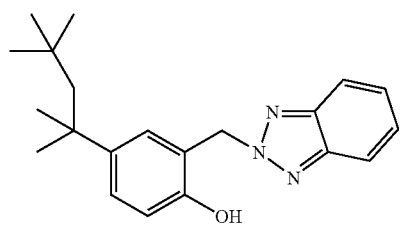
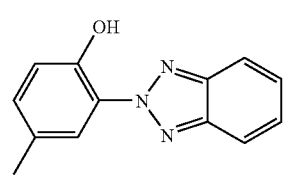
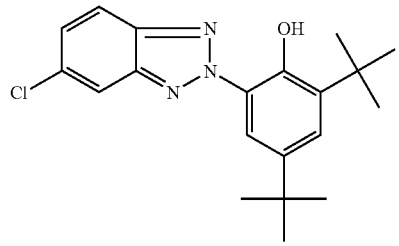
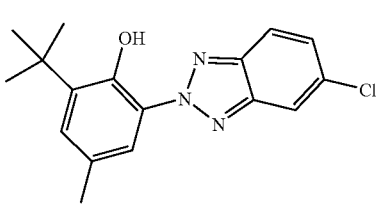
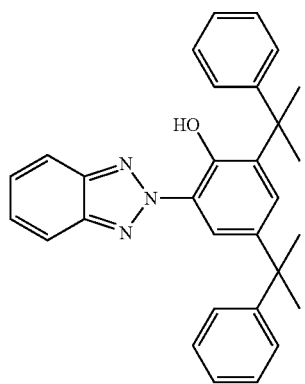
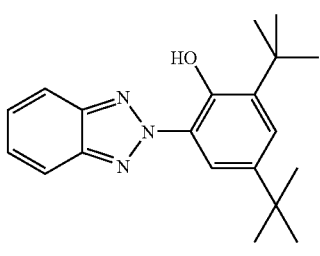

-continued
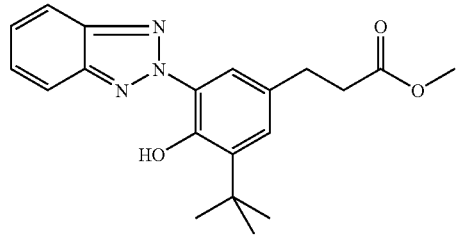
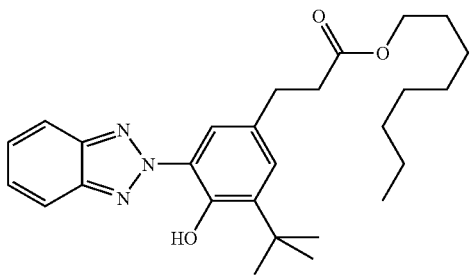
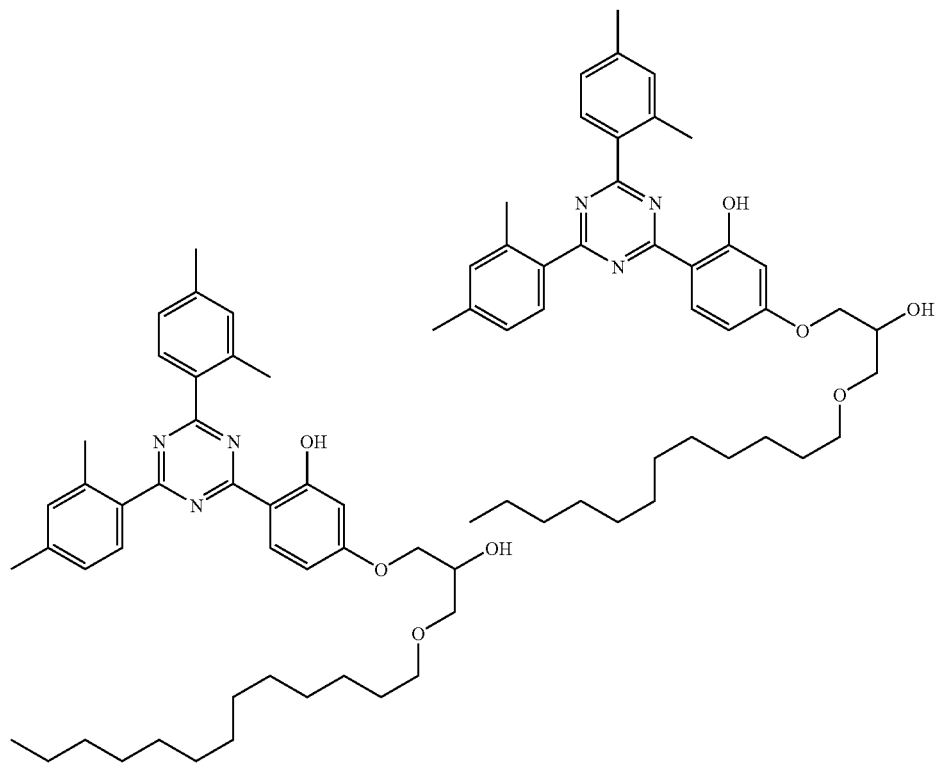
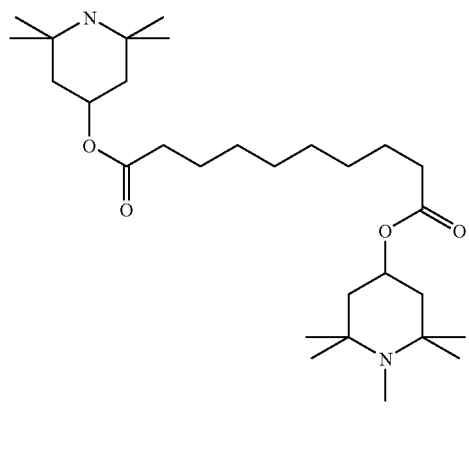
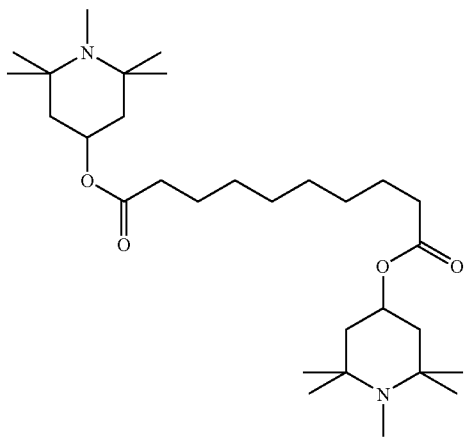

EXAMPLES

The following examples are intended to explain the invention without limiting it. Above and below, percentages are per cent by weight. All temperatures are indicated in degrees Celsius. m.p. denotes melting point, cl.p. denotes clearing point. Furthermore, C=crystalline state, N=nematic phase, S=smectic phase and I=isotropic phase. The data between these symbols represent the transition temperatures. Δn denotes optical anisotropy (589 nm, 20° C.).

Comparative Example 1

K15 was investigated at 27.5° C. with respect to its microwave properties, as described in the interfering-body measurement method section.
Dielectric properties of the liquid crystal were determined both parallel and perpendicular to the microwave measurement field on alignment of the director of the LC with a magnetic field up to 0.15 T. The data are shown in the table after Example 5.
The material quality determined was 2.5.

Example 1

A binary mixture comprising 10% of PVPU-3-S and 90% of K15 (referred to as mixture A-1 below) was investigated as described in Comparative Example 1, at 26.5° C.
The material quality determined was 3.7.

Example 2

A binary mixture comprising 20% of PPTU-4-S and 80% of K15 (referred to as mixture A-2 below) was investigated as described in Comparative Example 1, at 26.5° C.
The material quality determined was 5.1.

Example 3

Mixture M1

| Compound # | Composition Abbreviation | Conc./ % by weight | Physical properties |
|---|---|---|---|
| 1 | PGIP-3-N | 4.0 | T(N, I) = 149.0° C. |
| 2 | CPU-4-S | 6.0 | $n_e$(20° C., 589 nm) = 1.9487 |
| 3 | PVG-2O-S | 8.0 | Δn(20° C., 589 nm) = 0.4083 |
| 4 | PVG-4O-S | 8.0 | $\epsilon_\parallel$(20° C., 1 kHz) = 27.0 |
| 5 | PVG-5-S | 10.0 | Δε(20° C., 1 kHz) = +21.8 |
| 6 | BCH-2S.F.F | 13.0 | |
| 7 | BCH-5S.F.F | 13.0 | |
| 8 | PTG-3-S | 4.0 | |
| 9 | PTU-3-S | 11.0 | |
| 11 | CPVP-3-N | 5.0 | |
| 12 | PTP-3-S | 3.0 | |
| 13 | PMP-4-N | 3.0 | |
| 14 | PTPG-2-N | 4.0 | |
| 15 | UTPP-4-S | 8.0 | |
| Σ | | 100.0 | |

Example 4

Mixture M2

| Compound # | Composition Abbreviation | Conc./ % by weight | Physical properties |
|---|---|---|---|
| 1 | PPU-3-S | 9.0 | T(N, I) = 164.5° C. |
| 2 | PPU-4-S | 8.0 | $n_e$(20° C., 589 nm) = 1.9332 |
| 3 | PPU-5-S | 5.0 | Δn(20° C., 589 nm) = 0.3907 |
| 4 | BCH-4S.F.F | 12.0 | $\epsilon_\parallel$(20° C., 1 kHz) = 24.3 |
| 5 | BCH-5S.F.F | 12.0 | Δε(20° C., 1 kHz) = +19.9 |
| 6 | PNP-5-N | 5.0 | |
| 7 | K15 | 5.0 | |
| 8 | PPYP-4N | 7.0 | |
| 9 | PGIP-3-N | 6.0 | |
| 11 | PGIP-4-S | 5.0 | |
| 12 | PVG-4-S | 7.0 | |
| 13 | PVG-5-S | 8.0 | |
| 14 | P(1)VP-N-S | 5.0 | |
| 15 | PVPU-3-S | 6.0 | |
| Σ | | 100.0 | |

Example 5

Mixture M3

| Compound # | Composition Abbreviation | Conc./ % by weight | Physical properties |
|---|---|---|---|
| 1 | PGIP-3-N | 9.0 | T(N, I) = 143.5° C. |
| 2 | PVG-2O-S | 9.0 | $n_e$(20° C., 589 nm) = 1.9320 |
| 3 | PVG-4O-S | 8.0 | Δn(20° C., 589 nm) = 0.3934 |
| 4 | PVG-5-S | 10.0 | $\epsilon_\parallel$(20° C., 1 kHz) = 27.0 |
| 5 | BCH-2S.F.F | 10.0 | Δε(20° C., 1 kHz) = +22.2 |
| 6 | BCH-4S.F.F | 13.0 | |
| 7 | BCH-5S.F.F | 13.0 | |
| 8 | PTG-3-S | 4.0 | |
| 9 | PTG-5-S | 4.0 | |
| 11 | PTU-3-S | 11.0 | |
| 12 | CPVP-3-N | 6.0 | |
| 13 | PMP-4-N | 4.0 | |
| 14 | PTPG-2-N | 4.0 | |
| Σ | | 100.0 | |

The mixtures of Examples 3 to 5 (M1 to M3) were investigated at a temperature of 27.5° C. The results are shown in the following table.

Table of results

| | Example: | | | | | |
|---|---|---|---|---|---|---|
| | C1 | 1 | 2 | 3 | 4 | 5 |
| LC | A-0(K5) | A-1 | A-2 | M1 | M2 | M3 |
| c(K15)/% | 100 | 90 | 80 | | none | |
| T/° C. | 27.5 | 26.5 +/− 0.5 | | | 27.5 +/− 1.0 | |
| $\Delta n$(589 nm) | | | | 0.4083 | 0.3907 | 0.3934 |
| Freq./GHz | | | 8.3 … 8.75 | | | |
| $\epsilon$(0 = V) | 2.8291 | 2.8035 | 2.8493 | 3.2190 | 3.0966 | 3.4547 |
| $\tan(\delta)(0)$ | 0.0355 | 0.0252 | 0.0251 | 0.0158 | 0.0137 | 0.0116 |
| $\epsilon_\parallel$ | 2.9301 | 3.0501 | 3.0267 | 3.6832 | 3.6614 | 3.6855 |
| $\tan(\delta)_\parallel$ | 0.0243 | 0.0178 | 0.0198 | 0.0089 | 0.0070 | 0.0085 |
| $\epsilon_\perp$ | 2.5028 | 2.5331 | 2.5440 | 2.5597 | 2.5993 | 2.5866 |
| $\tan(\delta)_\perp$ | 0.0777 | 0.0433 | 0.0584 | 0.0261 | 0.0215 | 0.0276 |
| $\Delta n_{\mu W}$ | 0.1297 | 0.1549 | 0.1447 | 0.3193 | 0.3012 | 0.3115 |
| $\tan(\delta)_{av.}$ | 0.051 | 0.03055 | 0.0391 | 0.0175 | 0.01425 | 0.01805 |
| $\epsilon_{av.}$ | 2.6452 | 2.7054 | 2.7049 | 2.9342 | 2.9533 | 2.9529 |
| $\epsilon_{av.}/\tan(\delta)_{av.}$ | 2.54 | 5.07 | 3.70 | 18.24 | 21.14 | 17.26 |

Dielectric constant $\epsilon_r$, dielectric loss factor $\tan \delta$, calculated anisotropy in the microwave range $\Delta n_{\mu W} = |\epsilon \sqrt{r\ par} - \epsilon \sqrt{r\ perp}|$, optical anisotropy $\Delta n_{opt}$, average of $\tan \delta$ and $\epsilon_r$, material quality factor $\Delta n_{\mu W}/\tan \delta_{av.}$.

It can clearly be seen that the high optical anisotropy of the novel LC mixtures, in contrast to K15, was also successfully transferable to the lower microwave range. The anisotropy values $\Delta n_{opt}$ of mixtures M1, M2 and M3 clearly exceed the value for K15 and the highest value known hitherto for the microwave anisotropy of a liquid crystal, $\Delta n_{MW}$=0.22 at 30 GHz [Lim1], [Lim2]. The anisotropy of mixture M2 is already extraordinarily high and almost as great as the anisotropy at $\lambda$=589 nm. The anisotropy $\Delta n_{MW}$ appears to converge with the optical anisotropy value $\Delta n_{opt}$ as early as the lower millimetre wave range. The material quality achieved here is approximately eight times as great as for K15 used hitherto in microwave circuits.

This mixture is suitable for increasing the quality of LC-based microwave phase shifters to well above 50°/dB, which would make these competitive with technologically complex circuits based on high-purity thin films on monocrystalline substrates and even clearly exceed the results of phase shifters having thick ferroelectric layers. In addition, the $\epsilon_{r\ average}$ is in the same order of magnitude as for standard substrate materials for microwave circuits [Rog1], making complex adaptation of conductor geometries, as, for example, in the case of thick ferroelectric layers ($\epsilon_r \approx$ 200 … 450), superfluous.

Example 6 and Comparative Example 2

A phase shifter in inverted microstrip technology was produced using liquid-crystal mixture M1. For comparison, the same phase shifter was produced using K15.

| | LC | | | |
|---|---|---|---|---|
| | K15 | | M1 | |
| | Freq./GHz | | | |
| | 10 | 20 | 10 | 20 |
| Volt./V | diff. phase shift/° | | | |
| 0 | 0 | 0 | 0 | 0 |
| 5 | 28 | 58 | 75 | 210 |
| 10 | 30 | 62 | 123 | 241 |
| 30 | 35 | 62 | 132 | 270 |

The entire disclosures of all applications, patents and publications, cited herein and of corresponding German application No.10331722.8, filed Jul. 11, 2003 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

Table of references:

| | |
|---|---|
| [Aci1] | B. Acikel, Y. Liu, A. S. Nagra, T. R. Taylor, P. J. Hansen, J. S. Speck and R. A. York: Phase Shifters using (Ba, Sr)TiO$_3$ thin films on Sapphire and Glass Substrates. IEEE MTT-S Int. Microwave Symp. Dig., 2001, pp. 1191-1194. |
| [Aci2] | B. Acikel, T. R. Taylor, P. J. Hansen, J. S. Speck and R. A. York: A New X Band 180° High Performance Phase Shifter using (Ba, Sr)TiO$_3$ Thin Films. IEEE MTT-S Int. Microwave Symp. Dig., 2002, pp. 1467-1469. |

-continued

| | Table of references: |
|---|---|
| [Bab1] | R. W. Babbitt, T. E. Koscica and W. C. Drach: Planar Microwave Electro-optic Phase Shifter. Microwave Journal, June 1992, pp. 63-79. |
| [Bar1] | N. S. Barker and G. M. Rebeiz: Optimization of Distributed MEMS Transmission-Line Phase Shifters - U-Band and W-Band Designs. IEEE Trans. Microwave Theory Tech., Vol. 48, No. 11, pp. 1957-1966, Nov. 2000. |
| [Bet1] | K. Bethe: Über das Mikrowellenverhalten nichtlinearer Dielektrika [On the Microwave Behaviour of Nonlinear Dielectrics]. Dissertation, RWTH Aachen, 1969. |
| [Car3] | C. M. Carlson, T. V. Rivkin, P. A. Parilla, J. D. Perkins, D. S. Ginley, A. B. Kozyrev, V. N. Oshadchy, A. S. Pavlov, A. Golovkov, M. Sugak, D. Kalinikos, L. C. Sengupta, L. Chiu, X. Zhang, Y. Zhu and S. Sengupta: 30 GHz Electronically Steerable Antennas Using $Ba_xSr_{1-x}TiO_3$-Based Room-Temperature Phase Shifters. Mat. Res. Soc. Symp. Proc., Vol. 603, pp. 15-25, 2000. |
| [Cha2] | W. Chang, J. S. Horwitz, A. C. Carter, J. M. Pond, S. W. Kirchoefer, C. M. Gilmore and D. B. Chrisey: The effect of annealing on the microwave properties of $Ba_{0.5}Sr_{0.5}TiO_3$ thin films. Appl. Phys. Lett., Vol. 74, No. 7, pp. 1033-1035, February 1999. |
| [Chi1] | V. G. Chigrinov: Liquid Crystal Devices. Physics and Applications. Artech House, Boston, 1999. |
| [Dio1] | G. F. Dionne, D. E. Oates, D. H. Temme and J. A. Weiss: Ferrite-Superconductor Devices for Advanced Microwave Applications. IEEE Trans. Microwave Theory Tech., Vol. 44, No. 7, pp. 1361-1368, July 1996. |
| [Dol1] | D. Dolfi, M. Labeyrie, P. Joffre and J. P. Huignard: Liquid Crystal Microwave Phase Shifter. Electronics Letters, Vol. 29, No. 10, pp. 926-928, May 1993. |
| [Bar1] | N. S. Barker and G. M. Rebeiz: Optimization of Distributed MEMS Transmission-Line Phase Shifters - U-Band and W-Band Designs. IEEE Trans. Microwave Theory Tech., Vol. 48, No. 11, pp. 1957-1966, Nov. 2000. |
| [DeF1] | F. De Flaviis, N. G. Alexopoulos and O. M. Stafsudd: Planar Microwave Integrated Phase Shifter Design with High Purity Ferroelectric Material. IEEE Trans. Microwave Theory Tech., Vol. 45, No. 6, pp. 963-969, June 1997. |
| [Erk1] | E. G. Erker, A. S. Nagra, Y. Liu, P. Periaswamy, T. R. Taylor, J. Speck and R. A. York: Monolithic Ka-Band Phase Shifter Using Voltage Tunable $BaSrTiO_3$ Parallel Plate Capacitors. IEEE Microwave and Guided Wave Letters, Vol. 10, No. 1, pp. 10-12, January 2000. |
| [Fin1] | U. Finkenzeller: Flüssigkristalle for optische Displays [Liquid Crystals for Optical Displays]. Spektrum der Wissenschaft, August 1990, pp. 54-62. |
| [Gev6] | S. S. Gevorgian and E. L. Kollberg: Do We Really Need Ferroelectrics in Paraelectric Phase Only in Electrically Controlled Microwave Devices, IEEE Trans. Microwave Theory Tech., Vol. 49, No. 11, pp. 2117-2124, 2001. |
| [Gup2] | K. C. Gupta, R. Garg, I. Bahl and P. Bhartia: Microstrip Lines and Slotlines, $2^{nd}$ ed., Artech House, Boston, 1996. |
| [Kir1] | S. W. Kirchoefer, J. M. Pond, H. S. Newman W.-J. Kim and J. S. Horwitz: Ferroelectric-Ferrite Tunable Phase Shifters. IEEE MTT-S Int. Microwave Symp. Dig., 2000, pp. 1359-1362. |
| [Kou1] | S. K. Koul and B. Bhat: Microwave and Millimeter Wave Phase Shifters. Volume 1: Dielectric and Ferrite Phase Shifters. Artech House, Boston, 1991. |
| [Kou2] | S. K. Koul and B. Bhat: Microwave and Millimeter Wave Phase Shifters. Volume II: Semiconductor and Delay Line Phase Shifters. Artech House, Boston, 1991. |
| [Koz1] | Kozyrev, A. Ivanov, V. Keis, M. Khazov, V. Osadchy, T. Samoilova, O. Soldatenkov, A. Pavlov, G. Koepf, C. Mueller, D. Galt and T. Rivlin: Ferroelectric Films: Nonlinear Properties and Applications in Microwave Devices. IEEE MTT-S Int. Microwave Symp. Dig., 1998, pp. 985-988. |
| [Kuk1] | T. Kuki, H. Fujikake, H. Kamoda and T. Nomoto: Microwave Variable Delay Line Using a Membrane Impregnated with Liquid Crystal. IEEE MTT-S Int. Microwave Symp. Dig. 2002, pp. 363-366, June 2002. |
| [Kuk2] | T. Kuki, H. Fujikake, T. Nomoto: Microwave Variable Delay Line Using Dual-Frequency Switching-Mode Liquid Crystal. IEEE Trans. Microwave Theory Tech., Vol. 50, No. 11, pp. 2604-2609, November 2002. |
| [Lim1] | K. C. Lim, J. D. Margerum and A. M. Lackner: Liquid crystal millimeter wave electronic phase shifter. Appl. Phys. Lett., 62 (10), pp. 1065-1067, March 1993. |

-continued

| Table of references: | |
|---|---|
| [Lim2] | K. C. Lim, D. J. Margerum, A. M. Lackner and L. J. Miller: Liquid crystal-based composite material having enhanced microwave birefringence. European Patent Application, Publ.-No. 0472404A2, pp. 1-17, February 1992. |
| [Liu1] | Y. Liu, A. S. Nagra, E. G. Erker, P. Periaswamy, T. R. Taylor, J. Speck and R. A. York: BaSrTiO$_3$ Interdigitated Capacitors for Distributed Phase Shifter Applications. IEEE Microwave and Guided Wave Letters, Vol. 10, No. 11, pp. 448-450, November 2000. |
| [Mar1] | N. Martin, N. Tentillier, P. Laurent, B. Splingart, F. Huert, PH. Gelin, C. Legrand:<br>Electrically Microwave Tunable Components Using Liquid Crystals. 32$^{nd}$ European Microwave Conference, pp. 393-396, Milan 2002 |
| [Par] | Parkash, A.; Vaid, J. K. and Mansingh, A.: Measurement of Dielectric Parameters at Microwave Frequencies by Cavity-Perturbation Technique. IEEE Transactions on Microwave Theory and Techniques, Vol. MTT-27, No. 9, September 1979, pp. 791-795. |
| [Rao1] | J. B. L. Rao, D. P. Patel and Vladimir Krichevsky: Voltage-Controlled Ferroelectric Lens Phased Arrays. Ferroelectric Materials For Phased Array Applications. IEEE Trans. Antennas and Propagation., Vol. 47, No. 3, pp. 458-468, March 1999. |
| [Reb1] | G. M. Rebeiz and J. B. Muldavin: RF MEMS Switches and Switch Circuits. IEEE Microwave Magazine, Vol. 2, No. 4, pp. 59-71, December 2001. |
| [Reb2] | G. M. Rebeiz, G.-L. Tan and J. S. Hayden: RF MEMS Phase Shifters. IEEE Microwave Magazine, Vol. 3, No. 2, pp. 72-81, June 2002. |
| [Riz] | Rizzi, P. A.: Microwave Engineering. Englewood Cliffs: Prentice-Hall International Editions 1988. |
| [Rog1] | Rogers Corp., High Frequency Circuit Materials and Laminates: http://www.rogers-corp.com. |
| [Rom1] | R. R. Romanofsky: Hybrid Ferroelectric/Superconducting Microwave Circuits. IEEE MTT-S Int. Microwave Symp., Workshop WFE "Ferroelectric Materials and Microwave Applications", 2000. |
| [Rom2] | R. R. Romanofsky, J. Bernhard, G. Washington, F. Van Keuls, F. Miranda and C. Cannedy: K-Band Phased Array Antennas Based On Ba$_{0.60}$Sr$_{0.40}$TiO$_3$ Thin-Film Phase Shifters. IEEE Trans. Microwave Theory Tech., Vol. 48, No. 12, pp. 2504-2510, December 2000. |
| [Sen1] | L. C. Sengupta, E. Ngo, S. Stowell, R. Lancto, W. C. Drach, T. E. Koscica and R. W. Babbitt: Investigation of the Electronic Properties of Doped Ba$_{1-x}$Sr$_x$TiO$_3$ Phase Shifting Materials. Ferroelectrics, Vol. 153, pp. 359-364, 1994. |
| [Sen2] | L. C. Sengupta, E. Ngo, M. E. O'Day, S. Stowell and R. Lancto: Fabrication and Characterization of Barium Strontium Titanate and Non-Ferroelectric Oxide Composites For Use in Phased Array Antennas and Other Electronic Devices. Proceedings of 9$^{th}$ Int. Symp. on Applications of Ferroelectrics, 1994, pp. 622-625. |
| [Sen3] | S. Sengupta, S. C. Sengupta, S. Stowell, E. Ngo, W. E. Kosik and D. K. Vijay: Analysis of Ferroelectric Thin Films Deposited by Pulsed Laser Deposition on Oxide and Fluoride Substrates. Proceedings of 9$^{th}$ Int. Symp. on Applications of Ferroelectrics, 1994, pp. 70-73. |
| [Sen4] | L. C. Sengupta and S. Sengupta: Novel Ferroelectric Materials for Phased Array Antennas. IEEE Trans. Ultrasonics, Ferroelectrics, and Frequency Control, Vol. 44, No. 4, pp. 792-797, July 1997. |
| [Sen5] | L. Sengupta: Bulk Ceramic Ferroelectric and Composites: Manufacture and Applications - Paratek Microwave, Inc. IEEE MTT-S Int. Microwave Symp., Workshop WFE "Ferroelectric Materials and Microwave Applications", 2000. |
| [She1] | V. Sherman, K. Astafiev, A. Tagantsev, N. Setter, I. Vendik, O. Vendik: Design and Investigation of Ferroelectric Digital Phase Shifter. Proceedings of the 31th European Microwave Conf., London, Sept. 2001. |
| [Sub3] | G. Subramanyam, F. A. Miranda, R. R. Romanofsky, F. W. Van Keuls, C. L. Canedy, S. Aggarwal, T. Venkatesan and R. Ramesh: A Ferroelectric Tunable Microstrip Lange Coupler for K-Band Applications. IEEE MTT-S Int. Microwave Symp. Dig., 2000, pp. 1363-1366. |

-continued

Table of references:

| | |
|---|---|
| [Sub4] | G. Subramanyam, N. Mohsina, A. Al Zaman, F. Miranda, F. W. Van Keuls, R. Romanofsky and J. Warner: Ferroelectric Thin-film Based Electrically Tunable Ku-band Coplanar Waveguide Components. IEEE MTT-S Int. Microwave Symp. Dig., 2001, pp. 471-474. |
| [Van3] | F. W. Van Keuls, C. H. Mueller, F. A. Miranda, R. R. Romanofsky, C. L. Canedy, S. Aggarwal, T. Venkatesan, R. Ramesh, J. S. Horwitz, W. Chang and W. J. Kim: Room Temperature Thin Film $Ba_xSr_{1-x}TiO_3$ Ku-Band Coupled Microstrip Phase Shifters: Effect of Film Thickness, Doping, Annealing and Substrate Choice. IEEE MTT-S Int. Microwave Symp. Dig., 1999, pp. 737-740. |
| [Var1] | V. K. Varadan, D. K. Ghodgaonkar, V. V. Varadan, J. F. Kelly and P. Glikerdas: Ceramic Phase Shifter for Electronically Steerable Antenna Systems. Microwave Journal, January 1992, pp. 116-127. |
| [Var2] | V. K. Varadan, V. V. Varadan, F. Selmi, Z. Ounaies and K. A. Jose: Multilayer Tunable Ferroelectric Materials and Thin Films. SPIE Proceedings, Vol. 2189, pp. 433-447, 1994. |
| [Var3] | V. K. Varadan, K. A. Jose, V. V. Varadan, R. Hughes and J. F. Kelly: A Novel Microwave Planar Phase Shifter. Microwave Journal, April 1995, pp. 244-254. |
| [Yor1] | B. York: Thin-Film Ferroelectrics: Deposition Methods and Applications. IEEE MTT-S Int. Microwave Symp., Workshop WFE "Ferroelectric Materials and Microwave Applications", 2000. |
| [Weil1] | Weil, C.: Passiv steuerbare Mikrowellenphasenschieber auf der Basis nichtlinearer Dielektrika [Passively Controllable Microwave Phase Shifters Based on Nonlinear Dielectrics]. Darmstadter Dissertationen D17, 2002. Prepared for publication. |
| [Weil2] | C. Weil, G. Lüssem, and R. Jakoby: Tunable Invert-Microstrip Phase Shifter Device Using Nematic Liquid Crystals, IEEE MTT-S Int. Microw. Symp., Seattle, Washington, June 2002, pp. 367-370. |
| [Weil3] | C. Weil, R. Jakoby: "Tunable coplanar waveguide phase shifters using thick films of Barium Strontium Titanate," Proc. of the 11$^{th}$ MIOP Conference, Stuttgart, Germany, , May 2001, pp. 176-181. |
| [Wil1] | W. Wilber, W. Drach, T. Koscica, R. Babbitt, L. Sengupta and S. Sengupta: Fabrication and Performance of Coplanar Ferroelectric Phase Shifter. Integrated Ferroelectrics, Vol. 19, pp. 149-158, 1998. |
| [Wol1] | S. Wolf: The DARPA "Frequency Agile Materials for Electronics" Programm. IEEE MTT-S Int. Microwave Symp., Workshop WMJ "Technologies for Tunable Microwave Systems", 1998. |

The invention claimed is:

1. A controllable component for a high-frequency application comprising, as controllable medium, a liquid-crystal material whose phase shifter quality and/or whose material quality is 10% or more greater than that of an otherwise identical component containing pentylcyanobiphenyl instead of said liquid-crystal material.

2. A component for a high-frequency application according to claim 1, wherein the liquid-crystal material has a phase shifter quality and/or material quality which is 25% more greater than that of pentylcyanobiphenyl.

3. A component according to claim 1, wherein the birefringence of the liquid-crystal material at 20° C. and 589 nm is 0.22 or more.

4. A component according to claim 1, wherein the birefringence of the liquid-crystal material in the microwave range is 0.13 or more.

5. A component according to claim 1, wherein the liquid-crystal material comprises one or more compounds containing a terminal-NCS group.

6. A component according to claim 1, wherein the liquid-crystal material has a phase shifter quality of 15°/dB and/or a material quality of 3.5 or more.

7. A controllable component for a high-frequency application according to claim I comprising, as a controllable medium, a liquid-crystal material whose phase shifter quality is 15°/dB or more and/or whose material quality is 3.5 or more.

8. A method for improving the quality of a controllable component for high-frequency technology according to claim 1, comprising addressing the a liquid-crystal material whose phase shifter quality and/or whose material quality is 10% or more greater than that of an otherwise identical component containing pentylcyanobiphenyl.

9. A method for operating a controllable component for high-frequency technology according to claim 1, comprising addressing the liquid-crystal material whose phase shifter quality and/or whose material quality is 10% or more greater than that of an otherwise identical component containing pentylcyanobiphenyl.

10. A method for preparing a controllable component for high-frequency technology according to claim 1, comprising introducing the a liquid-crystal material whose phase shifter quality and/or whose material quality is 10% or more greater than that of an otherwise identical component containing pentylcyanobiphenyl into the component.

11. A controllable component according to claim 1, wherein the liquid-crystal material contains one or more of the following compounds

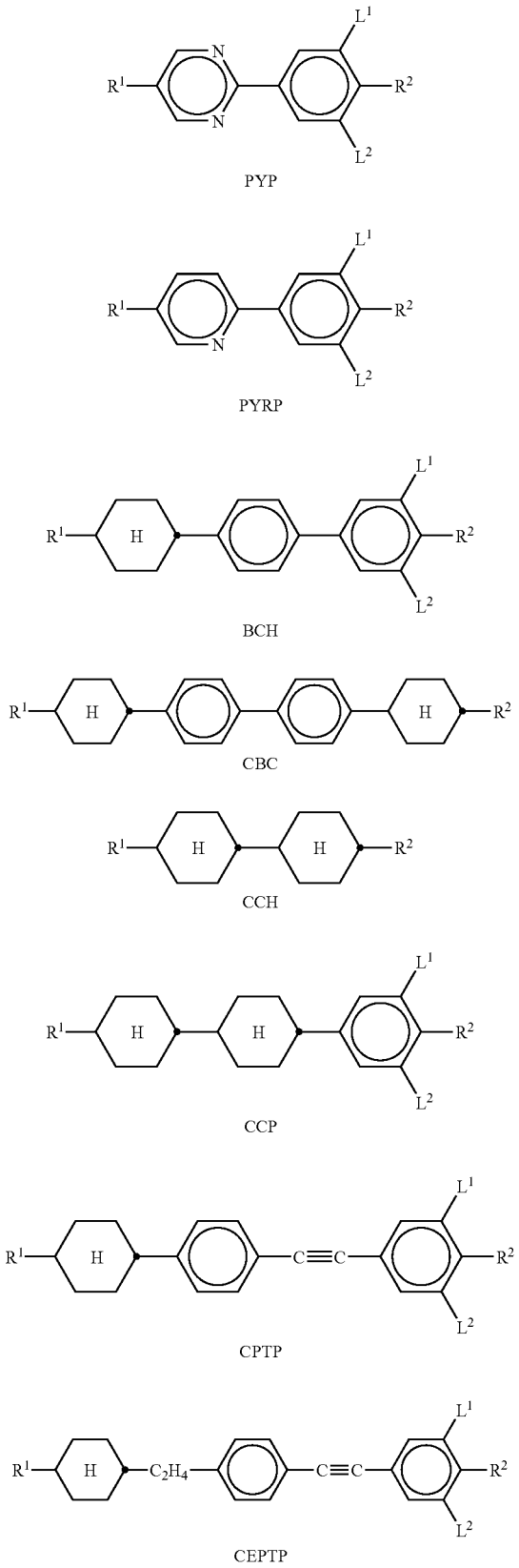

-continued
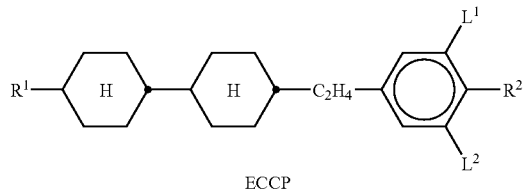
ECCP
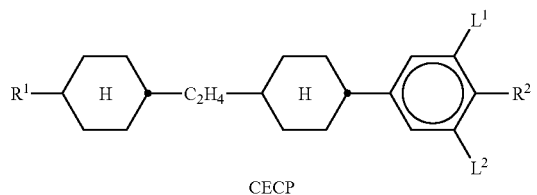
CECP
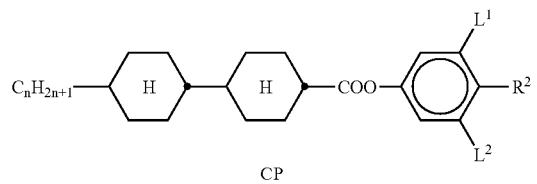
CP
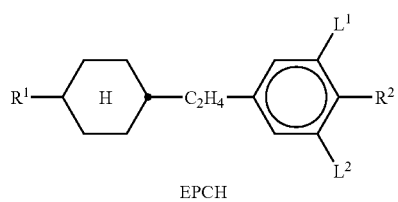
EPCH
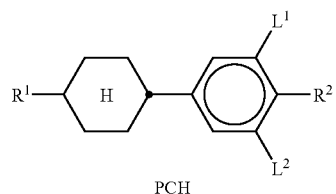
PCH
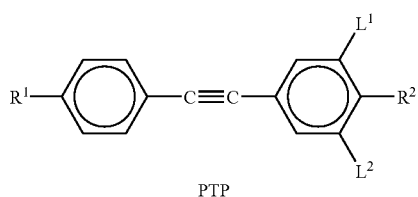
PTP
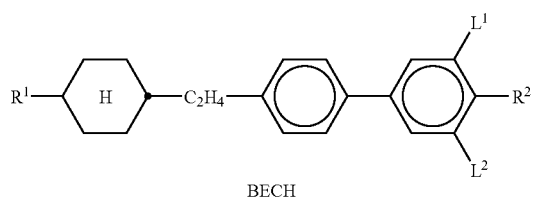
BECH
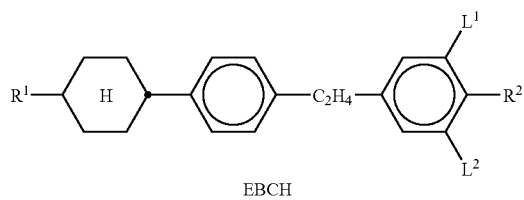
EBCH -continued
CPC
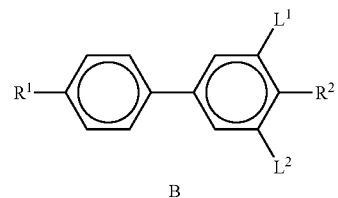
B
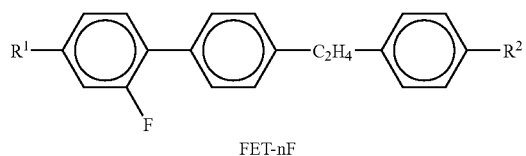
FET-nF
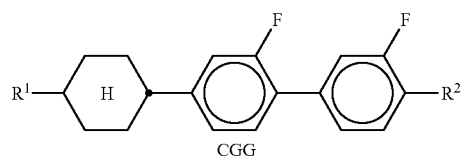
CGG
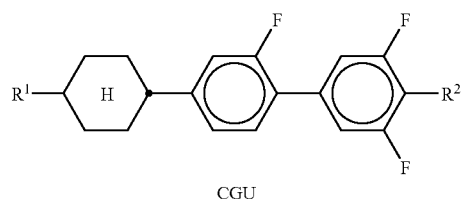
CGU
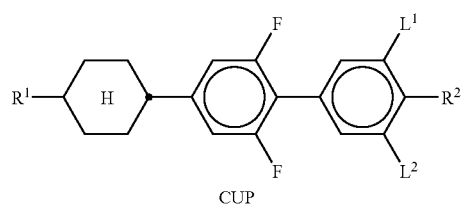
CUP
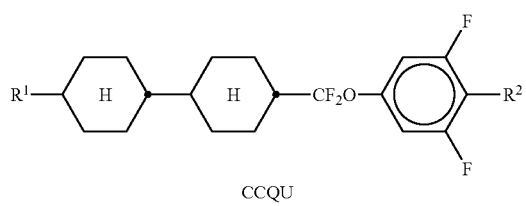
CCQU
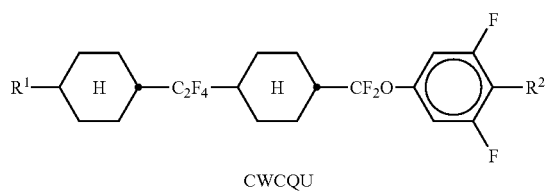
CWCQU -continued
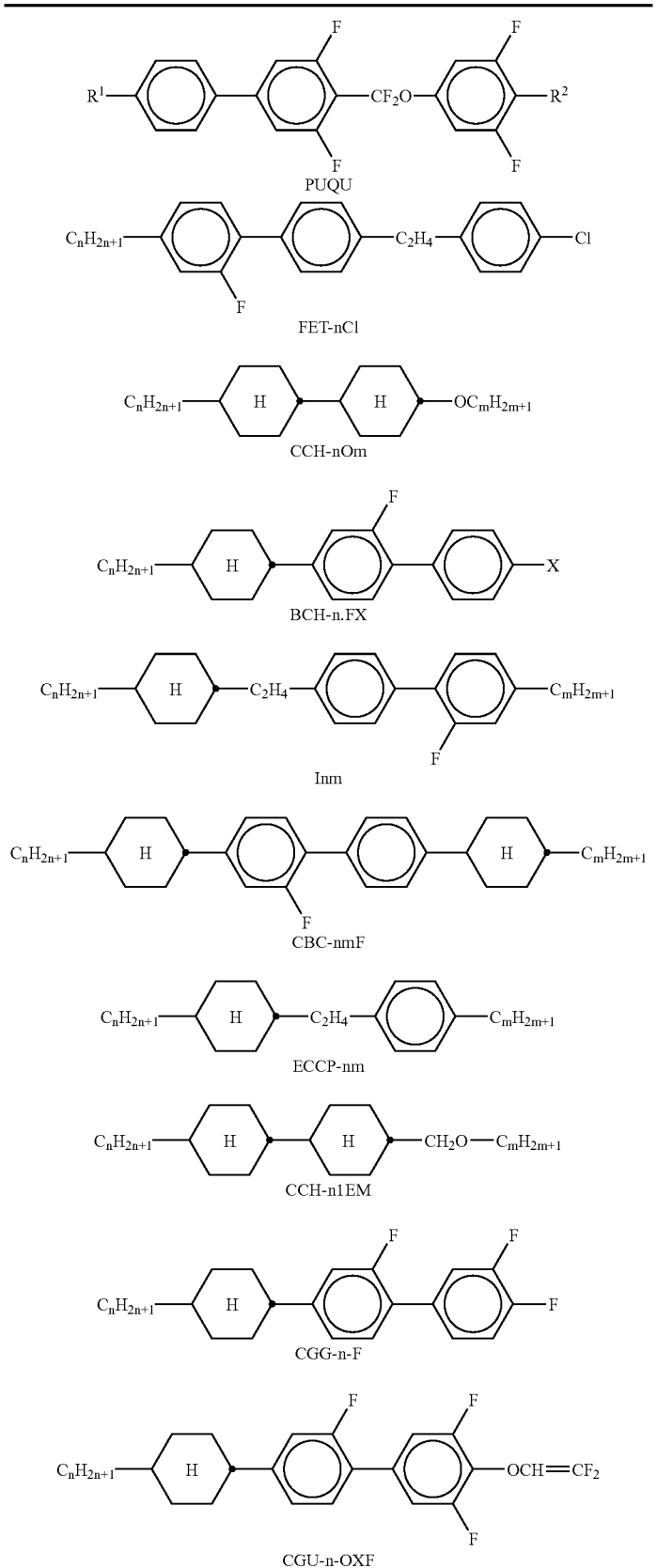

-continued
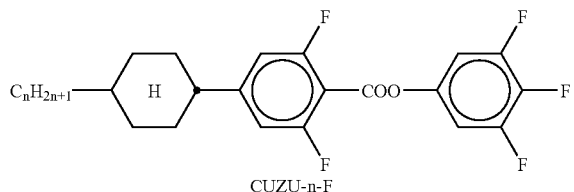
CUZU-n-F
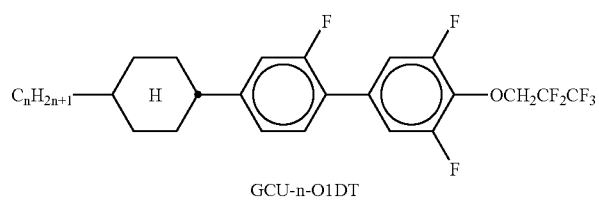
GCU-n-O1DT
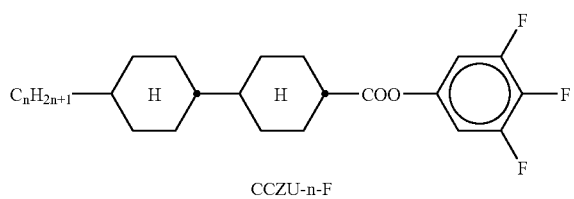
CCZU-n-F
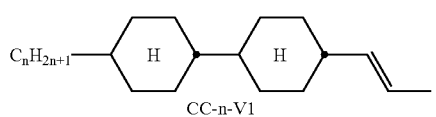
CC-n-V1
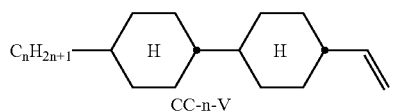
CC-n-V
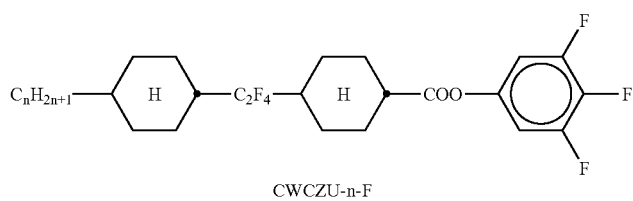
CWCZU-n-F
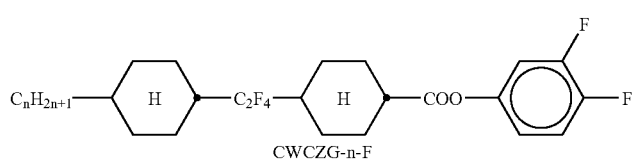
CWCZG-n-F
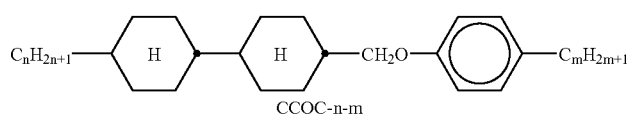
CCOC-n-m
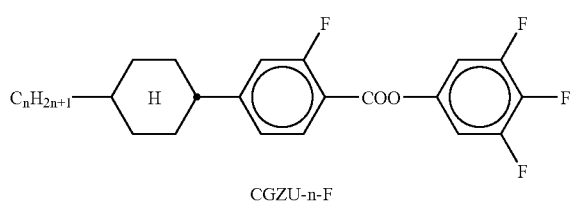
CGZU-n-F -continued
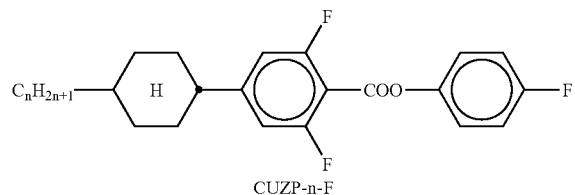
CUZP-n-F
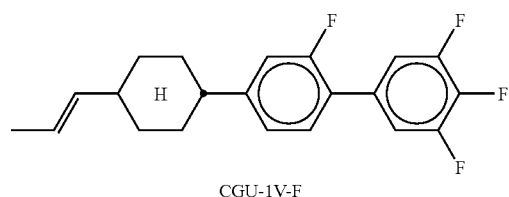
CGU-1V-F
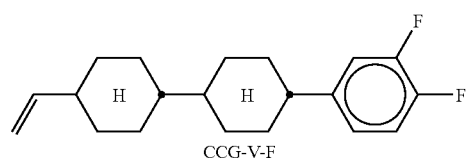
CCG-V-F
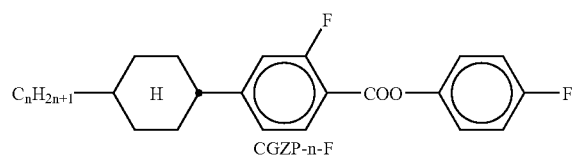
CGZP-n-F
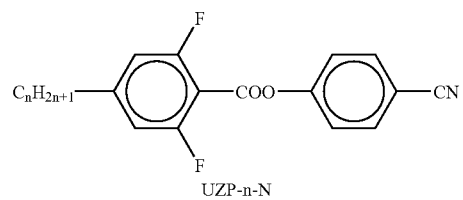
UZP-n-N
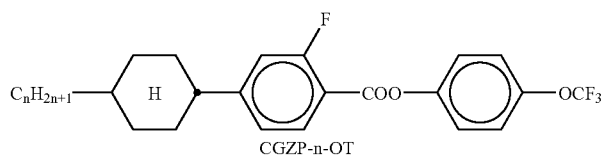
CGZP-n-OT
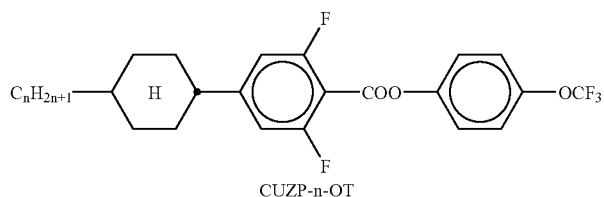
CUZP-n-OT
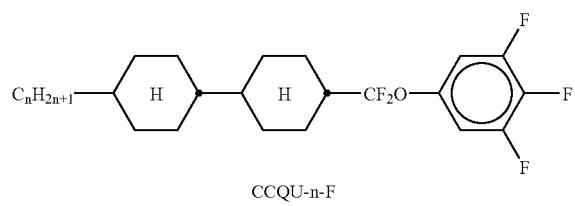
CCQU-n-F -continued
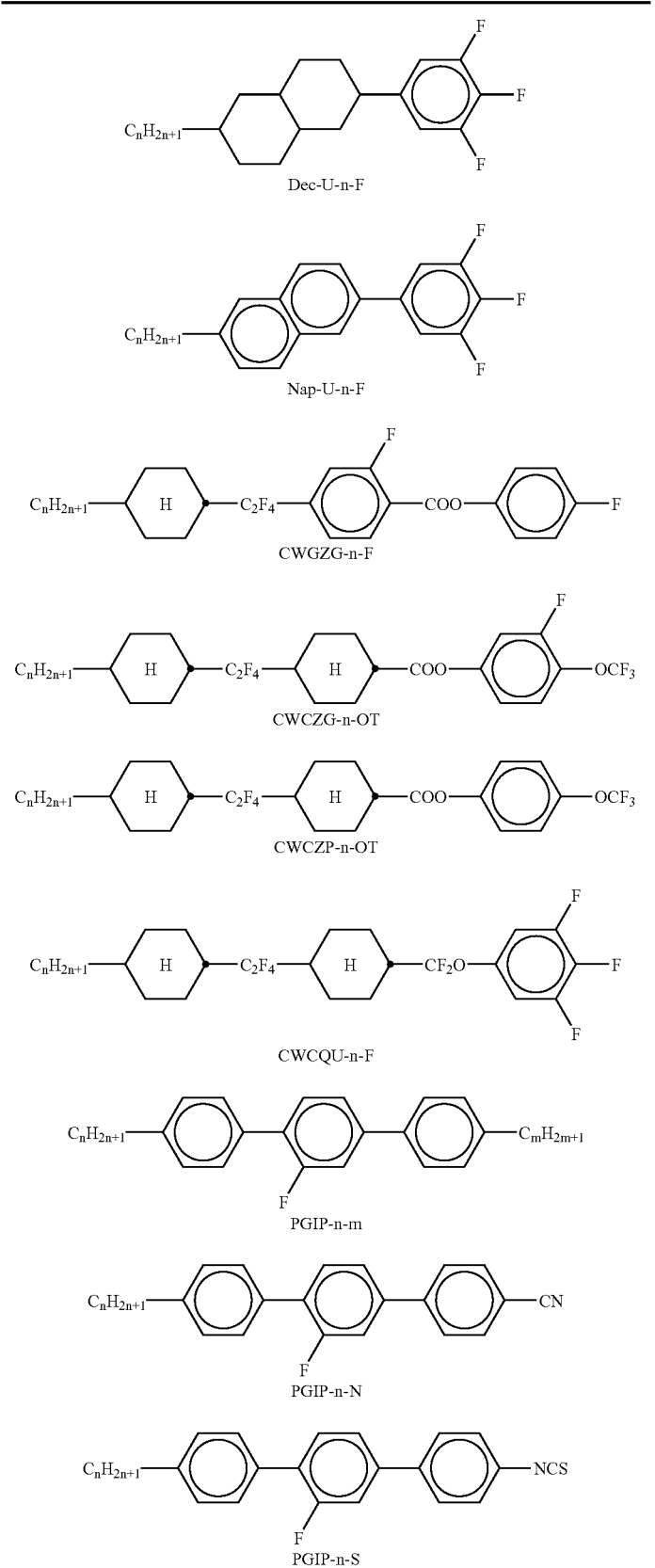

-continued
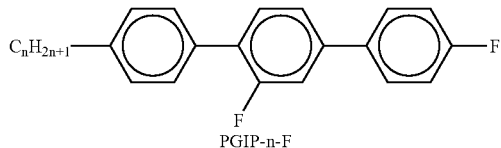
PGIP-n-F
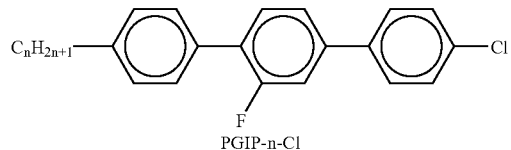
PGIP-n-Cl
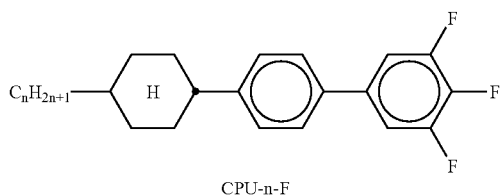
CPU-n-F
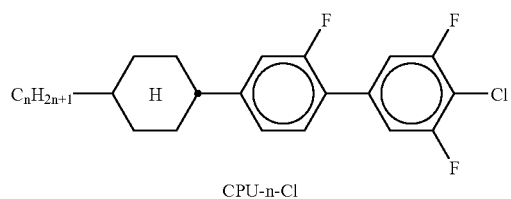
CPU-n-Cl
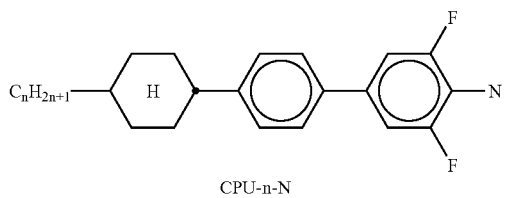
CPU-n-N
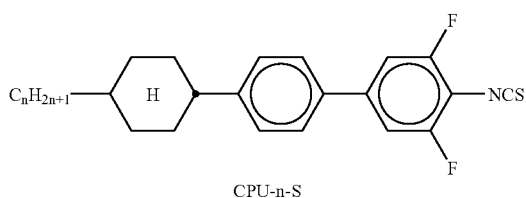
CPU-n-S
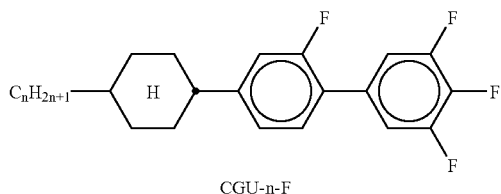
CGU-n-F
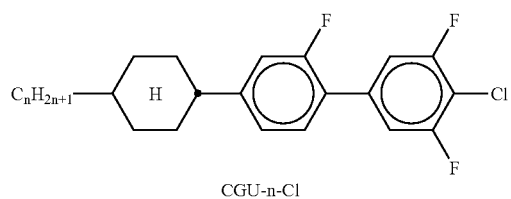
CGU-n-Cl -continued
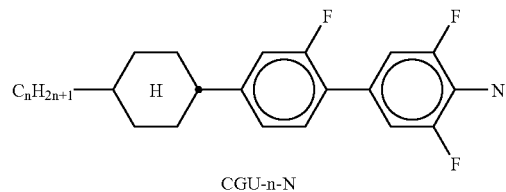
CGU-n-N
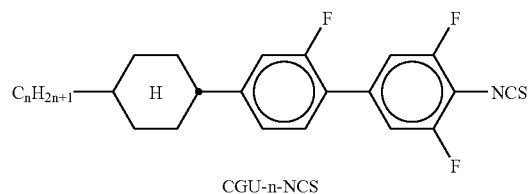
CGU-n-NCS
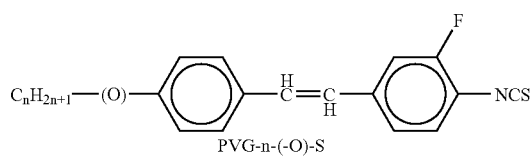
PVG-n-(-O)-S
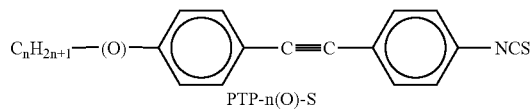
PTP-n(O)-S
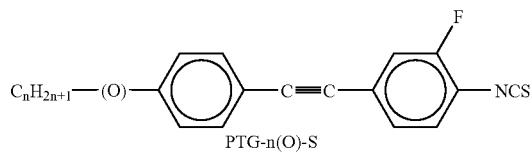
PTG-n(O)-S
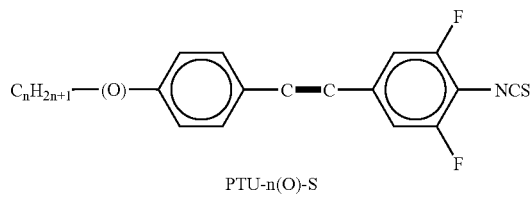
PTU-n(O)-S
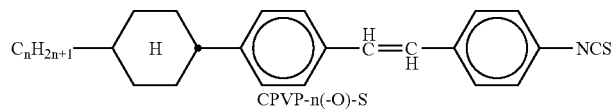
CPVP-n(-O)-S
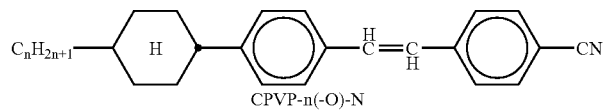
CPVP-n(-O)-N
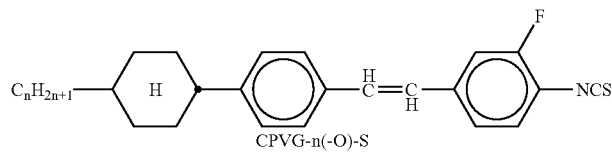
CPVG-n(-O)-S
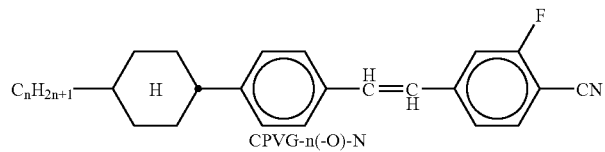
CPVG-n(-O)-N

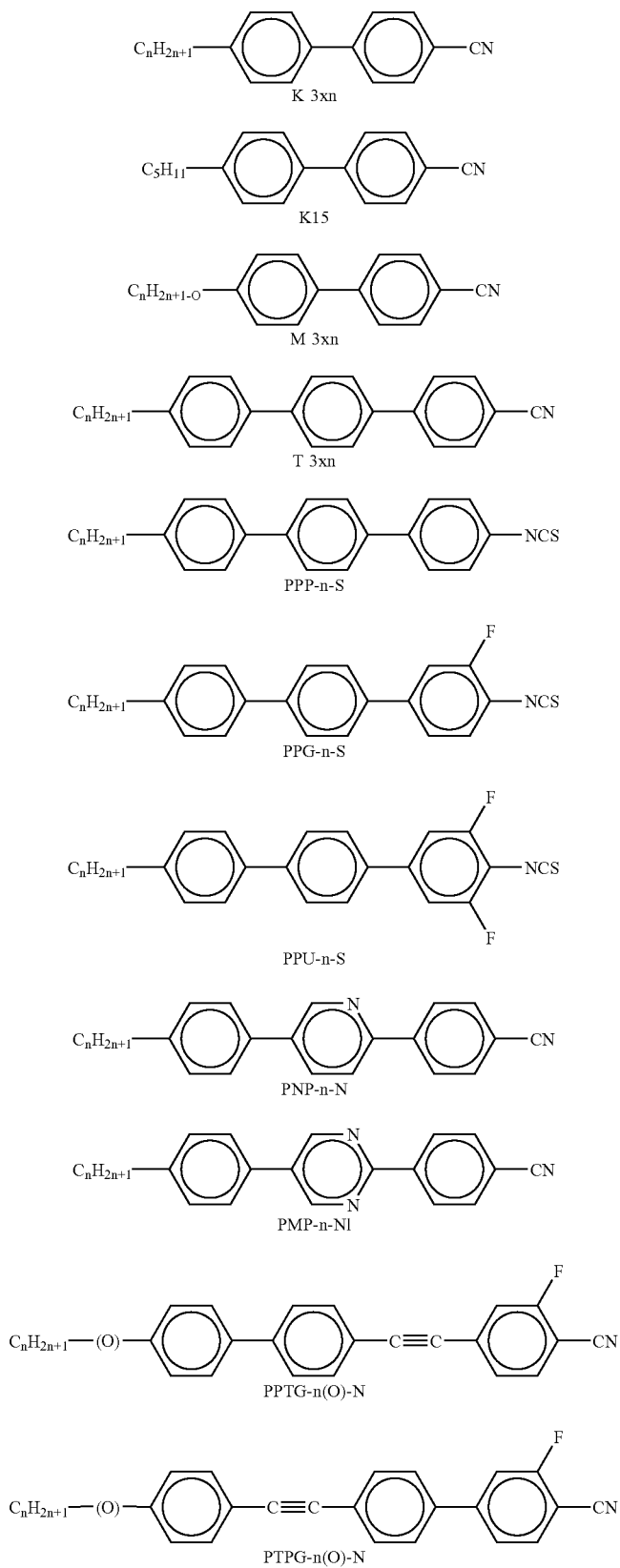

-continued

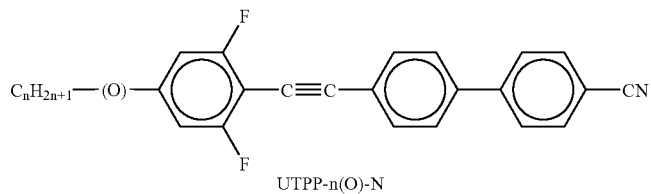
UTPP-n(O)-N

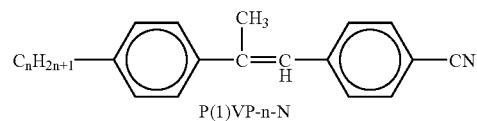
P(1)VP-n-N

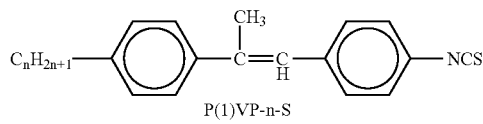
P(1)VP-n-S

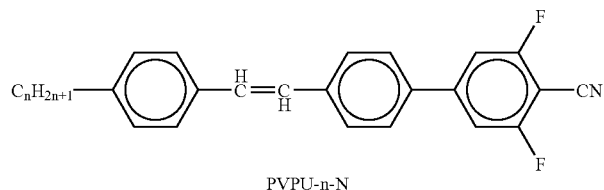
PVPU-n-N

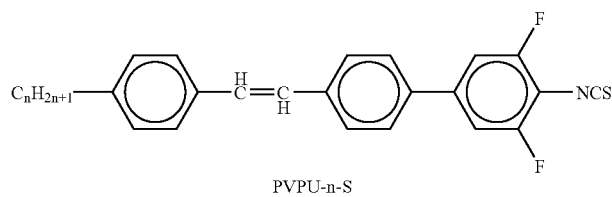
PVPU-n-S

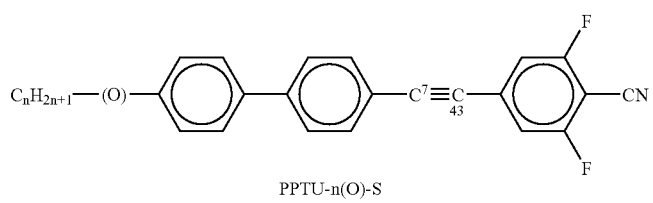
PPTU-n(O)-S

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| nmFF | $C_nH_{2+1}$ | $C_mH_{2m+1}$ | F | H | F |
| nOmFF | $C_nH_{2n+1}$ | $OC_mH_{2m+1}$ | F | H | F |
| nO.mFF | $OC_nH_{2n+1}$ | $C_mH_{2m+1}$ | F | H | F |
| nO.OmFF | $OC_nH_{2n+1}$ | $OC_mH2_{m+1}$ | F | H | F |
| n | $C_nH_{2n+1}$ | CN | H | H | H |
| nN.F | $C_nH_{2n+1}$ | CN | F | H | H |
| nN.F.F | $C_nH_{2n+1}$ | CN | F | F | H |
| nF | $C_nH_{2n+1}$ | F | H | H | H |
| nF.F | $C_nH_{2n+1}$ | F | F | H | H |
| nF.F.F | $C_nH_{2n+1}$ | F | F | F | H |
| nCl | $C_nH_{2n+1}$ | Cl | H | H | H |
| nCl.F | $C_nH_{2n+1}$ | Cl | F | H | H |
| nCl.F.F | $C_nH_{2n+1}$ | Cl | F | F | H |
| nmF | $C_nH_{2n+1}$ | $C_mH_{2m+1}$ | F | H | H |
| nCF$_3$ | $C_nH_{2n+1}$ | $CF_3$ | H | H | H |
| nOCF$_3$ | $C_nH_{2n+1}$ | $OCF_3$ | H | H | H |
| nOCF$_3$.F | $C_nH_{2n+1}$ | $OCF_3$ | F | H | H |
| nOCF$_3$.F.F | $C_nH_{2n+1}$ | $OCF_3$ | F | F | H |
| nOCF$_2$ | $C_nH_{2n+1}$ | $OCHF_2$ | H | H | H |

-continued

| | | | | | |
|---|---|---|---|---|---|
| nOCF$_2$.F.F | C$_n$H$_{2n+1}$ | OCHF$_2$ | F | F | H |
| nS | C$_n$H$_{2n+1}$ | NCS | H | H | H |
| rVsN | C$_r$H$_{2r+1}$CH=CH—C$_s$H$_{2s}$— | CN | H | H | H |
| nEsN | C$_r$H$_{2r+1}$O—C$_s$H$_{2s}$— | CN | H | H | H |
| nAm | C$_n$H$_{2n+1}$ | COOC$_m$H$_{2m+1}$ | H | H | H |
| nF.Cl | C$_n$H$_{2n+1}$ | F | Cl | H | H |
| nS | C$_n$H$_{2n+1}$ | NCS | H | H | H |
| nS.F | C$_n$H$_{2n+1}$ | NCS | F | H | H |
| nS.F.F | C$_n$H$_{2n+1}$ | NCS | F | F | H | the substitutens on the compounds above are defined in the table above.

12. A controllable component for a high-frequency application according to claim 1, wherein the liquid-crystal material contains one or more of the following compounds

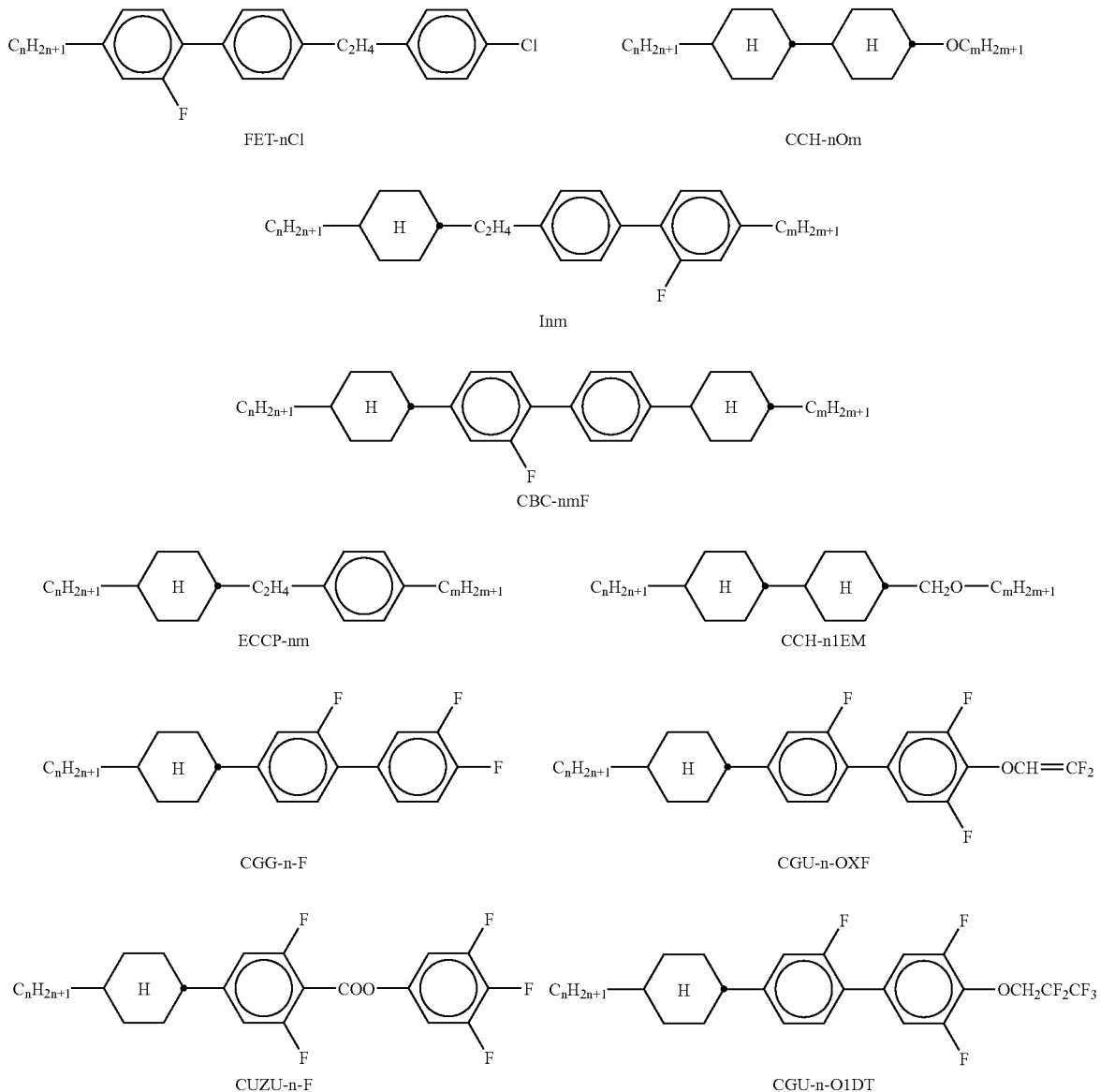

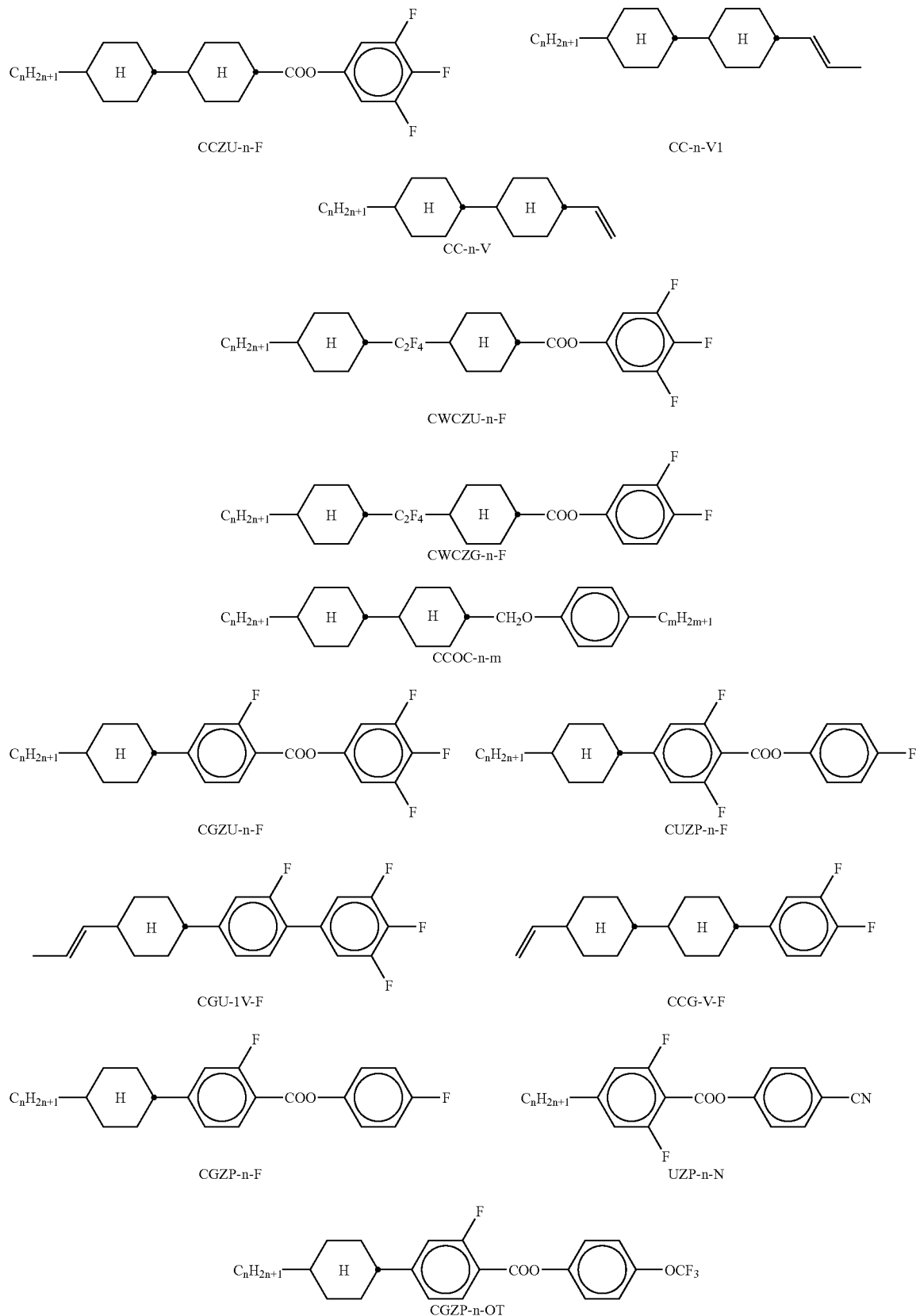

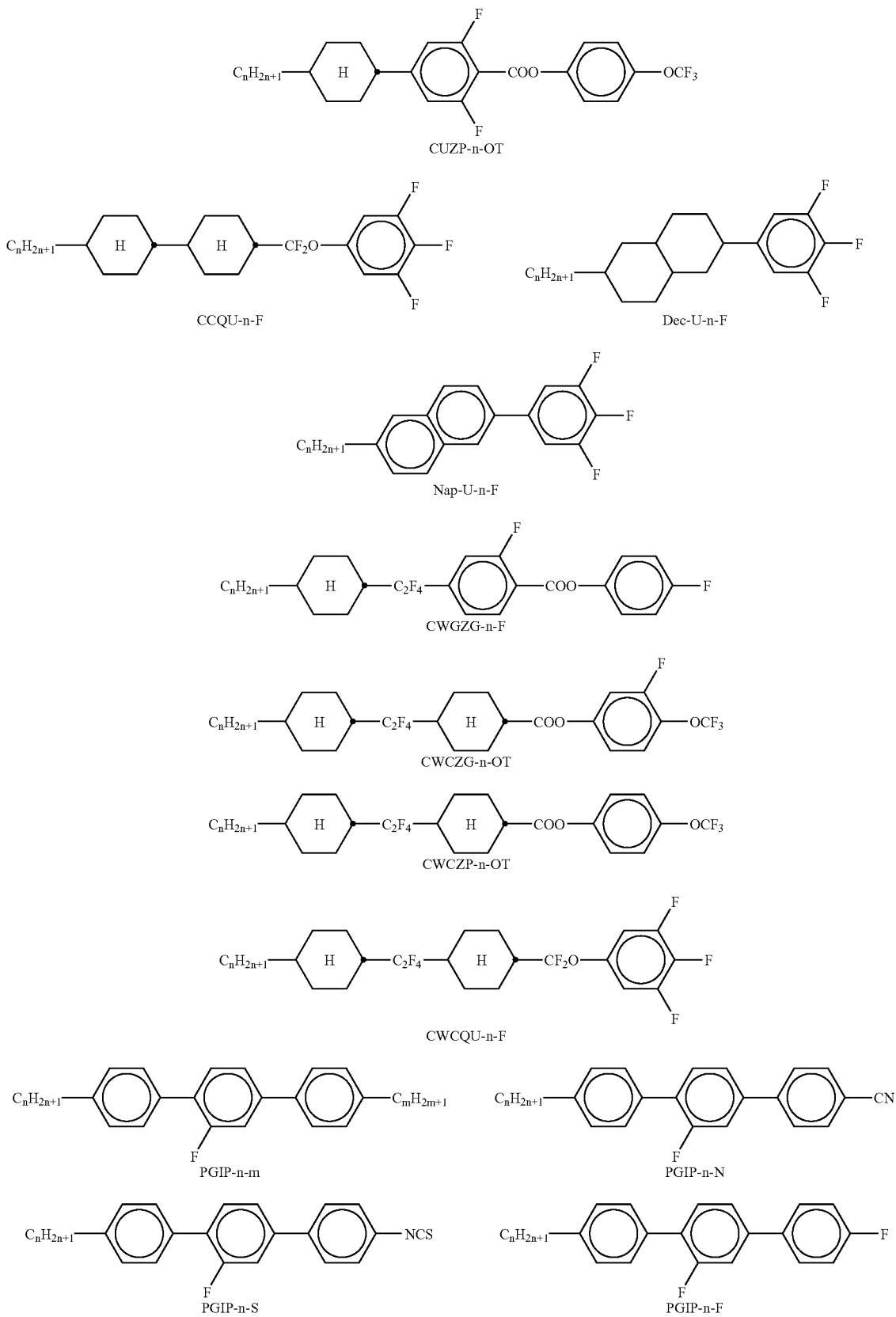

-continued
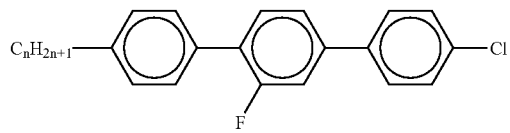
PGIP-n-Cl
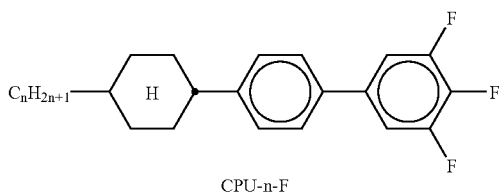
CPU-n-F
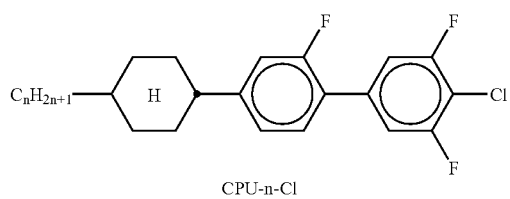
CPU-n-Cl
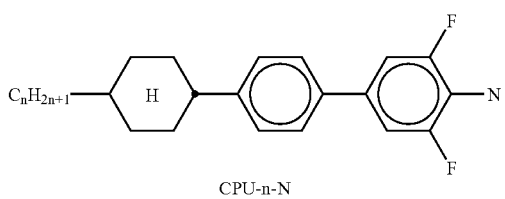
CPU-n-N
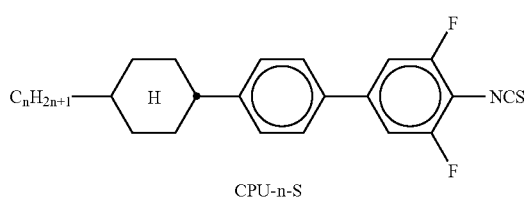
CPU-n-S
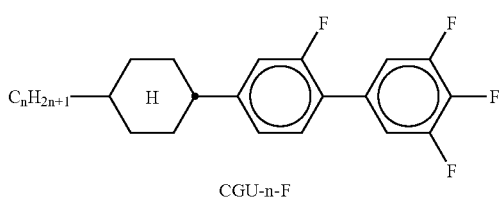
CGU-n-F
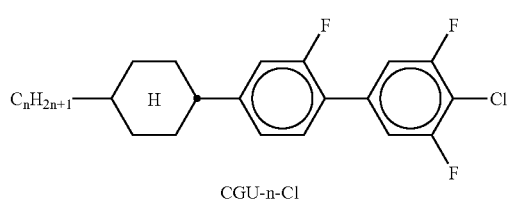
CGU-n-Cl
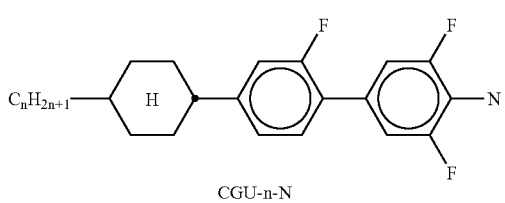
CGU-n-N
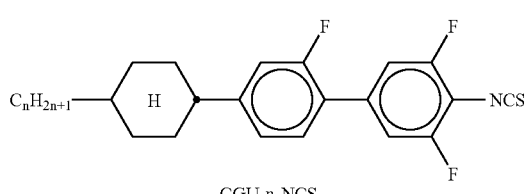
CGU-n-NCS
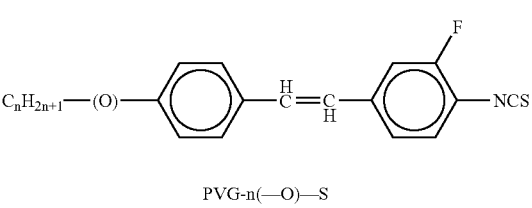
PVG-n(—O)—S
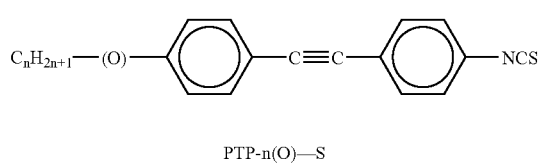
PTP-n(O)—S
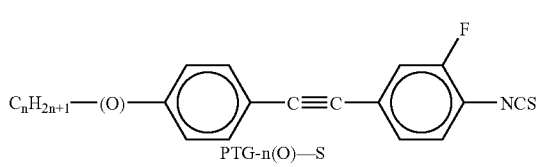
PTG-n(O)—S
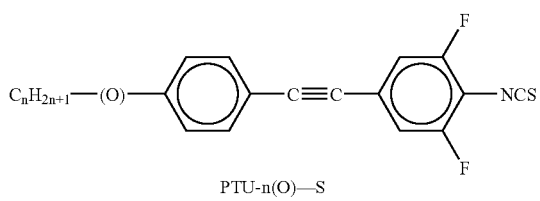
PTU-n(O)—S
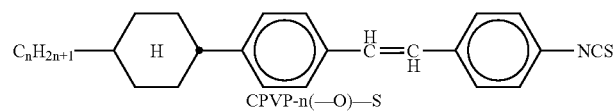
CPVP-n(—O)—S
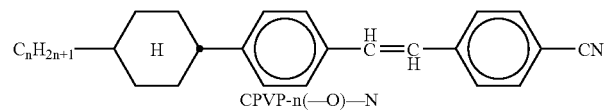
CPVP-n(—O)—N

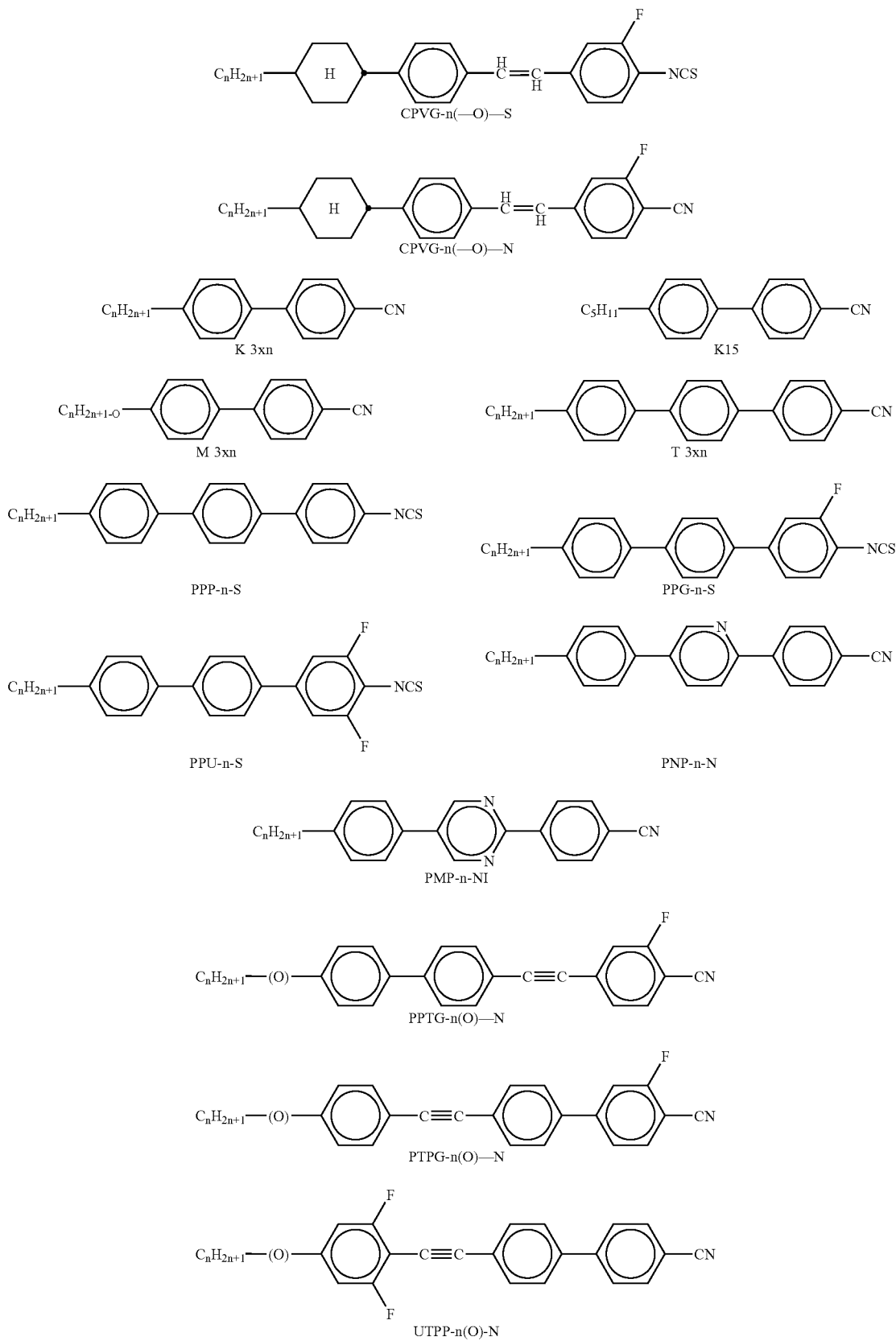

-continued
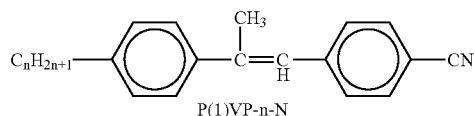
P(1)VP-n-N
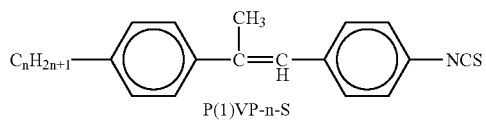
P(1)VP-n-S
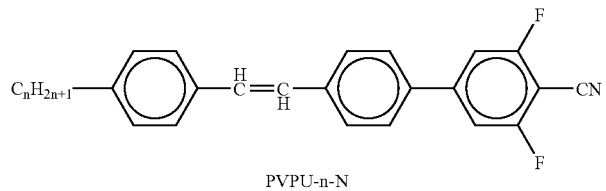
PVPU-n-N
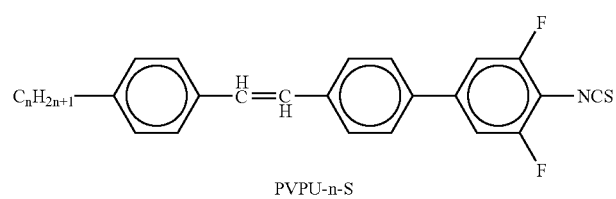
PVPU-n-S
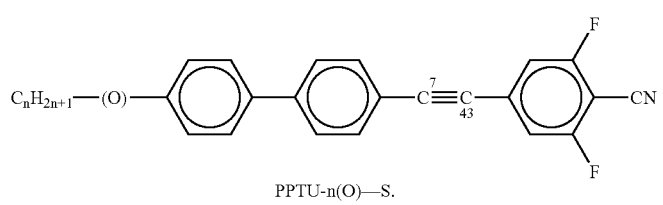
PPTU-n(O)—S.
13. A controllable component according to claim 1, wherein the liquid-crystal material contains one or more of the following compounds
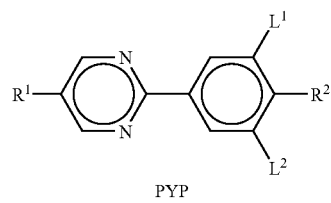
PYP
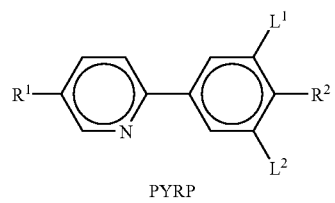
PYRP
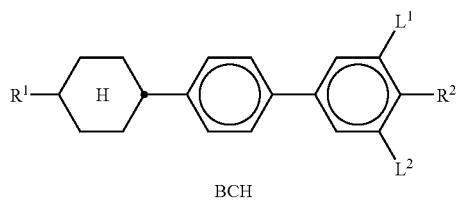
BCH
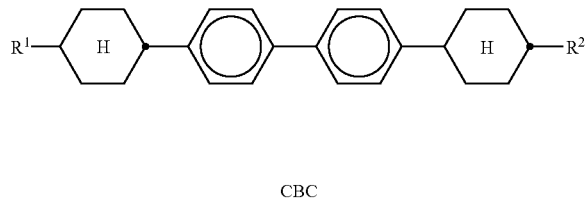
CBC
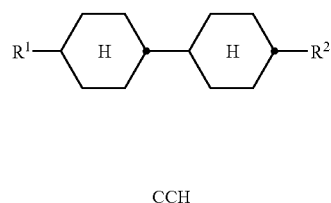
CCH
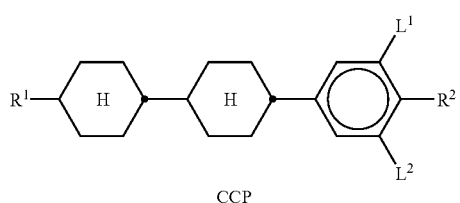
CCP -continued
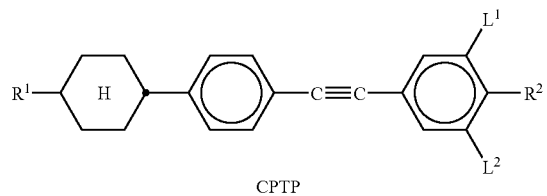
CPTP
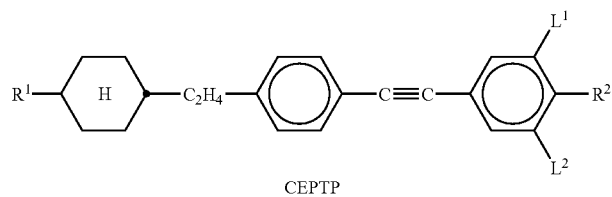
CEPTP
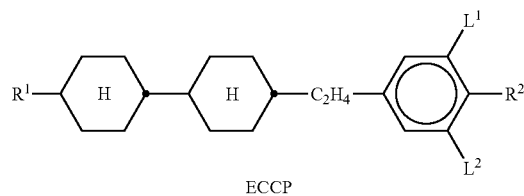
ECCP
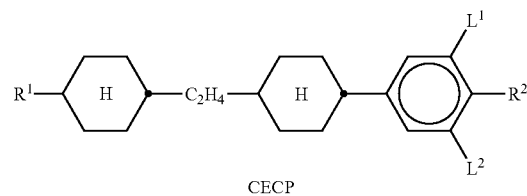
CECP
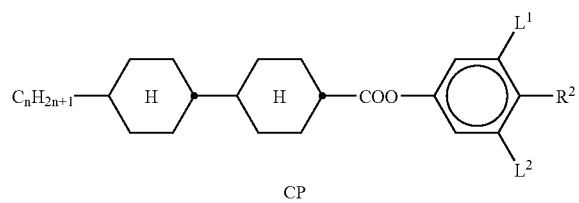
CP
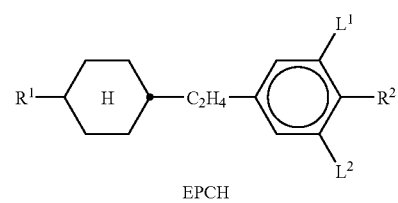
EPCH
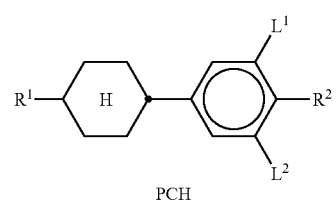
PCH
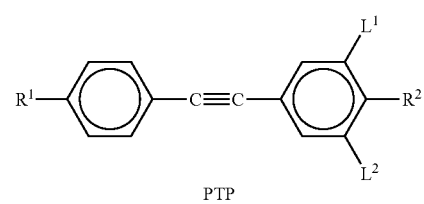
PTP
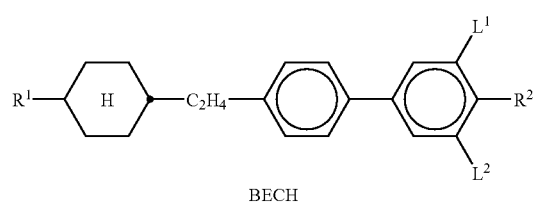
BECH
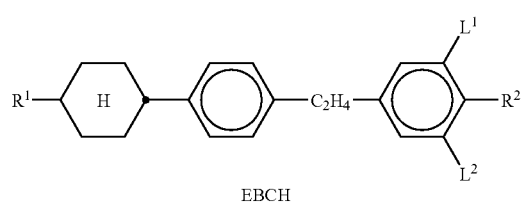
EBCH
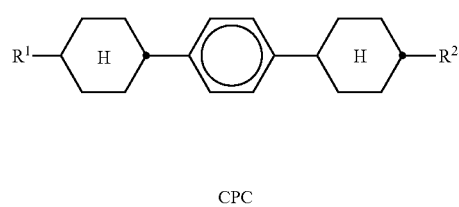
CPC
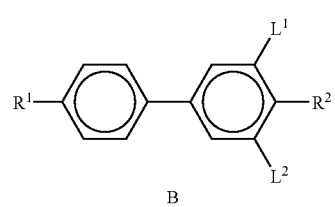
B
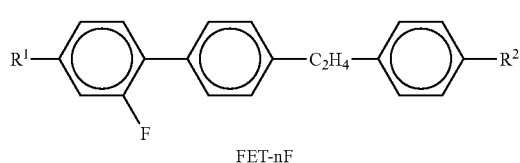
FET-nF
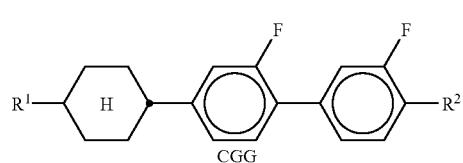
CGG

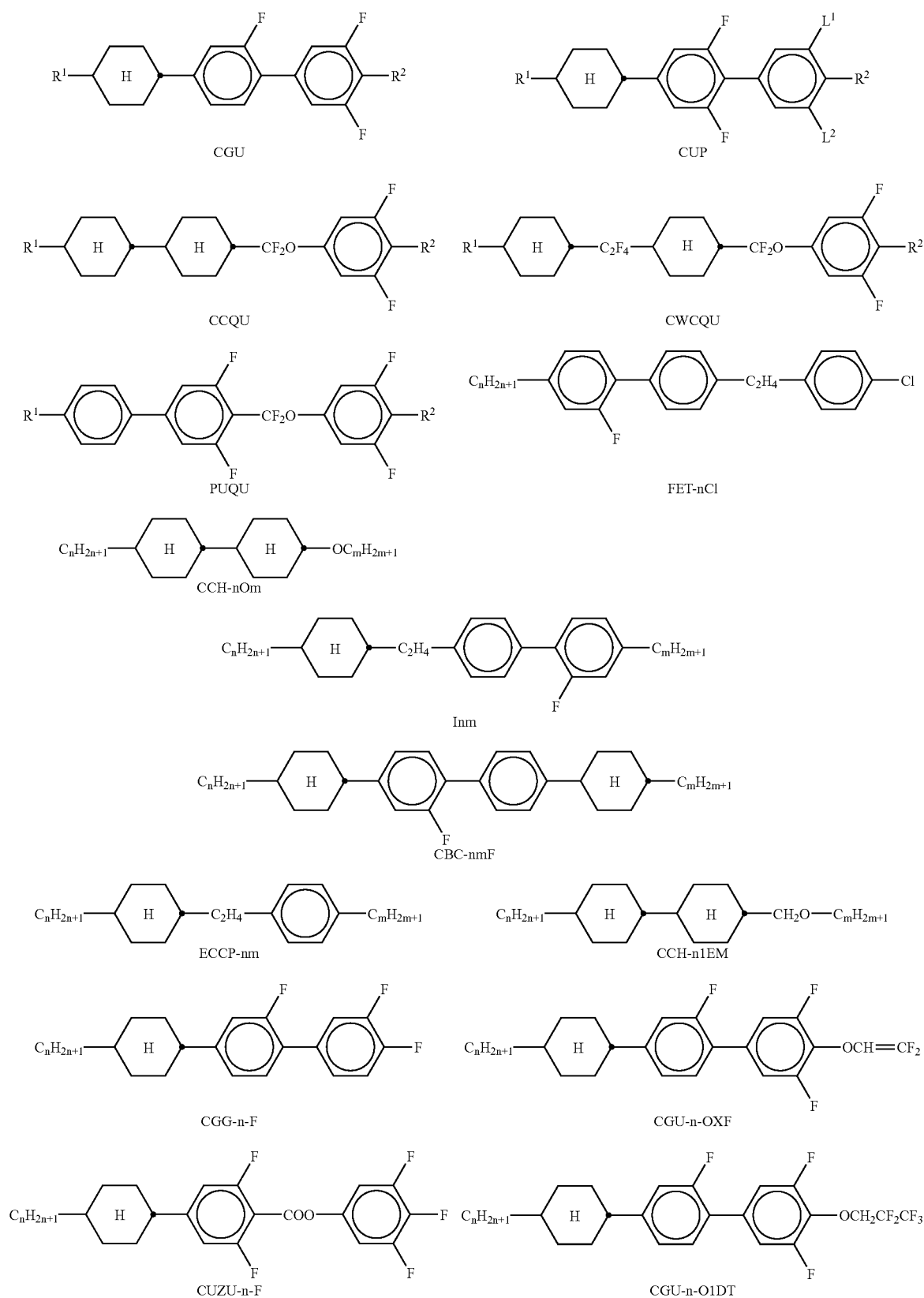

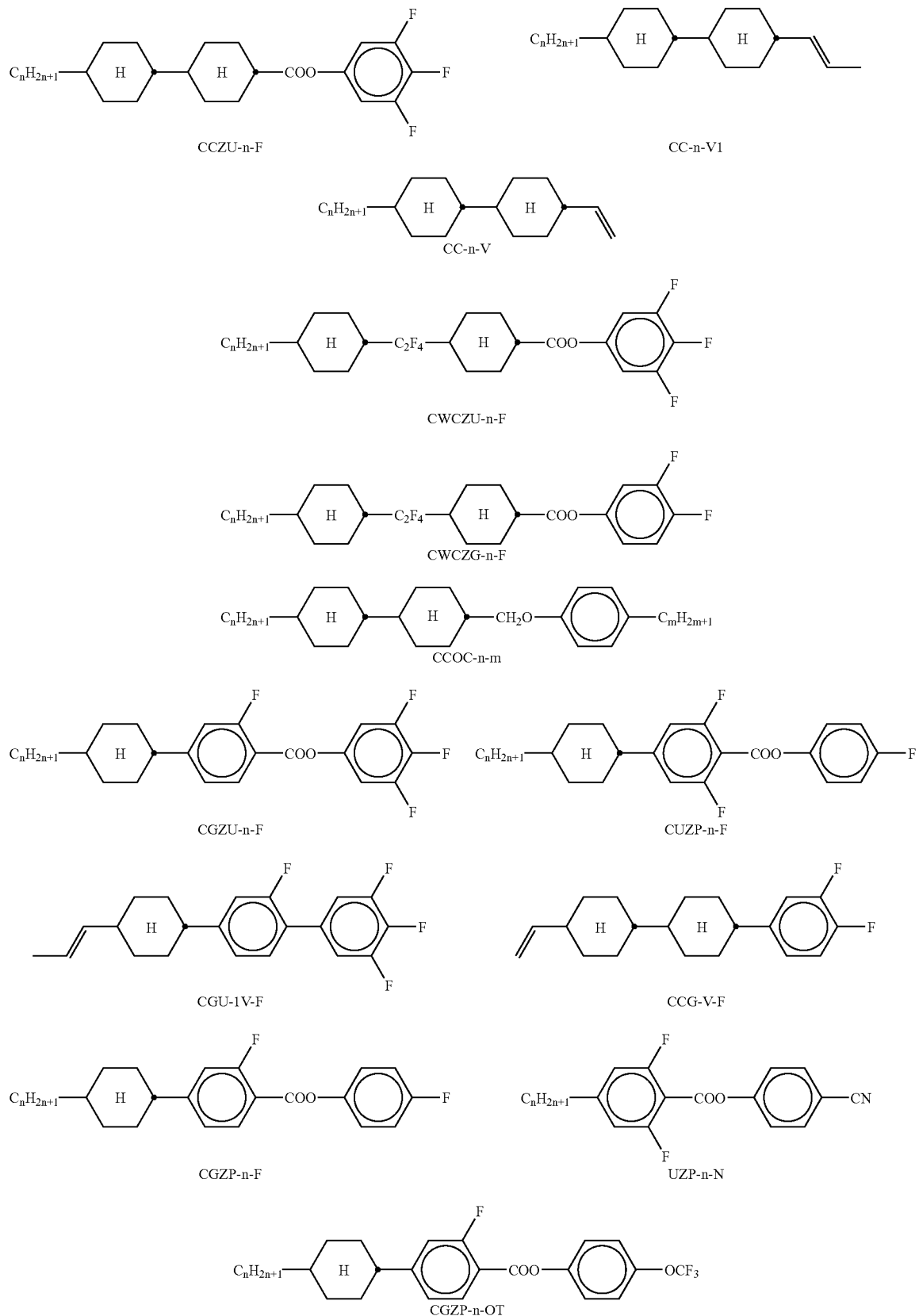

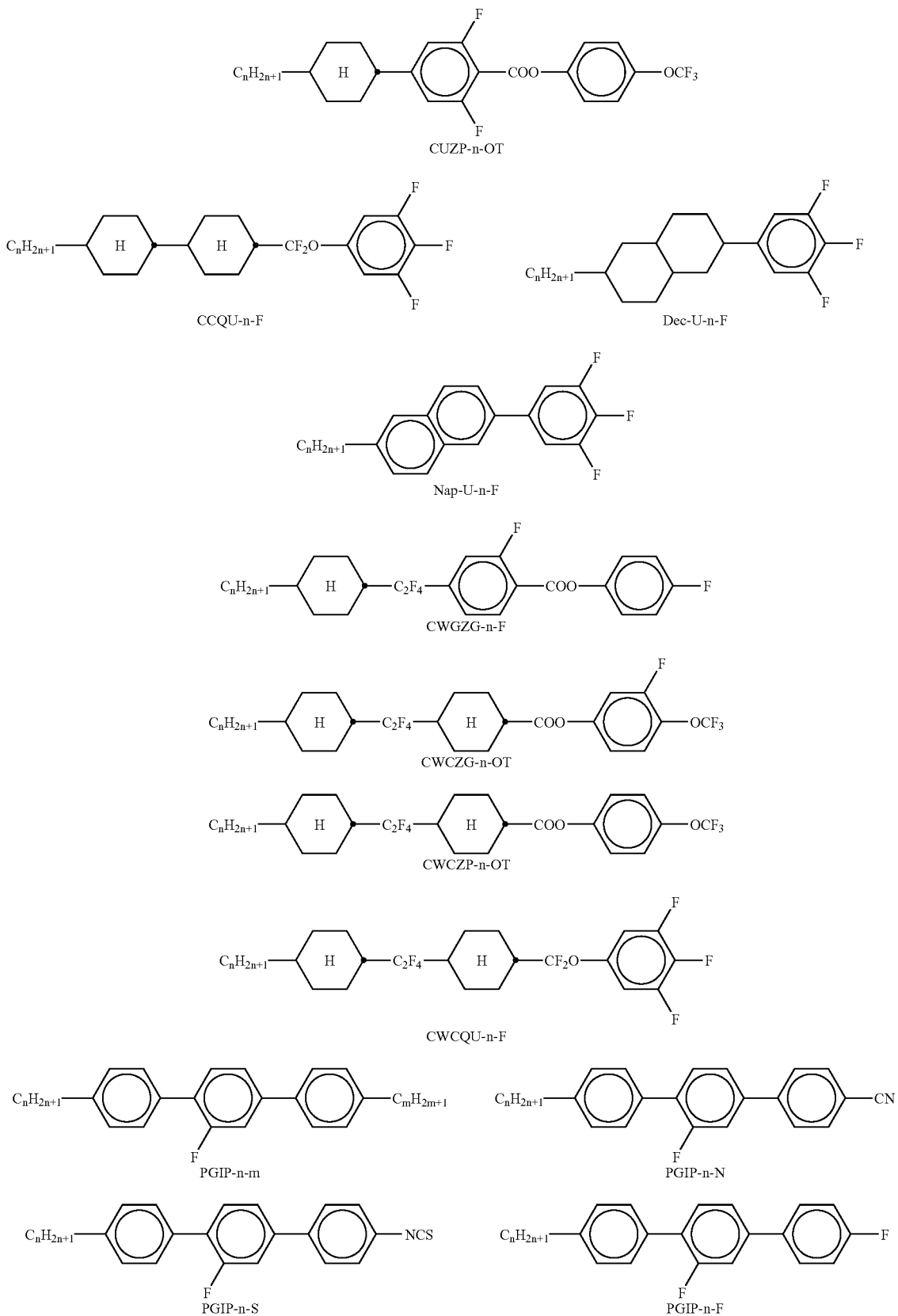

-continued
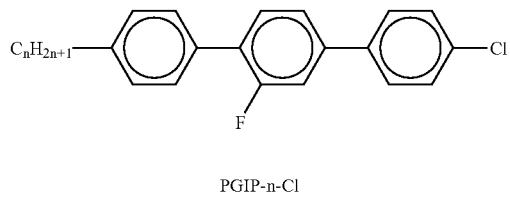
PGIP-n-Cl
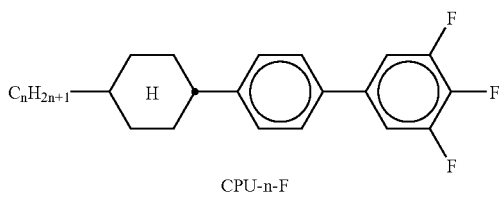
CPU-n-F
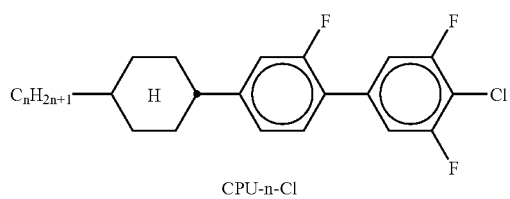
CPU-n-Cl
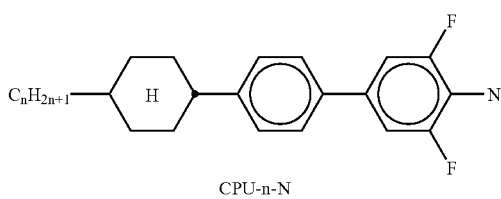
CPU-n-N
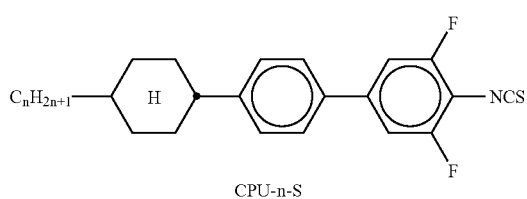
CPU-n-S
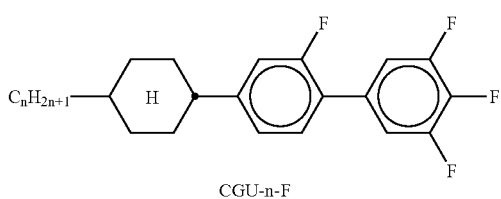
CGU-n-F
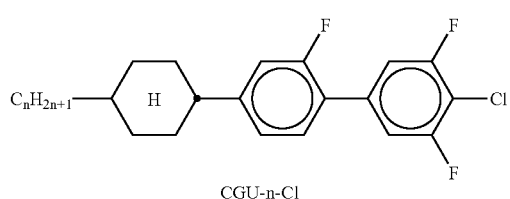
CGU-n-Cl
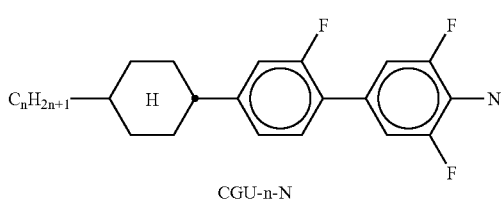
CGU-n-N
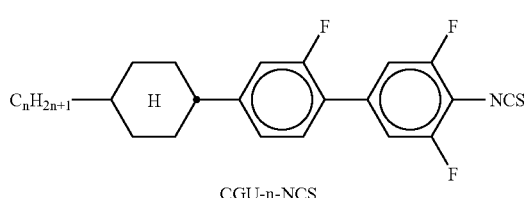
CGU-n-NCS
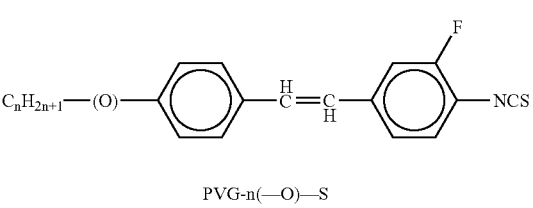
PVG-n(—O)—S
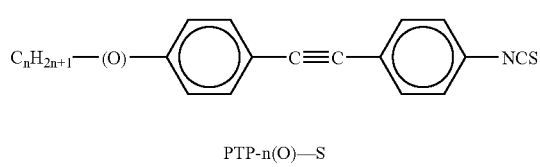
PTP-n(O)—S
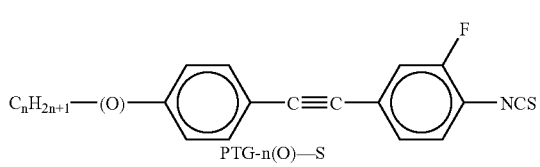
PTG-n(O)—S
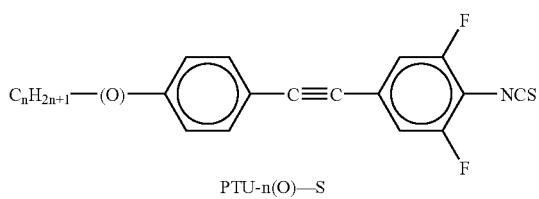
PTU-n(O)—S
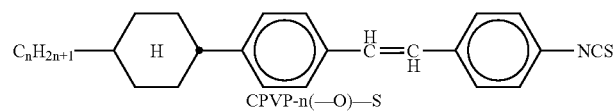
CPVP-n(—O)—S
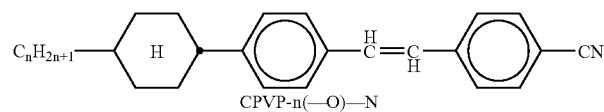
CPVP-n(—O)—N

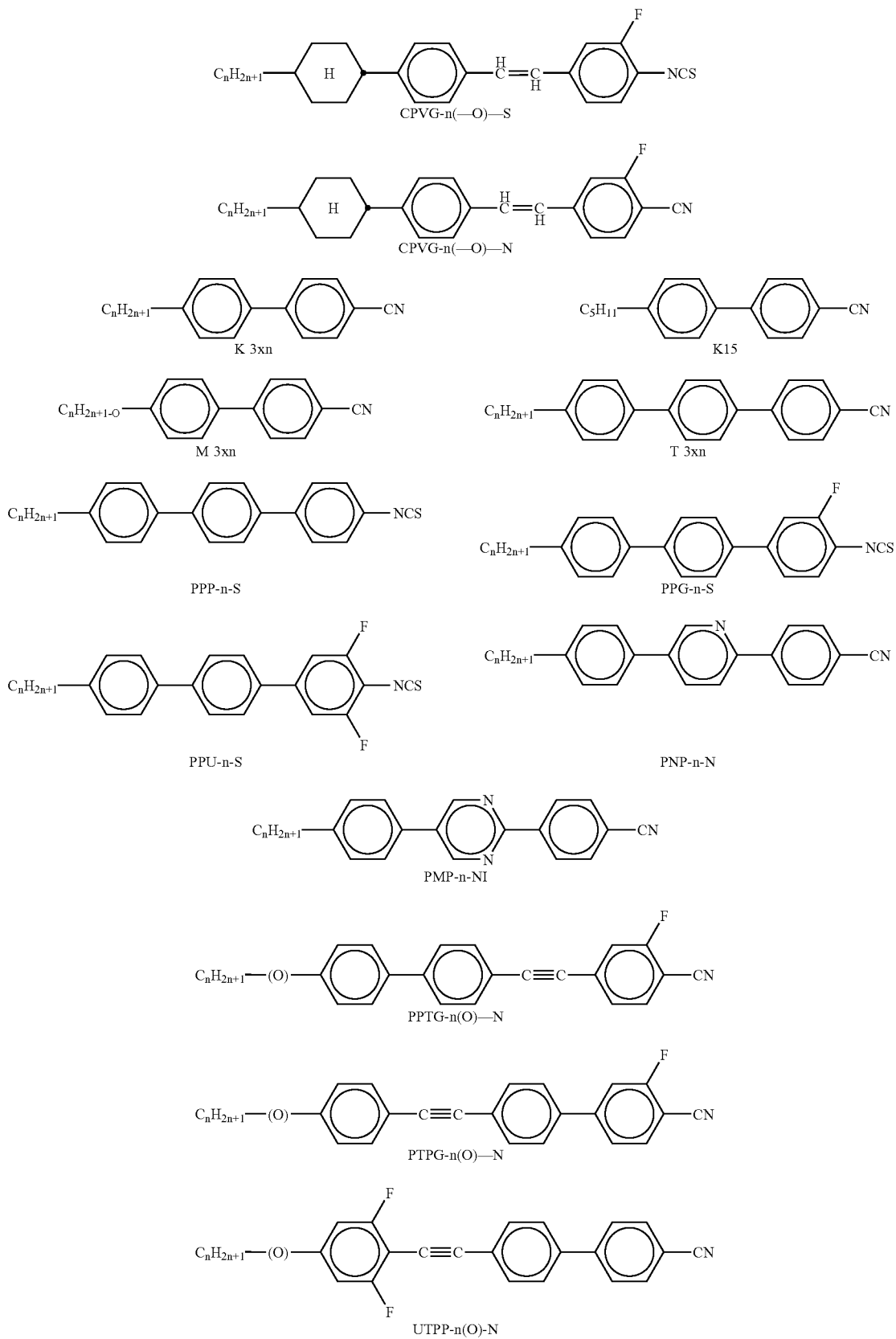

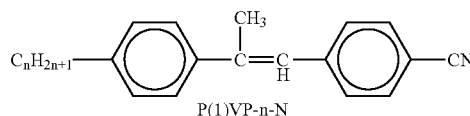

P(1)VP-n-N

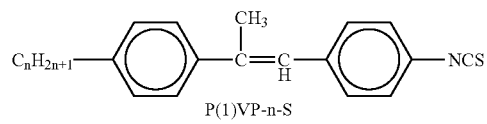

P(1)VP-n-S

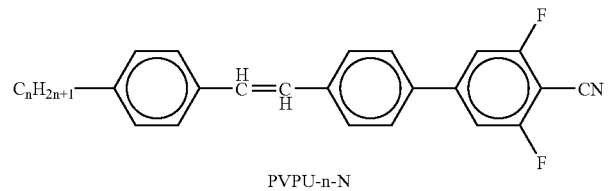

PVPU-n-N

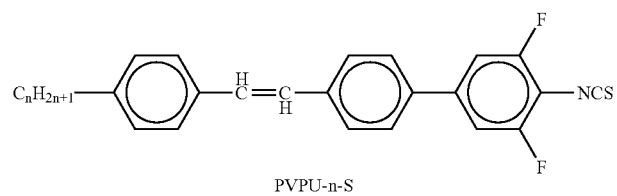

PVPU-n-S

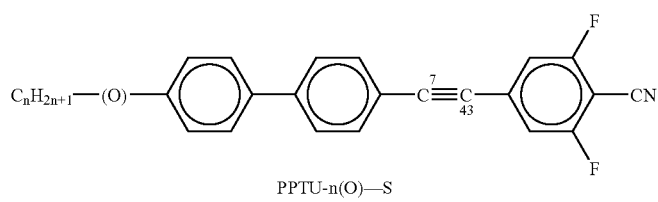

PPTU-n(O)—S

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| nmFF | $C_nH_{2n+1}$ | $C_mH_{2m+1}$ | F | H | F |
| nOmFF | $C_nH_{2n+1}$ | $OC_mH_{2m+1}$ | F | H | F |
| nO.mFF | $OC_nH_{2n+1}$ | $C_mH_{2m+1}$ | F | H | F |
| nO.OmFF | $OC_nH_{2n+1}$ | $OC_mH_{2m+1}$ | F | H | F |
| n | $C_nH_{2n+1}$ | CN | H | H | H |
| nN.F | $C_nH_{2n+1}$ | CN | F | H | H |
| nN.F.F | $C_nH_{2n+1}$ | CN | F | F | H |
| nF | $C_nH_{2n+1}$ | F | H | H | H |
| nF.F | $C_nH_{2n+1}$ | F | F | H | H |
| nF.F.F | $C_nH_{2n+1}$ | F | F | F | H |
| nCl | $C_nH_{2n+1}$ | Cl | H | H | H |
| nCl.F | $C_nH_{2n+1}$ | Cl | F | H | H |
| nCl.F.F | $C_nH_{2n+1}$ | Cl | F | F | H |
| nmF | $C_nH_{2n+1}$ | $C_mH_{2m+1}$ | F | H | H |
| $nCF_3$ | $C_nH_{2n+1}$ | $CF_3$ | H | H | H |
| $nOCF_3$ | $C_nH_{2n+1}$ | $OCF_3$ | H | H | H |
| $nOCF_3.F$ | $C_nH_{2n+1}$ | $OCF_3$ | F | H | H |
| $nOCF_3.F.F$ | $C_nH_{2n+1}$ | $OCF_3$ | F | F | H |
| $nOCF_2$ | $C_nH_{2n+1}$ | $OCHF_2$ | H | H | H |
| $nOCF_2.F.F$ | $C_nH_{2n+1}$ | $OCHF_2$ | F | F | H |
| nS | $C_nH_{2n+1}$ | NCS | H | H | H |
| nAm | $C_nH_{2n+1}$ | $COOC_mH_{2m+1}$ | H | H | H |
| nF.Cl | $C_nH_{2n+1}$ | F | Cl | H | H |
| nS | $C_nH_{2n+1}$ | NCS | H | H | H |
| nS.F | $C_nH_{2n+1}$ | NCS | F | H | H |
| nS.F.F | $C_nH_{2n+1}$ | NCS | F | F | H | wherein the substitutens on the compounds above are defined in the table above, and n and m are, each independently, 1 to 7.

14. A controllable component according to claim 7, wherein the liquid-crystal material contains one or more of the following compounds

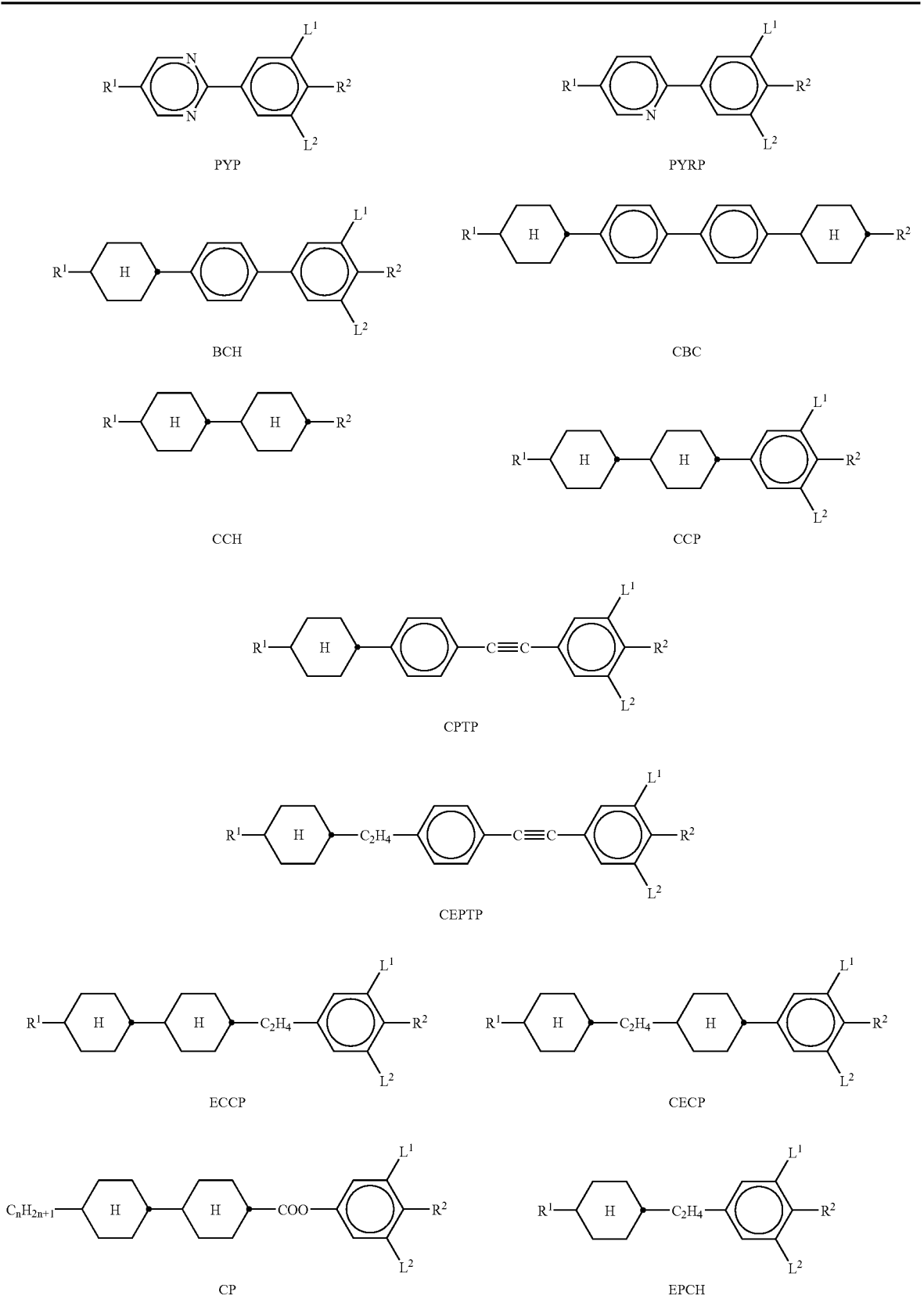

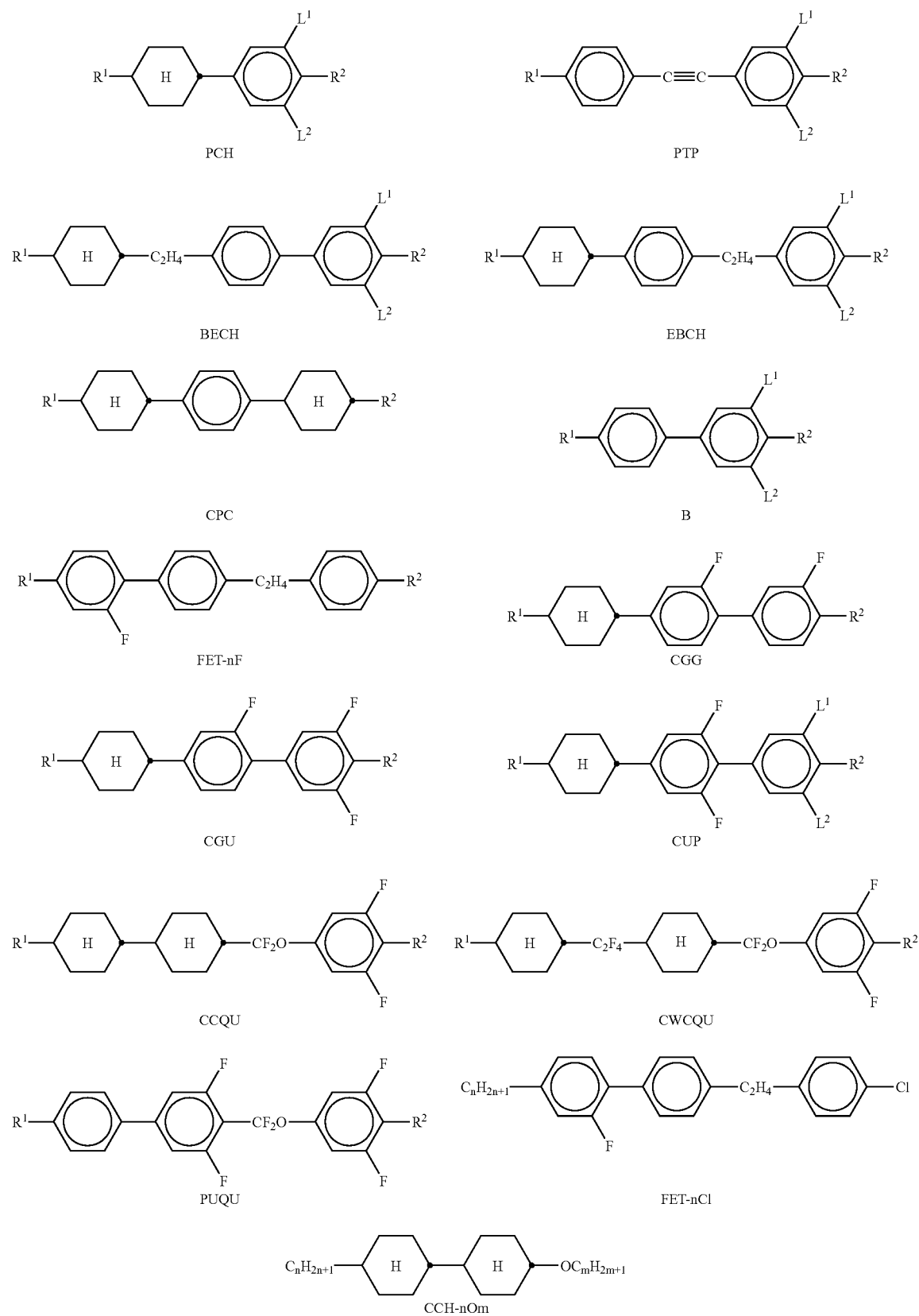

-continued
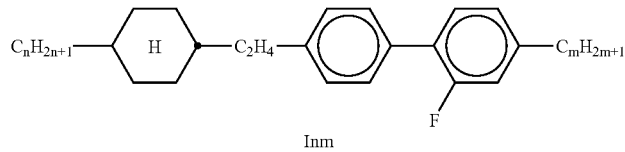
Inm
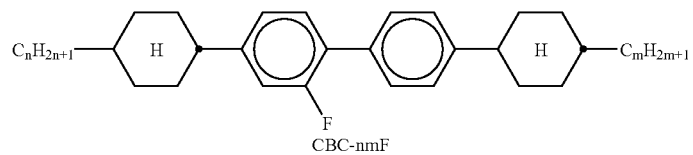
CBC-nmF
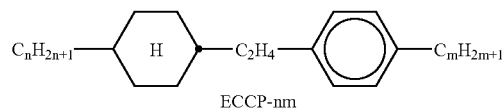
ECCP-nm
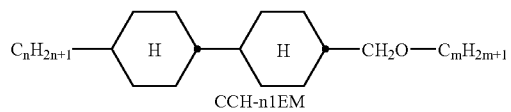
CCH-n1EM
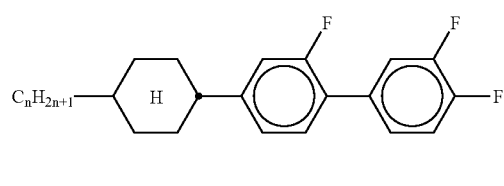
CGG-n-F
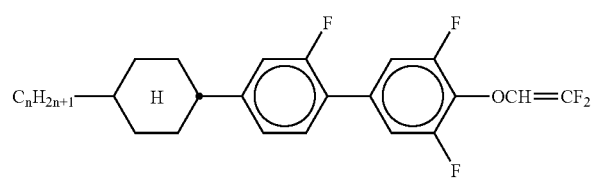
CGU-n-OXF
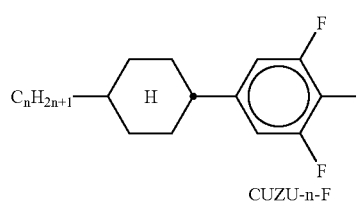
CUZU-n-F
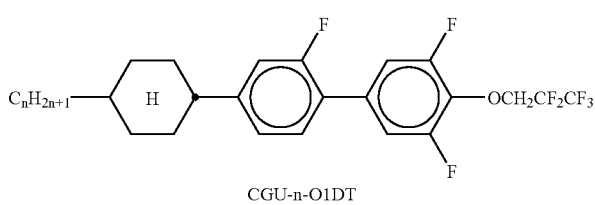
CGU-n-O1DT
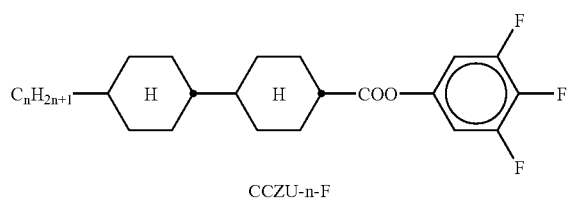
CCZU-n-F
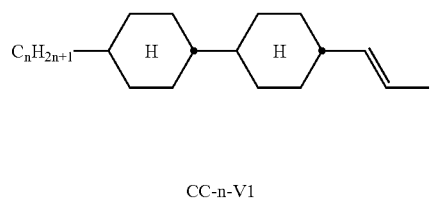
CC-n-V1
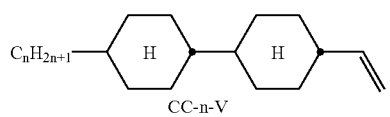
CC-n-V
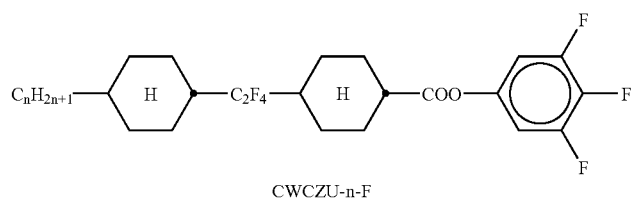
CWCZU-n-F
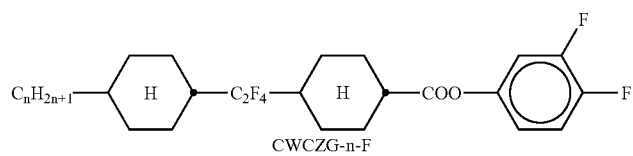
CWCZG-n-F -continued
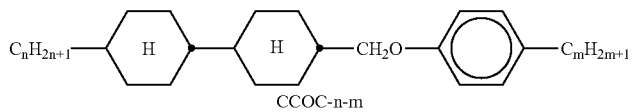
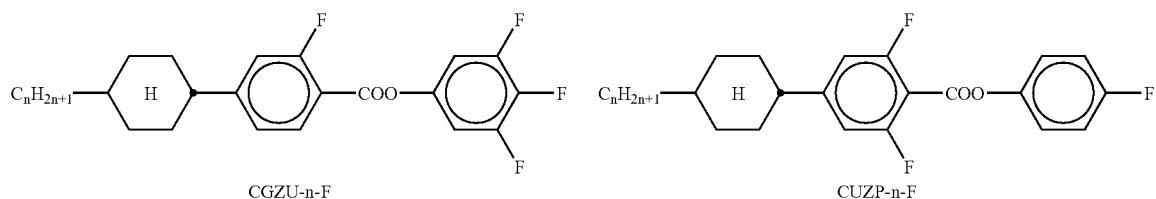
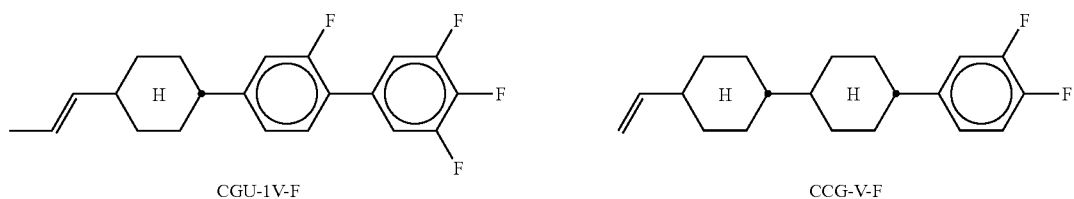
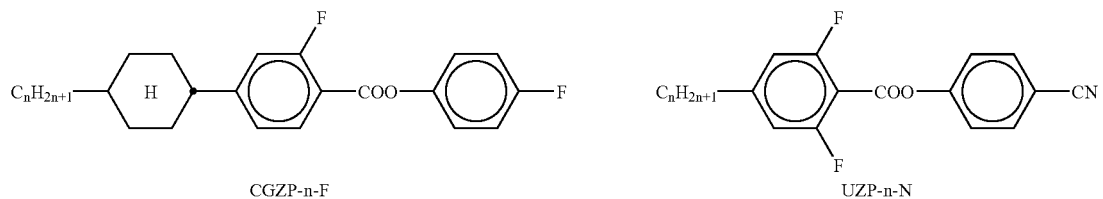
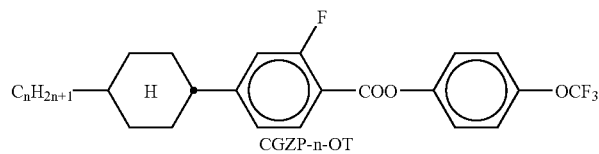
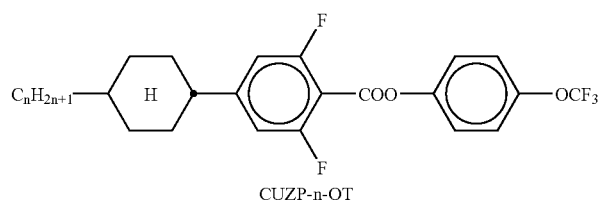
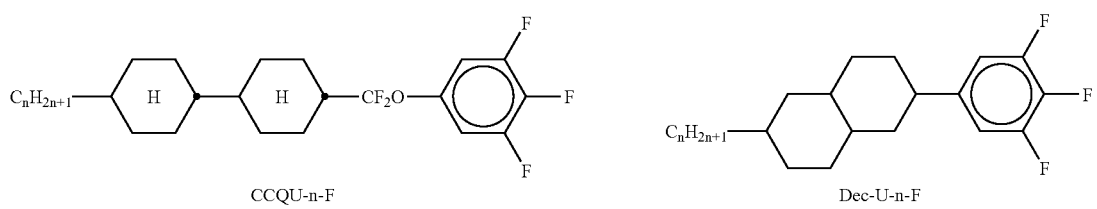
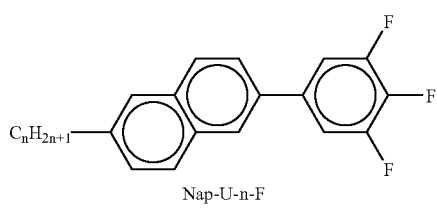

-continued
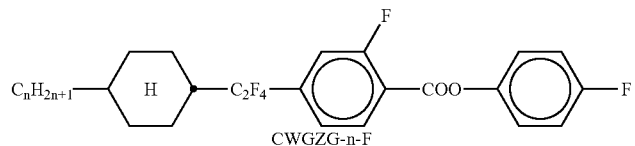
CWGZG-n-F
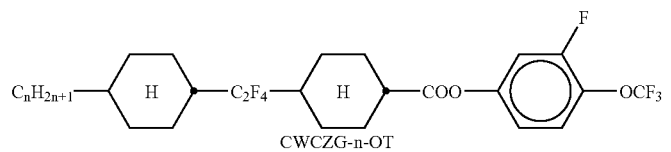
CWCZG-n-OT
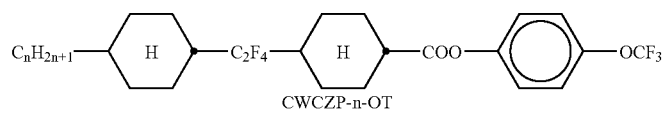
CWCZP-n-OT
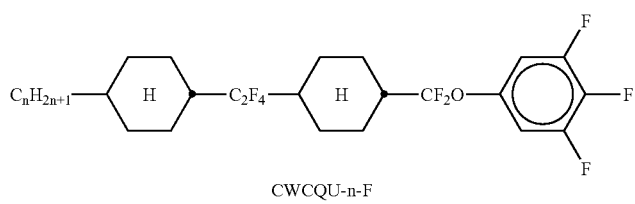
CWCQU-n-F
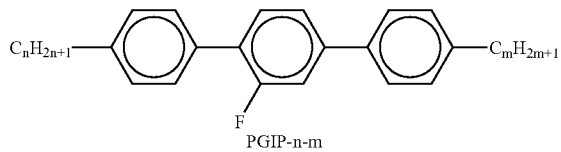
PGIP-n-m
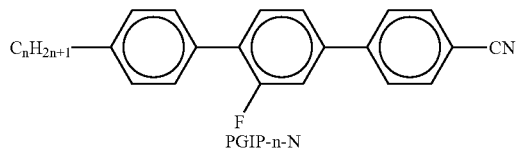
PGIP-n-N
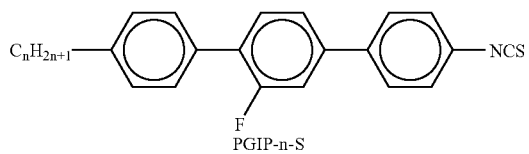
PGIP-n-S
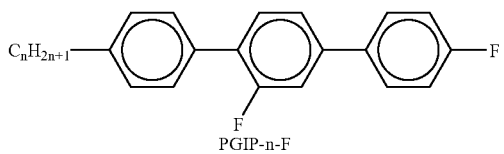
PGIP-n-F
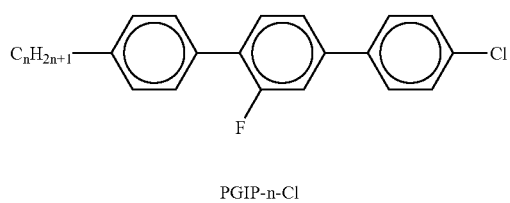
PGIP-n-Cl
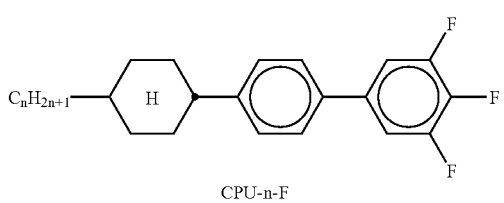
CPU-n-F
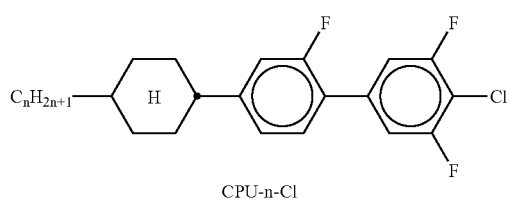
CPU-n-Cl
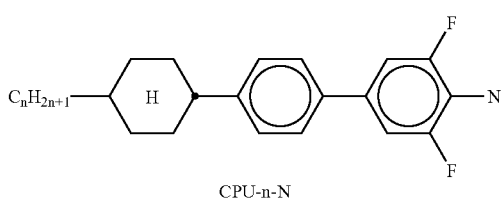
CPU-n-N
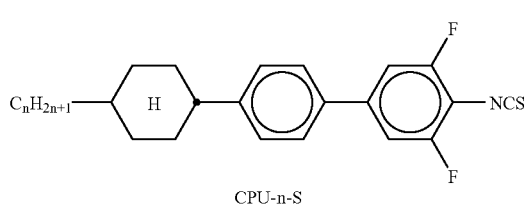
CPU-n-S
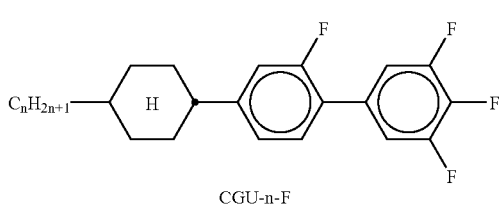
CGU-n-F

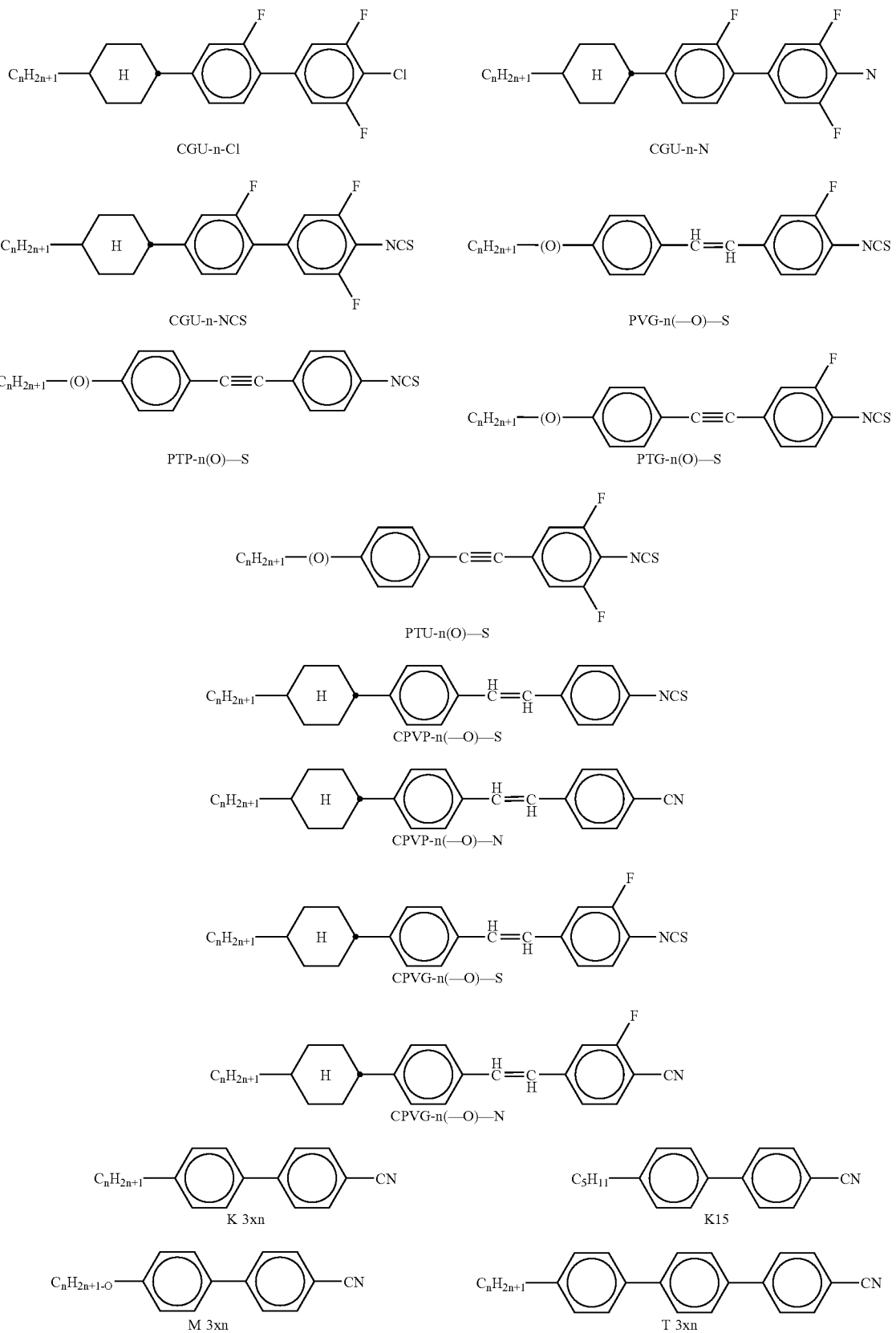

-continued
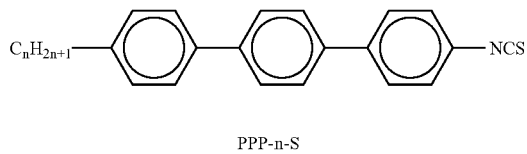
PPP-n-S
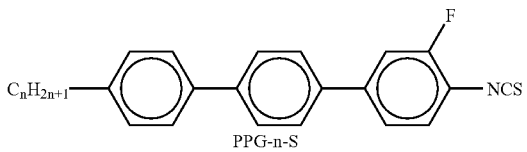
PPG-n-S
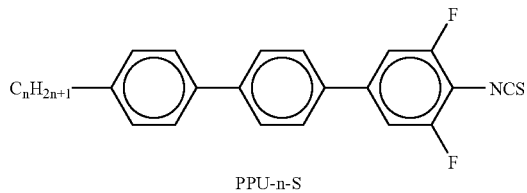
PPU-n-S
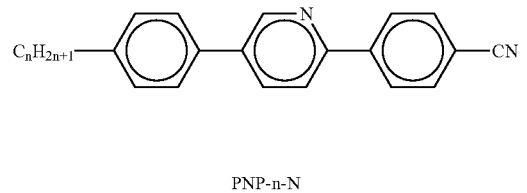
PNP-n-N
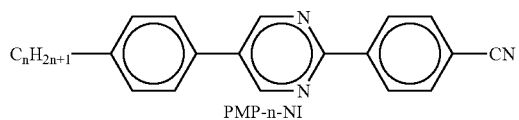
PMP-n-NI
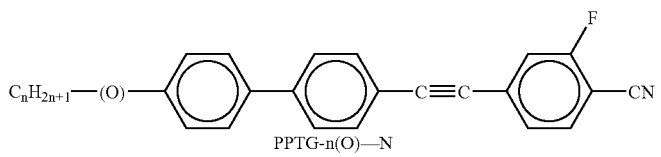
PPTG-n(O)—N
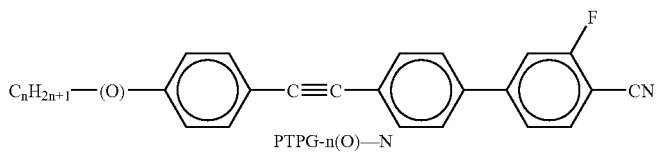
PTPG-n(O)—N
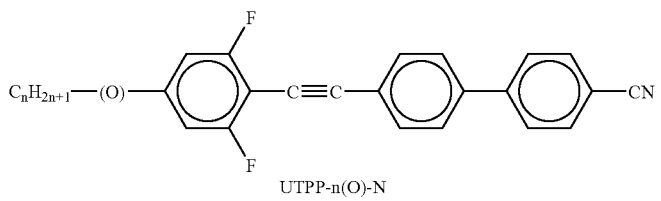
UTPP-n(O)-N
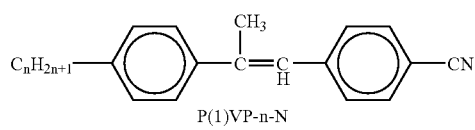
P(1)VP-n-N
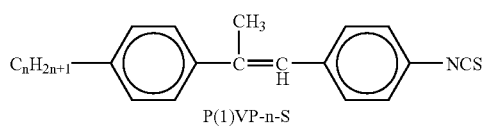
P(1)VP-n-S
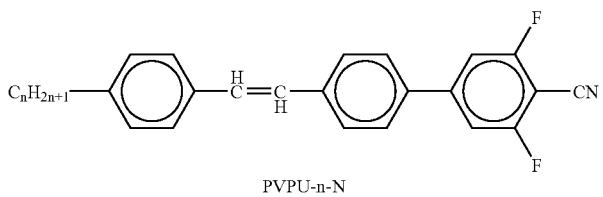
PVPU-n-N
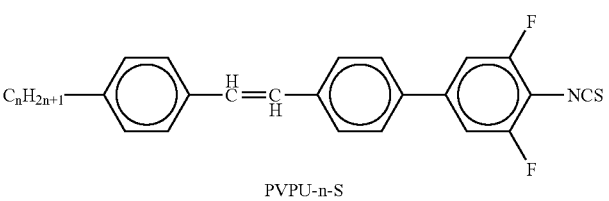
PVPU-n-S -continued

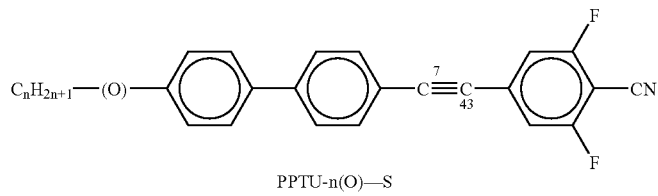

PPTU-n(O)—S

| Code for R¹, R², L¹, L², L³ | R¹ | R² | L¹ | L² | L³ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| nmFF | $C_nH_{2n+1}$ | $C_mH_{2m+1}$ | F | H | F |
| nOmFF | $C_nH_{2n+1}$ | $OC_mH_{2m+1}$ | F | H | F |
| nO.mFF | $OC_nH_{2n+1}$ | $C_mH_{2m+1}$ | F | H | F |
| nO.OmFF | $OC_nH_{2n+1}$ | $OC_mH_{2m+1}$ | F | H | F |
| n | $C_nH_{2n+1}$ | CN | H | H | H |
| nN.F | $C_nH_{2n+1}$ | CN | F | H | H |
| nN.F.F | $C_nH_{2n+1}$ | CN | F | F | H |
| nF | $C_nH_{2n+1}$ | F | H | H | H |
| nF.F | $C_nH_{2n+1}$ | F | F | H | H |
| nF.F.F | $C_nH_{2n+1}$ | F | F | F | H |
| nCl | $C_nH_{2n+1}$ | Cl | H | H | H |
| nCl.F | $C_nH_{2n+1}$ | Cl | F | H | H |
| nCl.F.F | $C_nH_{2n+1}$ | Cl | F | F | H |
| nmF | $C_nH_{2n+1}$ | $C_mH_{2m+1}$ | F | H | H |
| nCF₃ | $C_nH_{2n+1}$ | $CF_3$ | H | H | H |
| nOCF₃ | $C_nH_{2n+1}$ | $OCF_3$ | H | H | H |
| nOCF₃.F | $C_nH_{2n+1}$ | $OCF_3$ | F | H | H |
| nOCF₃.F.F | $C_nH_{2n+1}$ | $OCF_3$ | F | F | H |
| nOCF₂ | $C_nH_{2n+1}$ | $OCHF_2$ | H | H | H |
| nOCF₂.F.F | $C_nH_{2n+1}$ | $OCHF_2$ | F | F | H |
| nS | $C_nH_{2n+1}$ | NCS | H | H | H |
| nAm | $C_nH_{2n+1}$ | $COOC_mH_{2m+1}$ | H | H | H |
| nF.Cl | $C_nH_{2n+1}$ | F | Cl | H | H |
| nS | $C_nH_{2n+1}$ | NCS | H | H | H |
| nS.F | $C_nH_{2n+1}$ | NCS | F | H | H |
| nS.F.F | $C_nH_{2n+1}$ | NCS | F | F | H | wherein the substitutens on the compounds above are defined in the table above, and n and m are, each independently, 1 to 7.

15. A controllable component according to claim 7, wherein the liquid-crystal material contains one or more of the following compounds

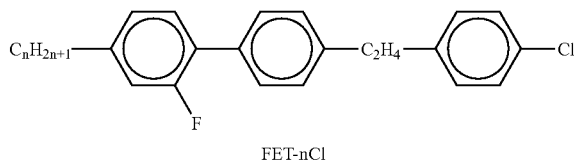

FET-nCl

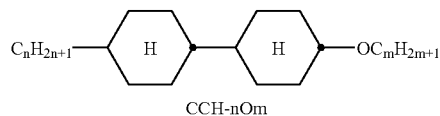

CCH-nOm

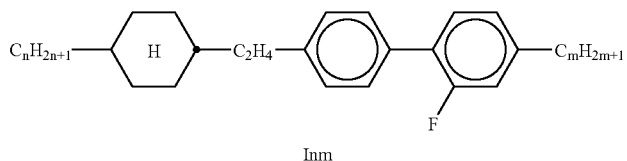

Inm

-continued
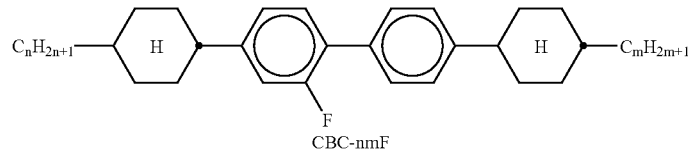
CBC-nmF
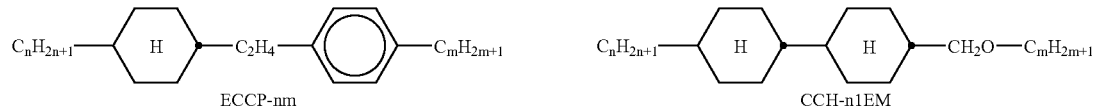
ECCP-nm
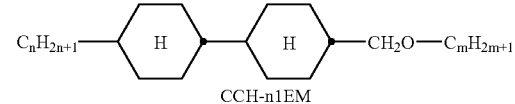
CCH-n1EM
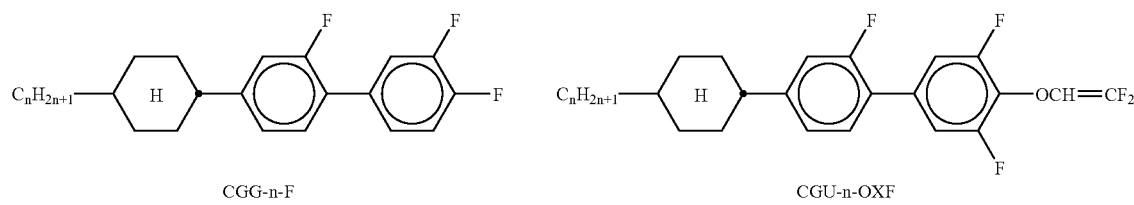
CGG-n-F
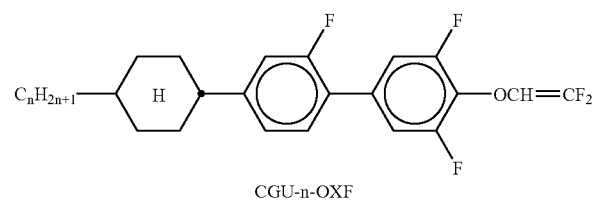
CGU-n-OXF
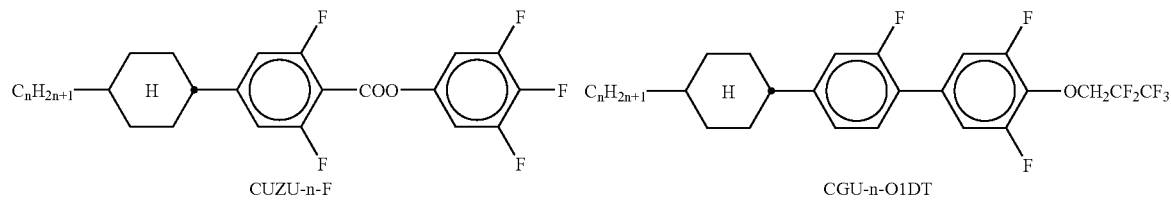
CUZU-n-F
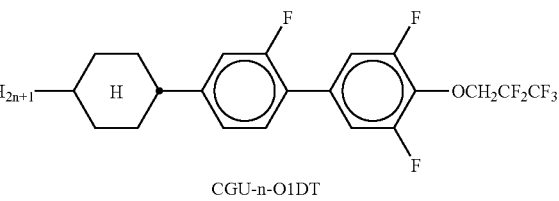
CGU-n-O1DT
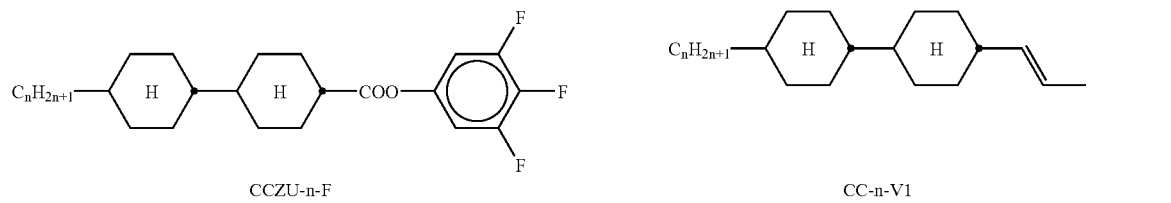
CCZU-n-F
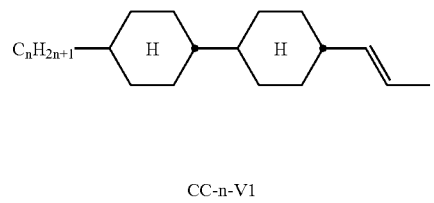
CC-n-V1
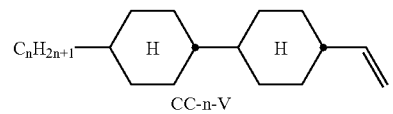
CC-n-V
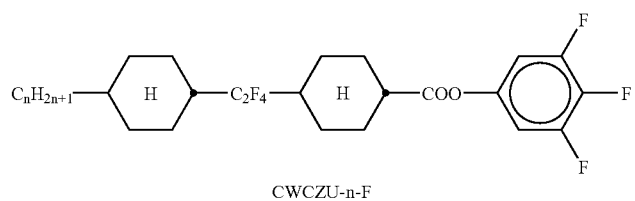
CWCZU-n-F
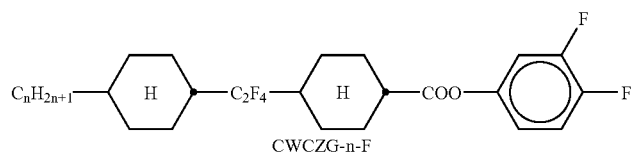
CWCZG-n-F
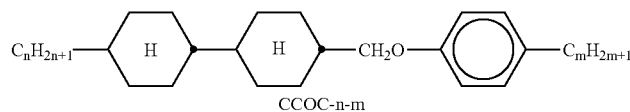
CCOC-n-m

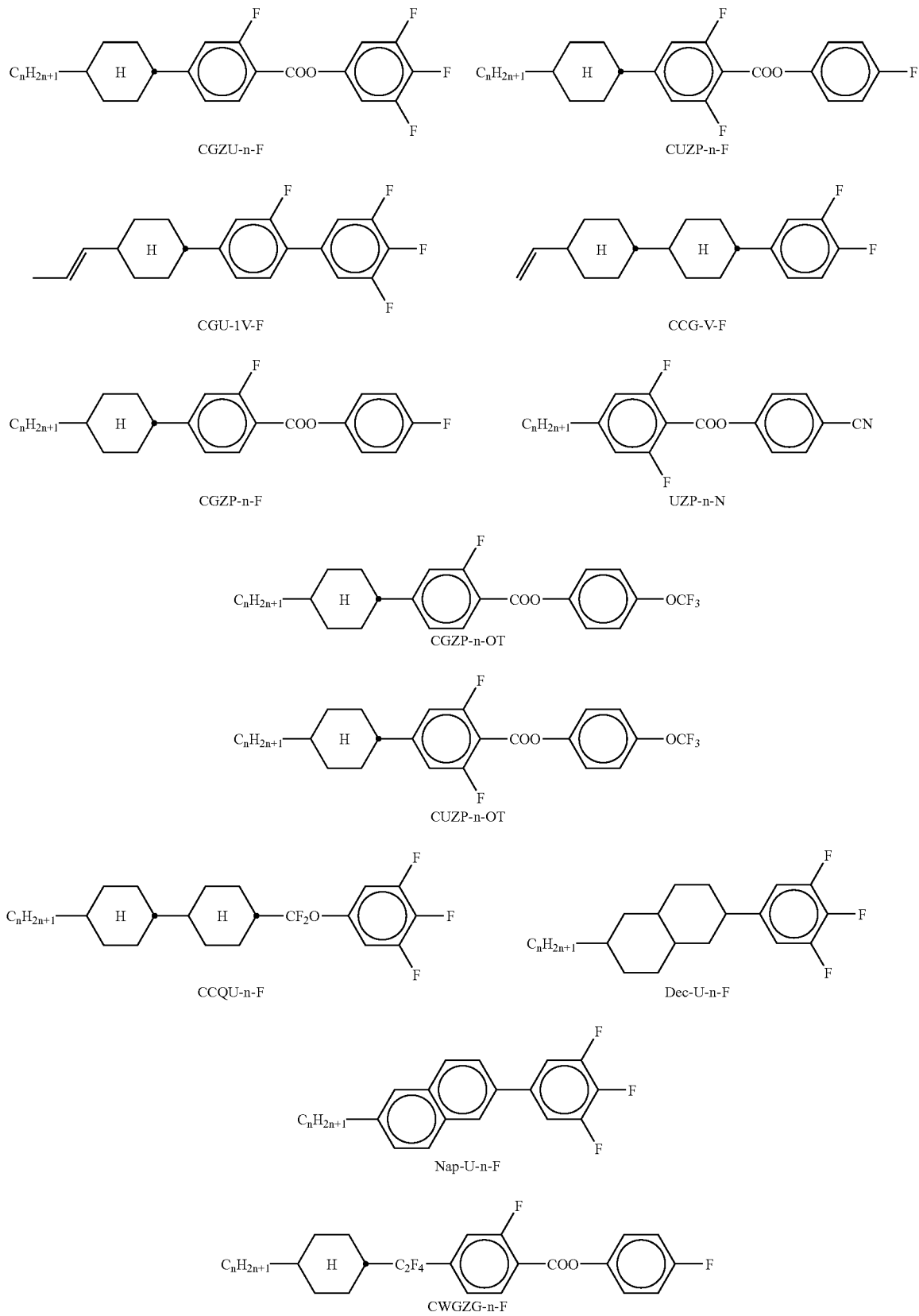

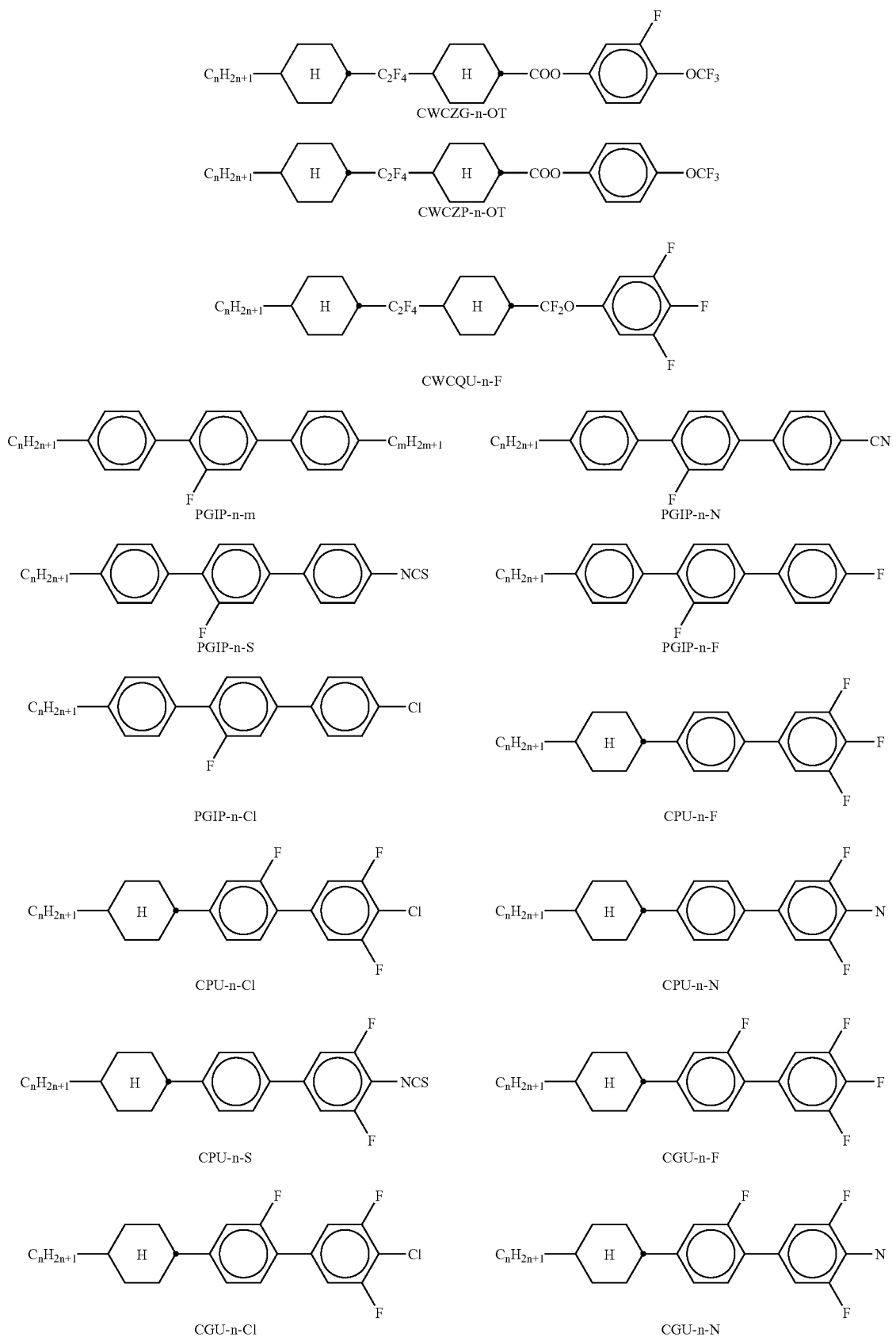

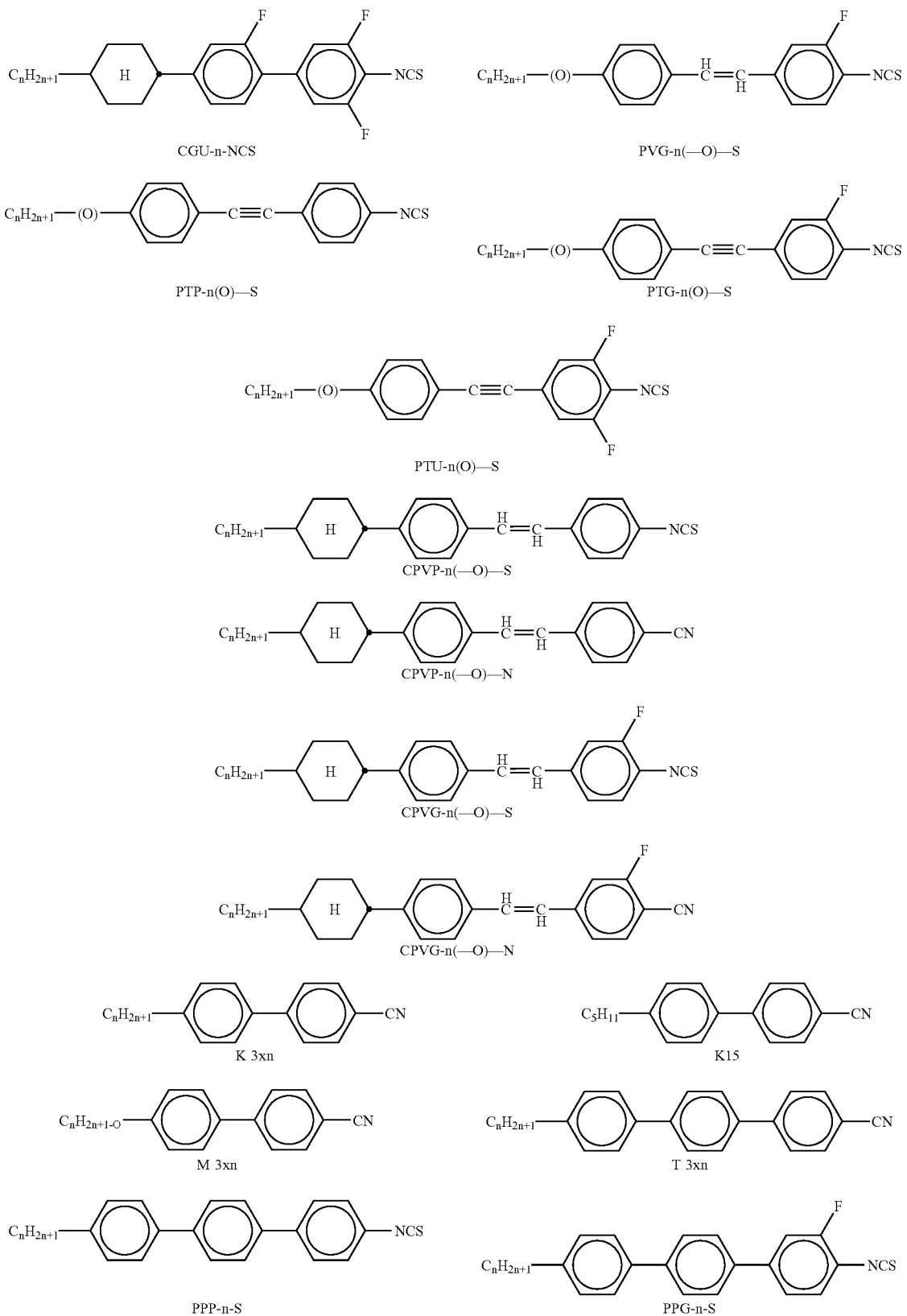

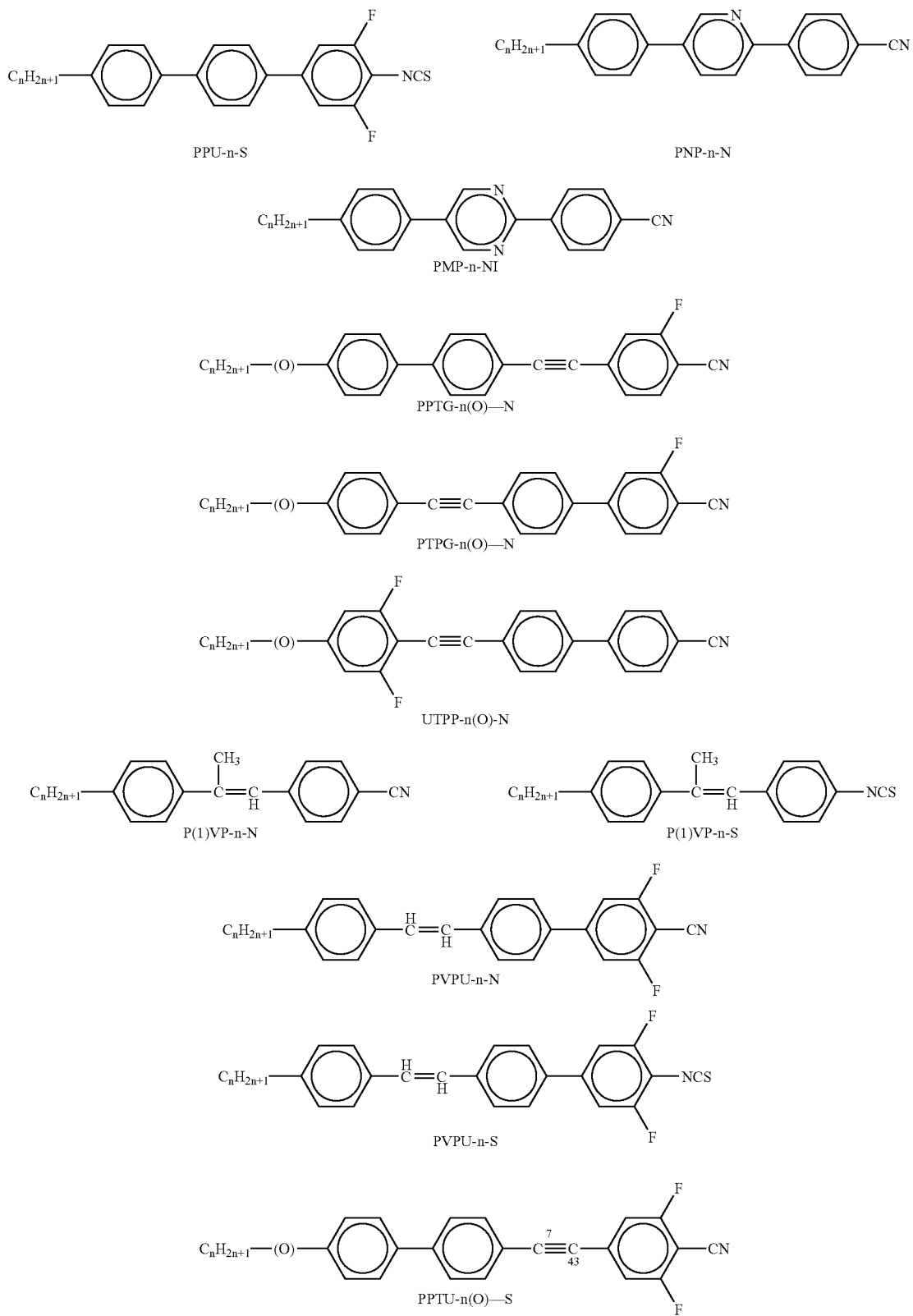
wherein n and m are, each independently, 1 to 7.

16. A controllable component for a high-frequency application according to claim 1, which is a phase shifter, varactor or radio wave antenna array.

17. A controllable component for a high-frequency application according to claim 7, which is a phase shifter, varactor or radio wave antenna array.

18. A controllable component for a high-frequency application according to claim 1, which is a microwave circuit.

19. A controllable component for a high-frequency application according to claim 7, which is a microwave circuit.

20. A controllable component for a high-frequency application according to claim 1, which operates at 8.3 to 8.75 GHz.

21. A controllable component for a high-frequency application according to claim 7, which operates at 8.3 to 8.75 GHz.

22. A controllable component for a high-frequency application according to claim 11, wherein n and m are, each independently, 1 to 7.

23. A controllable component for a high-frequency application according to claim 12, wherein n and m are, each independently, 1 to 7.

* * * * *

UNITED STATES PATENT AND TRADEMARK OFFICE
CERTIFICATE OF CORRECTION

| | |
|---|---|
| PATENT NO. | : 7,361,288 B2 |
| APPLICATION NO. | : 10/888501 |
| DATED | : April 22, 2008 |
| INVENTOR(S) | : Georg Luessem |

It is certified that error appears in the above-identified patent and that said Letters Patent is hereby corrected as shown below:

On Title page, item [75] line 2 reads "Groβ-Zimmern", should read --Gross-Zimmern--
Column 49, line 67 reads "according to claim I comprising, as a controllable", should read --comprising, as a controllable--
Column 50, line 48 reads "the a", should read --the--
Column 50, line 61 reads "the a", should read --the--

Signed and Sealed this

Twenty-eighth Day of October, 2008

JON W. DUDAS
*Director of the United States Patent and Trademark Office*